(12) United States Patent
Margolin

(10) Patent No.: US 9,784,449 B2
(45) Date of Patent: Oct. 10, 2017

(54) FLAME SENSING SYSTEM

(71) Applicant: Jed Margolin, VC Highlands, NV (US)

(72) Inventor: Jed Margolin, VC Highlands, NV (US)

( * ) Notice: Subject to any disclaimer, the term of this patent is extended or adjusted under 35 U.S.C. 154(b) by 539 days.

(21) Appl. No.: 14/316,489

(22) Filed: Jun. 26, 2014

(65) Prior Publication Data

US 2015/0348393 A1   Dec. 3, 2015

Related U.S. Application Data

(60) Provisional application No. 62/005,199, filed on May 30, 2014.

(51) Int. Cl.
*G08B 17/12* (2006.01)
*F23N 5/12* (2006.01)

(52) U.S. Cl.
CPC .......... *F23N 5/123* (2013.01); *G08B 17/125* (2013.01); *F23N 2023/10* (2013.01); *F23N 2023/42* (2013.01); *Y02T 50/677* (2013.01)

(58) Field of Classification Search
CPC .. F23N 5/123; F23N 2023/10; F23N 2023/42; G08B 17/125; Y02T 50/677
USPC ........................................................ 340/577
See application file for complete search history.

(56) References Cited

U.S. PATENT DOCUMENTS

| | | | |
|---|---|---|---|
| 307,031 A | 10/1884 | Edison | |
| 803,684 A | 11/1905 | Fleming | |
| 1,077,628 A | 11/1913 | Mershon | |
| 1,688,126 A | 10/1928 | Metcalfe | |
| 2,112,736 A | 3/1938 | Cockrell | |
| 2,136,256 A | 11/1938 | Sweet | |
| 2,709,799 A | 5/1955 | Norton | |
| 2,804,608 A | 8/1957 | Carbauh | |
| 3,301,307 A | 1/1967 | Kobayashi et al. | |
| 3,956,080 A | 5/1976 | Hradcovsky et al. | |
| 4,082,493 A | 4/1978 | Dahlgren | |
| 4,317,487 A | 3/1982 | Merkl | |
| 5,051,590 A * | 9/1991 | Kern | G08B 17/12 250/227.14 |
| 5,300,836 A * | 4/1994 | Cha | C22C 33/0207 327/113 |
| 5,547,369 A * | 8/1996 | Sohma | F23M 11/045 340/577 |
| 6,404,342 B1 | 6/2002 | Planer et al. | |

(Continued)

OTHER PUBLICATIONS

Prediction and Measurement of Electron Density and Collision Frequency in a Weakly Ionised Pine Fire; by Mphale, Mohan, and Heron; Int J Infrared Milli Waves (2007) 28:251-262; DOI 10.1007/s10762-007-9199-7; http://eprints.jcu.edu.au/2655/1/17300_Mphale_et_al_2007.

(Continued)

*Primary Examiner* — Zhen Y Wu

(57) ABSTRACT

This invention relates to the field of sensing flames in equipment using a combustion burner such as gas furnaces by using the electrical properties of flames. In a first group of embodiments flame rectification is used to cause distortion of a signal having a selected waveform. A harmonic of the distorted waveform is detected thereby providing flame proof. In a second group of embodiments flame rectification is used as a mixer to cause two signals having selected waveforms to produce sum and difference signals. The sum and/or difference signals are detected thereby providing flame proof.

18 Claims, 66 Drawing Sheets

(56) References Cited

U.S. PATENT DOCUMENTS

| | | | | |
|---|---|---|---|---|
| 6,486,486 | B1* | 11/2002 | Haupenthal | F23N 5/082 250/554 |
| 6,501,383 | B1* | 12/2002 | Haupenthal | F23N 5/123 340/577 |
| 8,310,801 | B2 | 11/2012 | McDonald et al. | |
| 2008/0266000 | A1* | 10/2008 | Ngo | H03L 7/093 331/25 |
| 2012/0280134 | A1* | 11/2012 | Diebold | F23N 5/082 250/372 |
| 2014/0085503 | A1* | 3/2014 | Su | G03B 7/16 348/223.1 |
| 2014/0162197 | A1* | 6/2014 | Krichtafovitch | F23C 99/001 431/2 |
| 2015/0362177 | A1* | 12/2015 | Krichtafovitch | F23C 99/001 431/8 |

OTHER PUBLICATIONS

Conduction of Electricity Through Gases by J. J. Thomson; Cambridge Cambridge University Press; 1903,1906; Chapter IX Ionization in Gases from Flames; p. 228, PDF p. 8; http://trove.nla.gov.au/goto?i=book&w=808233&d=http%3A%2F%2Fopenlibrary.org%2Fbooks%2FOL7102511M.

About Plasmas from the Coalition for Plasma Science; Plasma and Flames—The Burning Question; http://www.plasmacoalition.org/plasma_writeups/flame.pdf.

Plasma Fundamentals and Applications; by Dr. I.J. Van Der Walt, Senior Scientist Necsa contains a chart (PDF p. 8) http://www.nstf.org.za/ShowProperty?nodePath=/NSTF%20Repository/NSTF/files/ScienceCouncils/2012/PlasmaFundamentals.pdf.

Introduction to Combustion; by Stephen R. Turns, McGraw Hill Education (India); p. 108, PDF p. 3; p. 159, bottom of PDF p. 5.

Burning Sulfur Compounds; Banks Engineering—Tulsa; http://www.banksengineering.com/Burning%20Sulfur%20Compounds.pdf.

Alkali metal halide, Wikipedia Jan. 19, 2014; http://en.wikipedia.org/wiki/Alkali_metal_halide.

Alkali Metal, Wikipedia Jan. 19, 2014; http://en.wikipedia.org/wiki/Alkali_metal.

Grades of Propane—Gas Purity and Quality http://www.propane101.com/propanegradesandquality.htm.

The Truth About Propane http://www.thriftypropane.com/truthaboutpropane.aspx.

Definition of "Electrolyte" retrieved from Wikipedia Jan. 31, 2014 http://en.wikipedia.org/wiki/Electrolyte.

Dissertation Counter Electromotive Force in the Aluminum Rectifier; Albert Lewis Fitch; Press of the New Era Printing Co.; Lancaster, Pa; 1917; pp. 15-17).

General Descriptions of Aluminum Electrolytic Capacitors, 1-1 Principles of Aluminum Electrolytic Capacitors' Nichicon; p. 1. http://www.nichicon.co.jp/english/products/pdf/aluminum.pdf.

Batteries and electrochemical capacitors; Hector D. Abruna, Yasukuki Kiya, and Jay C. Henderson; Physics Today Physics Today Dec. 2008, p. 43-47.

Electroplating; from Wikipedia, retrieved Feb. 1, 2014, http://en.wikipedia.org/wiki/Electroplating.

Front pages from datasheets for 5U4GT, 5Y3GT, and 6X4/12X4 vacuum tube rectifiers.

Visual Analyzer 2011 XE Beta 0.3.2—Visual Analyzer is a real time software program that contains a comprehensive set of measurement instruments, including an FFT Analyzer. It runs on a PC running Windows. http://www.sillanumsoft.org/.

The Art of Electronics, Paul Horowitz and Winfield Hill, Cambridge University Press, 1991, pp. 885-886.

Sine-Wave Oscillator, Ron Mancini and Richard Palmer, Texas Instruments, Application Note SLOA060—Mar. 2001; http://www.ti.com/litv/pdf/sloa060.

Datasheet for LM13700, Texas Instruments, Figure 37 Sinusoidal VCO. http://www.ti.com/cn/lit/gpn/lm13700.

\* cited by examiner

Instrumentation Amplifier

Methane Combustion 165

Table 5.4 (continued)

| No. | Reaction | Forward Rate Coefficient | | |
|---|---|---|---|---|
| | | A | b | E |
| *N-Containing Reactions (continued)* | | | | |
| 201 | $NH_2 + O \rightarrow H + HNO$ | 3.9E + 13 | 0.0 | 0.0 |
| 202 | $NH_2 + H \rightarrow NH + H_2$ | 4.00E + 13 | 0.0 | 3,650 |
| 203 | $NH_2 + OH \rightarrow NH + H_2O$ | 9.00E + 07 | 1.5 | −460 |
| 204 | $NNH \rightarrow N_2 + H$ | 3.30E + 08 | 0.0 | 0.0 |
| 205 | $NNH + M \rightarrow N_2 + H + M$ | 1.30E + 14 | −0.1 | 4,980 |
| 206 | $NNH + O_2 \rightarrow HO_2 + N_2$ | 5.00E + 12 | 0.0 | 0.0 |
| 207 | $NNH + O \rightarrow OH + N_2$ | 2.50E + 13 | 0.0 | 0.0 |
| 208 | $NNH + O \rightarrow NH + NO$ | 7.00E + 13 | 0.0 | 0.0 |
| 209 | $NNH + H \rightarrow H_2 + N_2$ | 5.00E + 13 | 0.0 | 0.0 |
| 210 | $NNH + OH \rightarrow H_2O + N_2$ | 2.00E + 13 | 0.0 | 0.0 |
| 211 | $NNH + CH_3 \rightarrow CH_4 + N_2$ | 2.50E + 13 | 0.0 | 0.0 |
| 212 | $H + NO + M \rightarrow HNO + M$ | 4.48E + 19 | −1.3 | 740 |
| 213 | $HNO + O \rightarrow NO + OH$ | 2.50E + 13 | 0.0 | 0.0 |
| 214 | $HNO + H \rightarrow H_2 + NO$ | 9.00E + 11 | 0.7 | 660 |
| 215 | $HNO + OH \rightarrow NO + H_2O$ | 1.30E + 07 | 1.9 | −950 |
| 216 | $HNO + O_2 \rightarrow HO_2 + NO$ | 1.00E + 13 | 0.0 | 13,000 |
| 217 | $CN + O \rightarrow CO + N$ | 7.70E + 13 | 0.0 | 0.0 |
| 218 | $CN + OH \rightarrow NCO + H$ | 4.00E + 13 | 0.0 | 0.0 |
| 219 | $CN + H_2O \rightarrow HCN + OH$ | 8.00E + 12 | 0.0 | 7,460 |
| 220 | $CN + O_2 \rightarrow NCO + O$ | 6.14E + 12 | 0.0 | −440 |
| 221 | $CN + H_2 \rightarrow HCN + H$ | 2.95E + 05 | 2.5 | 2,240 |
| 222 | $NCO + O \rightarrow NO + CO$ | 2.35E + 13 | 0.0 | 0.0 |
| 223 | $NCO + H \rightarrow NH + CO$ | 5.40E + 13 | 0.0 | 0.0 |
| 224 | $NCO + OH \rightarrow NO + H + CO$ | 2.50E + 12 | 0.0 | 0.0 |
| 225 | $NCO + N \rightarrow N_2 + CO$ | 2.00E + 13 | 0.0 | 0.0 |
| 226 | $NCO + O_2 \rightarrow NO + CO_2$ | 2.00E + 12 | 0.0 | 20,000 |
| 227 | $NCO + M \rightarrow N + CO + M$ | 3.10E + 14 | 0.0 | 54,050 |
| 228 | $NCO + NO \rightarrow N_2O + CO$ | 1.90E + 17 | −1.5 | 740 |
| 229 | $NCO + NO \rightarrow N_2 + CO_2$ | 3.80E + 18 | −2.0 | 800 |
| 230 | $HCN + M \rightarrow H + CN + M$ | 1.04E + 29 | −3.3 | 126,600 |
| 231 | $HCN + O \rightarrow NCO + H$ | 2.03E + 04 | 2.6 | 4,980 |
| 232 | $HCN + O \rightarrow NH + CO$ | 5.07E + 03 | 2.6 | 4,980 |
| 233 | $HCN + O \rightarrow CN + OH$ | 3.91E + 09 | 1.6 | 26,600 |
| 234 | $HCN + OH \rightarrow HOCN + H$ | 1.10E + 06 | 2.0 | 13,370 |
| 235 | $HCN + OH \rightarrow HNCO + H$ | 4.40E + 03 | 2.3 | 6,400 |
| 236 | $HCN + OH \rightarrow NH_2 + CO$ | 1.60E + 02 | 2.6 | 9,000 |
| 237 | $H + HCN + M \rightarrow H_2CN + M$ | pressure dependent | | |
| 238 | $H_2CN + N \rightarrow N_2 + CH_2$ | 6.00E + 13 | 0.0 | 400 |
| 239 | $C + N_2 \rightarrow CN + N$ | 6.30E + 13 | 0.0 | 46,020 |
| 240 | $CH + N_2 \rightarrow HCN + N$ | 3.12E + 09 | 0.9 | 20,130 |
| 241 | $CH + N_2 (+ M) \rightarrow HCNN (+ M)$ | pressure dependent | | |
| 242 | $CH_2 + N_2 \rightarrow HCN + NH$ | 1.00E + 13 | 0.0 | 74,000 |
| 243[b] | $CH_2(S) + N_2 \rightarrow NH + HCN$ | 1.00E + 11 | 0.0 | 65,000 |

Figure 14 (from Turns)

Table 1

Table 17.12 Composition (mol%) and properties of natural gas from sources in the United States [28][a]

| Location | $CH_4$ | $C_2H_6$ | $C_3H_8$ | $C_4H_{10}$ | $CO_2$ | $N_2$ | Density[c] $(kg/m^3)$ | HHV[d] $(kJ/M^3)$ | HHV[d] $(kJ/hg)$ |
|---|---|---|---|---|---|---|---|---|---|
| Alaska | 99.6 | — | — | — | — | 0.4 | 0.686 | 37,590 | 54,800 |
| Birmingham, | 90.0 | 5.0 | — | — | — | 5.0 | 0.735 | 37,260 | 50,690 |
| East Ohio[b] | 94.1 | 3.01 | 0.42 | 0.28 | 0.71 | 1.41 | 0.723 | 38,260 | 52,940 |
| Kansas City, | 84.1 | 6.7 | — | — | 0.8 | 8.4 | 0.772 | 36,140 | 46,830 |
| Pittsburgh, | 83.4 | 15.8 | — | — | — | 0.8 | 0.772 | 41,840 | 54,215 |

[a] Although not explicitly stated in Ref. [28], these gases appear to be pipeline gases.
[b] Also contains 0.01 % $H_2$ and 0.01% $O_2$.
[c] At 1 atm and 15.6°C (60 F).
[d] Higher heating values for 1 atm and 15.6°C (60 F) [28].

Figure 15 (Turns Table 17.12)

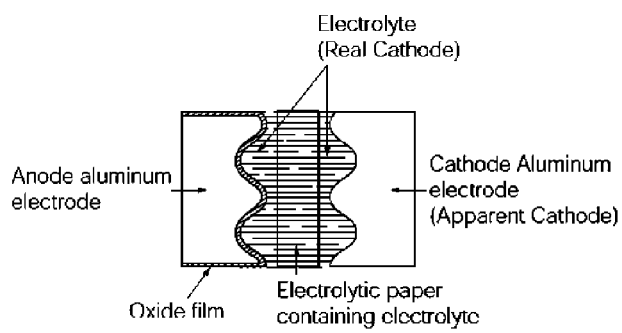

Fig. 1 - 1

Figure 16 (Nichicon Figure 1-1)

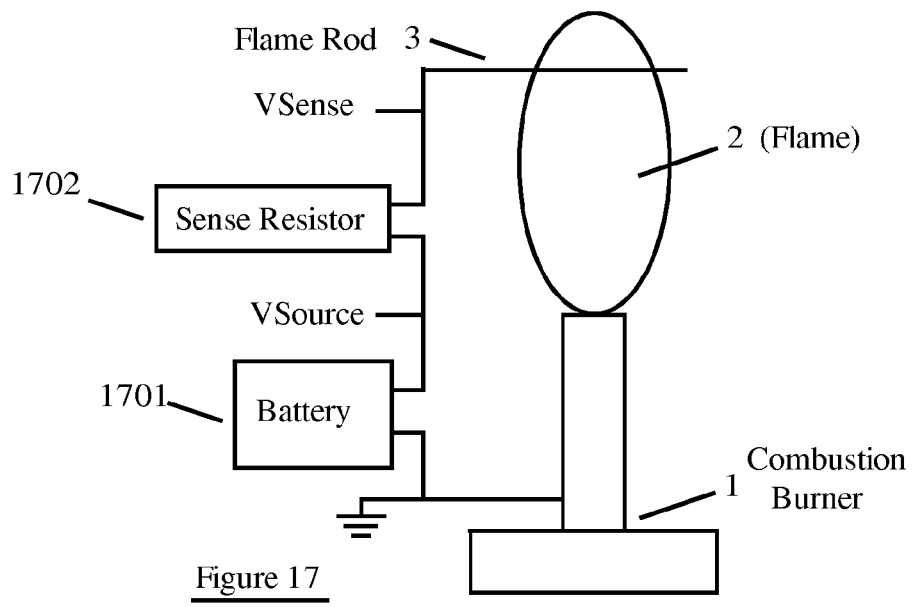
Figure 17
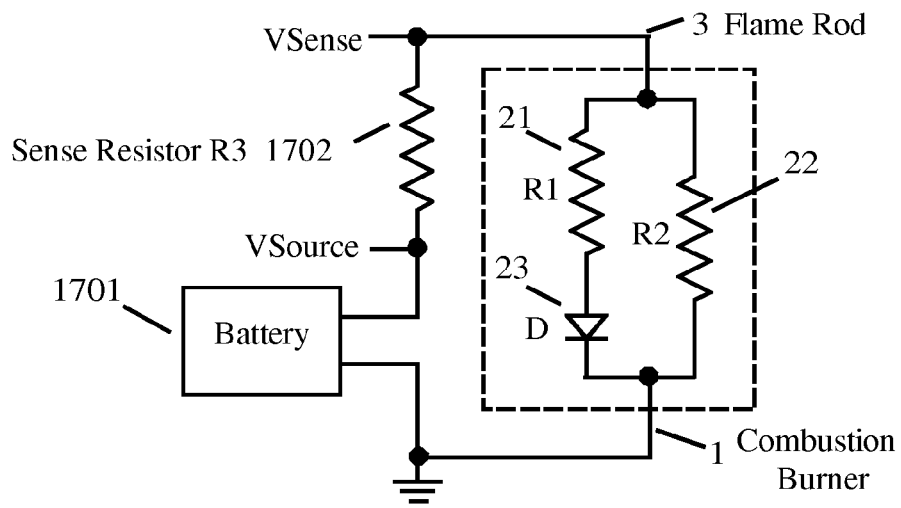
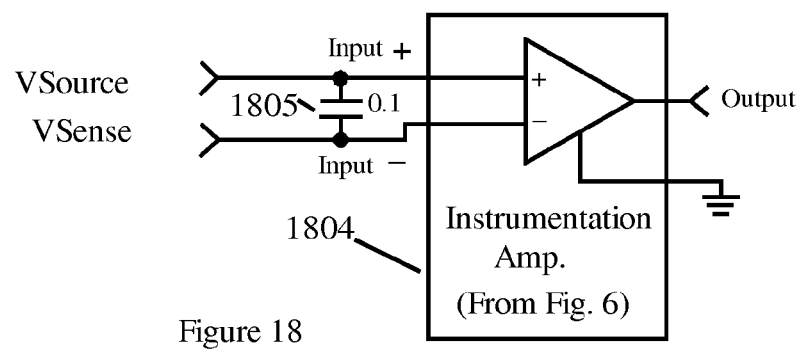
Figure 18

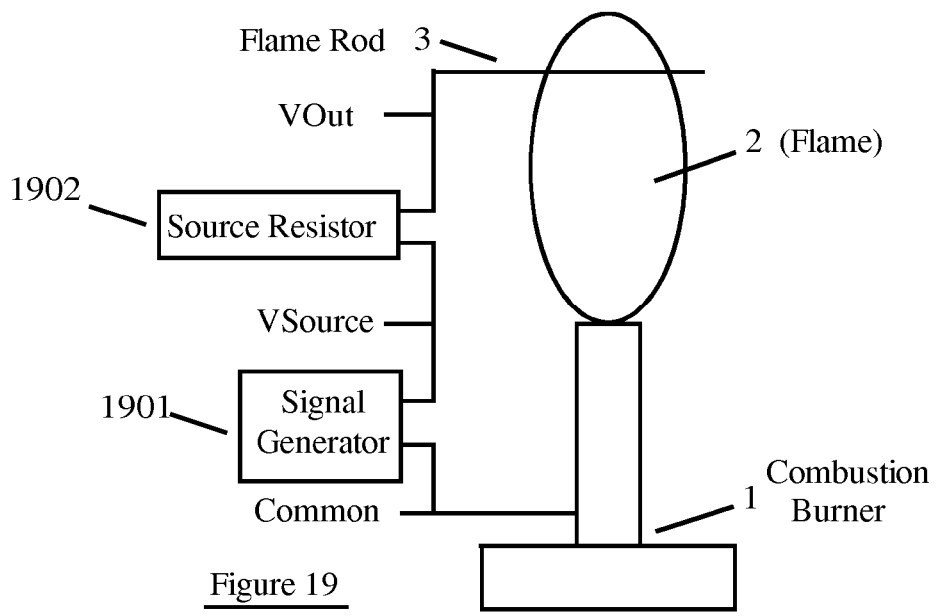
Figure 19
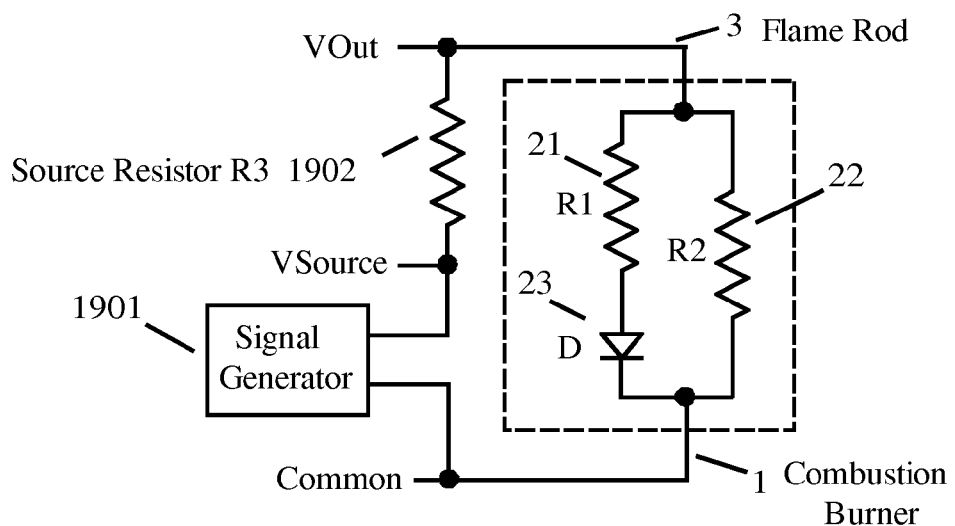
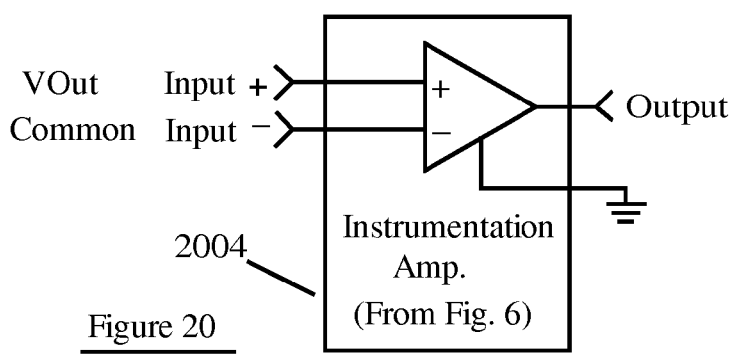
Figure 20

Experiment 2   -1.27V  open circuit

Experiment 2   0.68 V (4.3 megohm load)

Experiment 3   -40 mV

Experiment 3   +1.39 V

Experiment 4    100 Hz    +2.79 V to -7.2 V

Experiment 4    Leading Edge  -960 mV to 0 V

Experiment 4  Trailing Edge  -640 mV to -1.20 V

Experiment 4   200 Hz   +2.24 V to -6.88 V

Experiment 4   Leading Edge   -760 mV to -120 mV

Experiment 4   Trailing Edge   -680 mV to -1.39 mV

Experiment 4   400 Hz   +1.84 V to -6.32 V

Experiment 4   Leading Edge -440 mV to +200 mV

Experiment 4   Trailing Edge   -1.63 V to -2.0 V

Experiment 4   1KHz   +0.920 V to -4.88 V

Experiment 4  Leading Edge -340 mV to +440 mV

Experiment 4   Trailing Edge – Indistinct

Table 4 - Thermionic Emission Test – 5U4GB Vacuum Tube

| 5U4GB | #1 Westinghouse | 1/12/14 | jm |
|---|---|---|---|
| | | | |
| 2 | Filament(2) | 0V | +5 VDC 2.94A |
| 8 | Filament(8) | +5 VDC 2.93A | 0V |
| | | | |
| 2 | Filament(2) | Ref | Ref |
| 4 | Plate 1 | -0.93V | -3.46V |
| 6 | Plate 2 | -0.01V | -5.59V |
| | | | |
| 8 | Filament(8) | Ref | Ref |
| 4 | Plate 1 | -5.68V | -0.09V |
| 6 | Plate 2 | -3.30V | -0.84V |

Figure 29

Table 5 - Thermionic Emission Test – 5Y3 Vacuum Tube

| 5Y3 | #1 RCA | 1/12/2014 | jm |
|---|---|---|---|
| | | | |
| 2 | Filament(2) | 0V | +5 VDC 2.00A |
| 8 | Filament(8) | +5 VDC 1.98A | 0V |
| | | | |
| 2 | Filament(2) | Ref | Ref |
| 4 | Plate 1 | -0.61V | -3.04V |
| 6 | Plate 2 | 0.0V | -5.25V |
| | | | |
| 8 | Filament(8) | Ref | Ref |
| 4 | Plate 1 | -5.37V | 0.0V |
| 6 | Plate 2 | -3.00V | -0.51V |

Figure 30

Table 6 - Thermionic Emission Test – 6X4 Vacuum Tube

| 6X4 #1 Raytheon | | 1/13/14 jm | | | | |
|---|---|---|---|---|---|---|
| 3 | Filament(3) | 0V | | 3 | Filament(3) | +6.3DC 0.60A |
| 4 | Filament(4) | +6.3VDC 0.59A | | 4 | Filament(4) | 0V |
| | | | | | | |
| 7 | Cathode | Ref | | 7 | Cathode | Ref |
| 6 | Plate 1 | -0.91V | | 6 | Plate 1 | -0.92V |
| 1 | Plate 2 | -1.14V | | 1 | Plate 2 | -1.17V |
| | | | | | | |
| 7,3 | Cathode, Filament(3) | Ref | | 7,3 | Cathode, Filament(3) | Ref |
| 6 | Plate 1 | -0.91V | | 6 | Plate 1 | -0.93V |
| 1 | Plate 2 | -1.16V | | 1 | Plate 2 | -1.18V |
| | | | | | | |
| 7,4 | Cathode, Filament(4) | Ref | | 7,4 | Cathode, Filament(4) | Ref |
| 6 | Plate 1 | -0.91V | | 6 | Plate 1 | -0.93V |
| 1 | Plate 2 | -1.16V | | 1 | Plate 2 | -1.19V |
| | | | | | | |
| 3 | Filament(3) | Ref | | 3 | Filament(3) | Ref |
| 7 | Cathode | +2.50V | | 7 | Cathode | -3.67V |
| | | | | | | |
| 4 | Filament(4) | Ref | | 4 | Filament(4) | Ref |
| 7 | Cathode | -3.66V | | 7 | Cathode | +2.52V |

Figure 31

Table 7 - Thermionic Emission Test – 12X4 Vacuum Tube

| 12X4 #1 RCA | | 01/13/2014 jm | | | | |
|---|---|---|---|---|---|---|
| 3 | Filament | 0V | | 3 | Filament | +12.6 VDC 0.32A |
| 4 | Filament | +12.6 VDC 0.32A | | 4 | Filament | 0V |
| | | | | | | |
| 7 | Cathode | Ref | | 7 | Cathode | Ref |
| 6 | Plate 1 | -1.17V | | 6 | Plate 1 | -1.17V |
| 1 | Plate 2 | -1.04V | | 1 | Plate 2 | -1.05V |
| | | | | | | |
| 7,3 | Cathode, Filament(3) | Ref | | 7,3 | Cathode, Filament(3) | Ref |
| 6 | Plate 1 | -1.17V | | 6 | Plate 1 | -1.17V |
| 1 | Plate 2 | -1.04V | | 1 | Plate 2 | -1.05V |
| | | | | | | |
| 7,4 | Cathode, Filament(4) | Ref | | 7,4 | Cathode, Filament(4) | Ref |
| 6 | Plate 1 | -1.17V | | 6 | Plate 1 | -1.17V |
| 1 | Plate 2 | -1.05V | | 1 | Plate 2 | -1.05V |
| | | | | | | |
| 3 | Filament(3) | Ref | | 3 | Filament(3) | Ref |
| 7 | Cathode | +1.66V | | 7 | Cathode | -4.70V |
| | | | | | | |
| 4 | Filament(4) | Ref | | 4 | Filament(4) | Ref |
| 7 | Cathode | -4.70V | | 7 | Cathode | +1.83V |

Figure 32

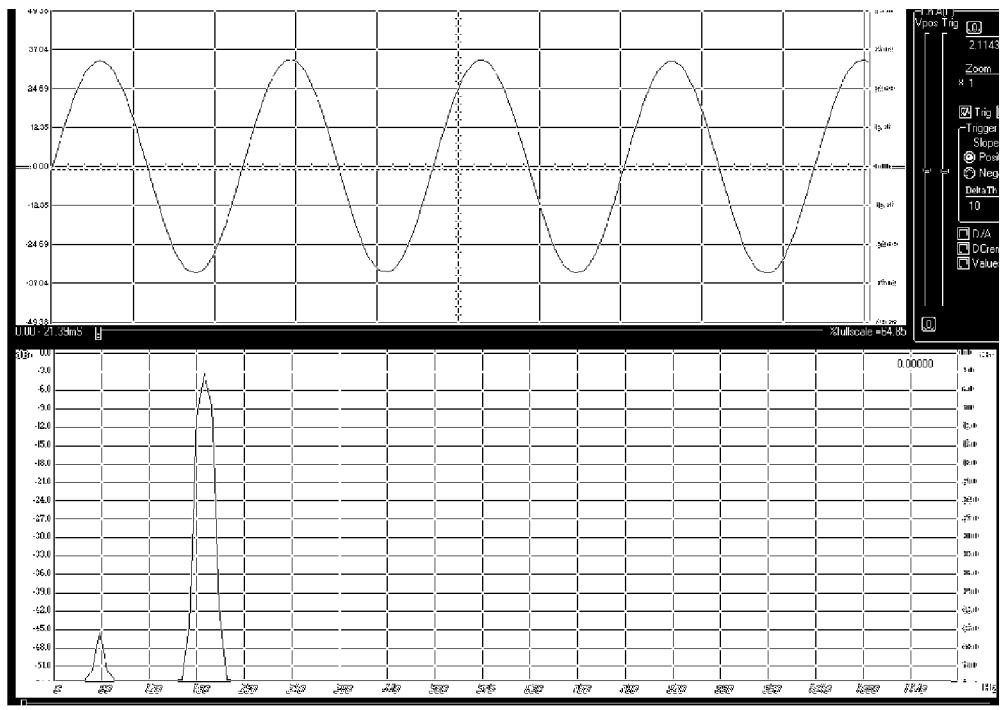
Figure 33a  200 Hz; 10 Megohm Source; Sine Wave; No Flame
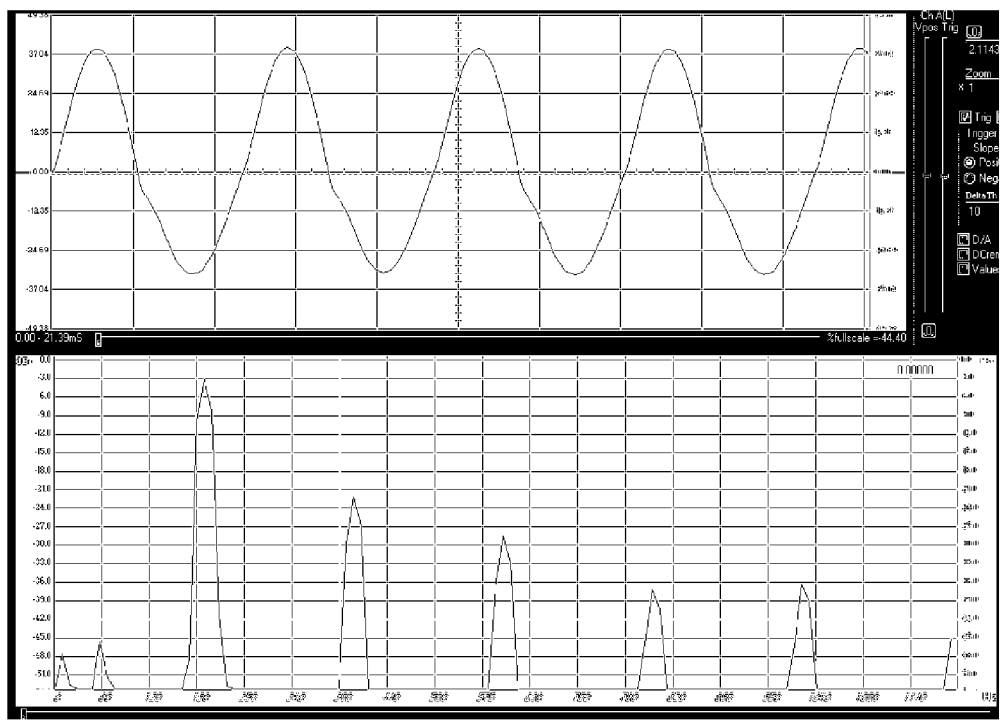
Figure 33b  200 Hz; 10 Megohm Source; Sine Wave; Flame

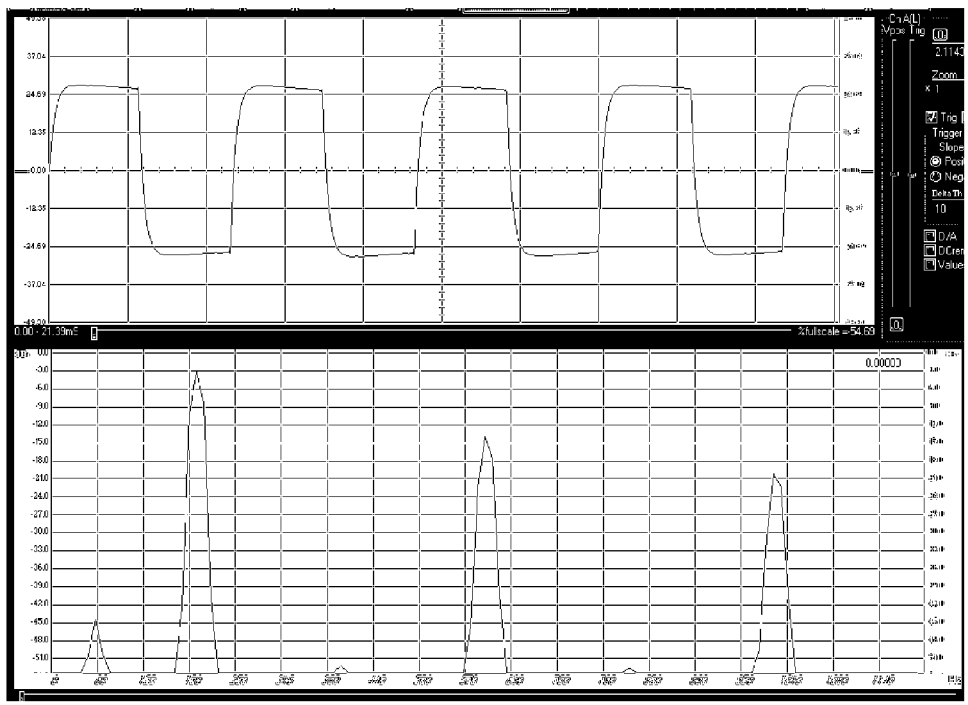
Figure 34a    200 Hz; 10 Megohm Source; Square Wave; No Flame
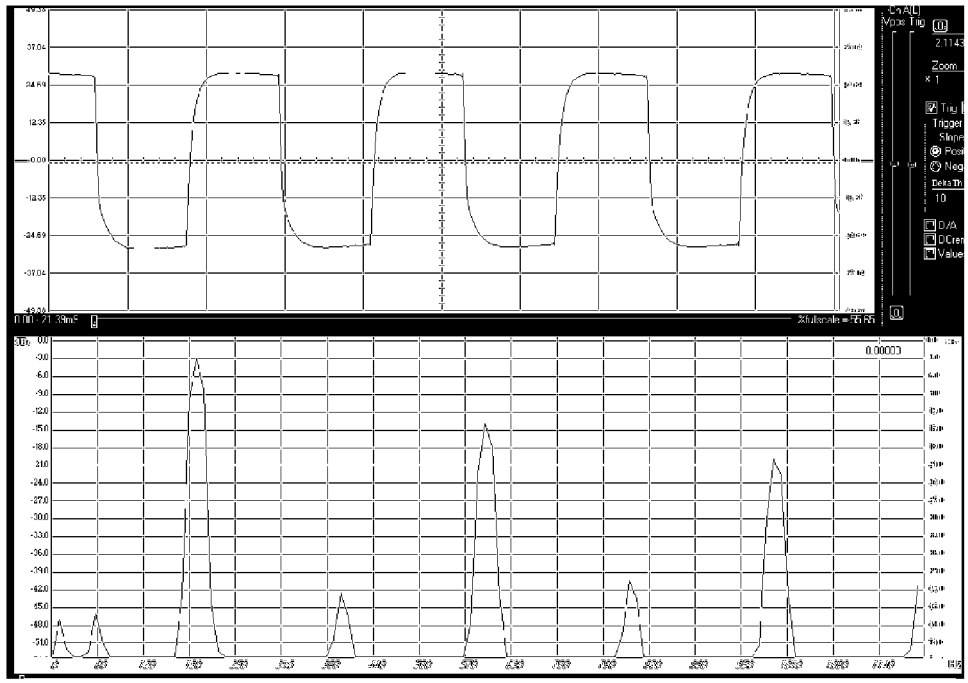
Figure 34b    200 Hz; 10 Megohm Source; Square Wave; Flame

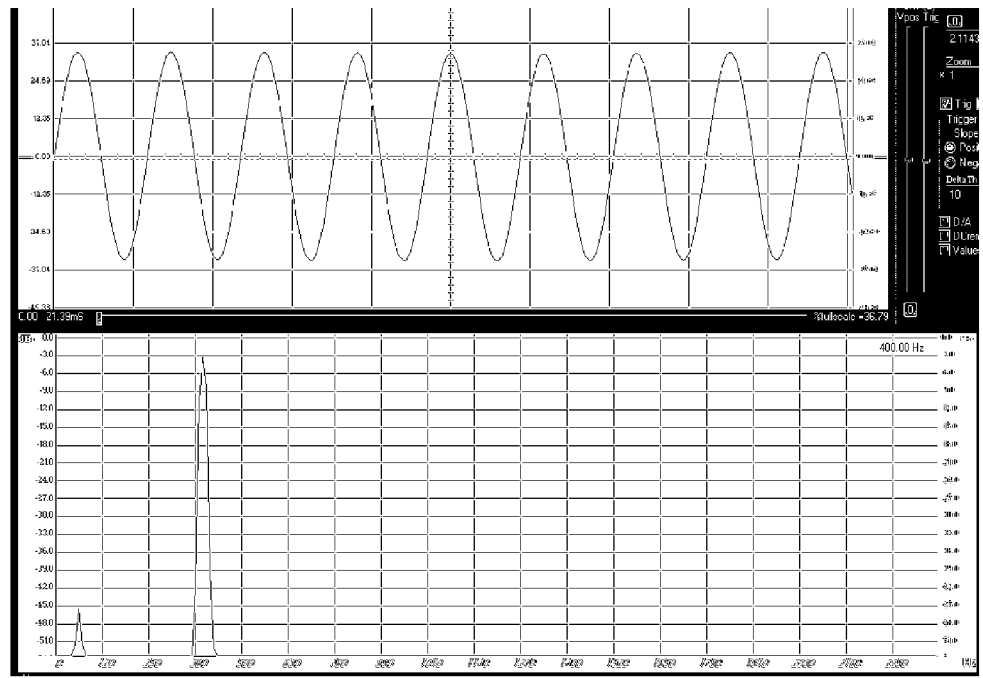
Figure 35a     400 Hz; 10 Megohm Source; Sine Wave; No Flame
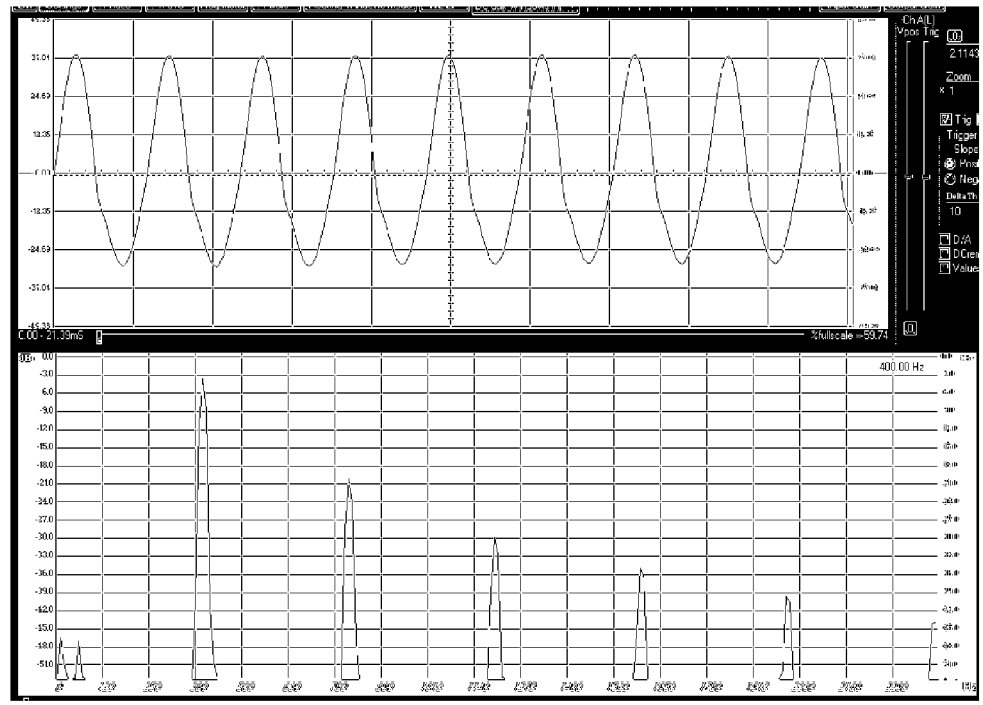
Figure 35b     400 Hz; 10 Megohm Source; Sine Wave; Flame

Figure 36a    400 Hz; 10 Megohm Source; Square Wave; No Flame
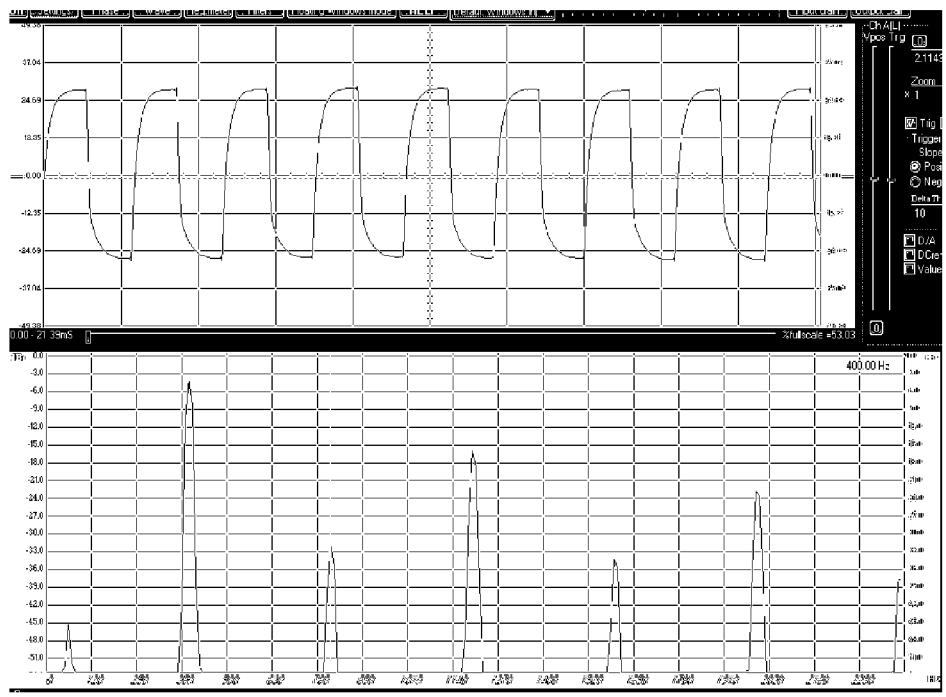
Figure 36b    400 Hz; 10 Megohm Source; Square Wave; Flame

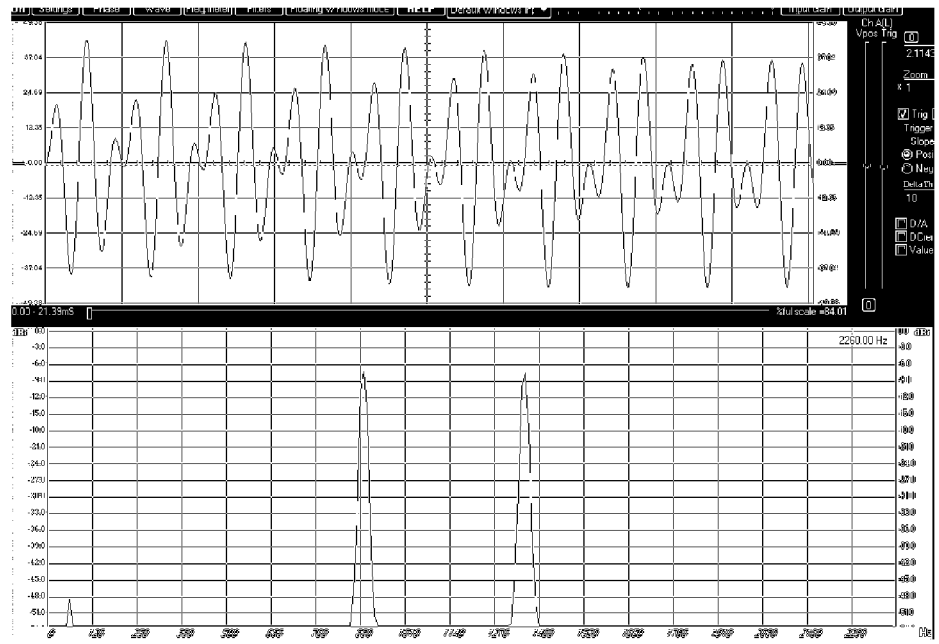
Figure 39a  Mixer Test; Sine Waves (No Flame): 900 Hz (-7 dB); 1,300 Hz (-7 dB)
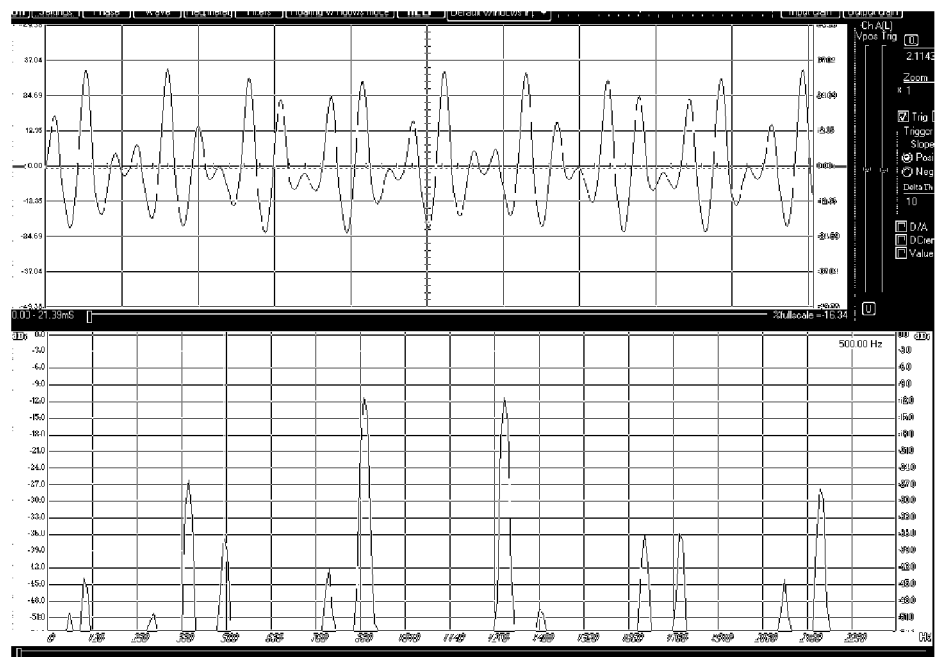
900 Hz (-12 dB); 1,300 Hz (-12 dB); 400 Hz (-27 dB); 2,200 Hz (-27 dB); 500 Hz (-39 dB)
Figure 39b  Mixer Test; Sine Waves (Flame):

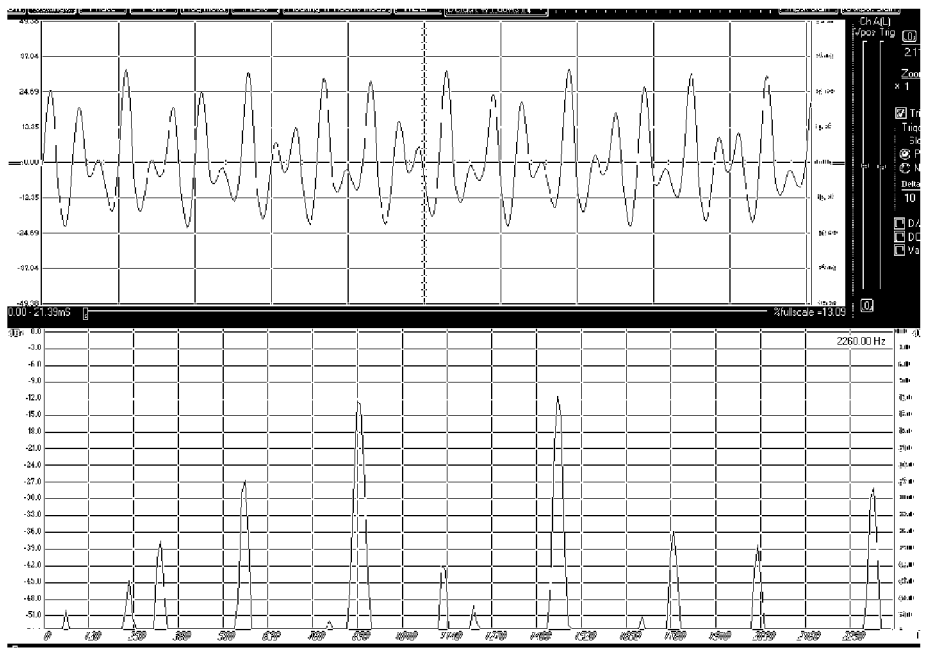
900 Hz (-12dB); 1,460 Hz (-12 dB); 560 Hz (-27 dB); 2,360 Hz (-28 dB); 340 Hz (-37 dB)
Figure 40  Mixer Test; Sine Waves (Flame)
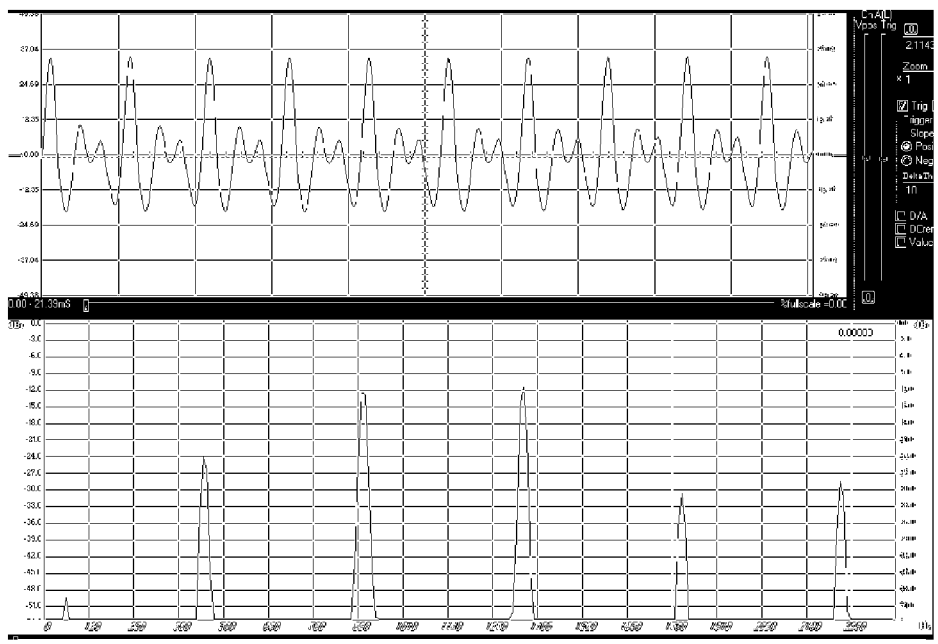
900 Hz (-12dB); 1,350 Hz (-12 dB); 450 Hz (-24 dB); 1,810 Hz (-32 dB); 2,260 Hz (-28 dB)
Figure 41  Mixer Test; Sine Waves (Flame)

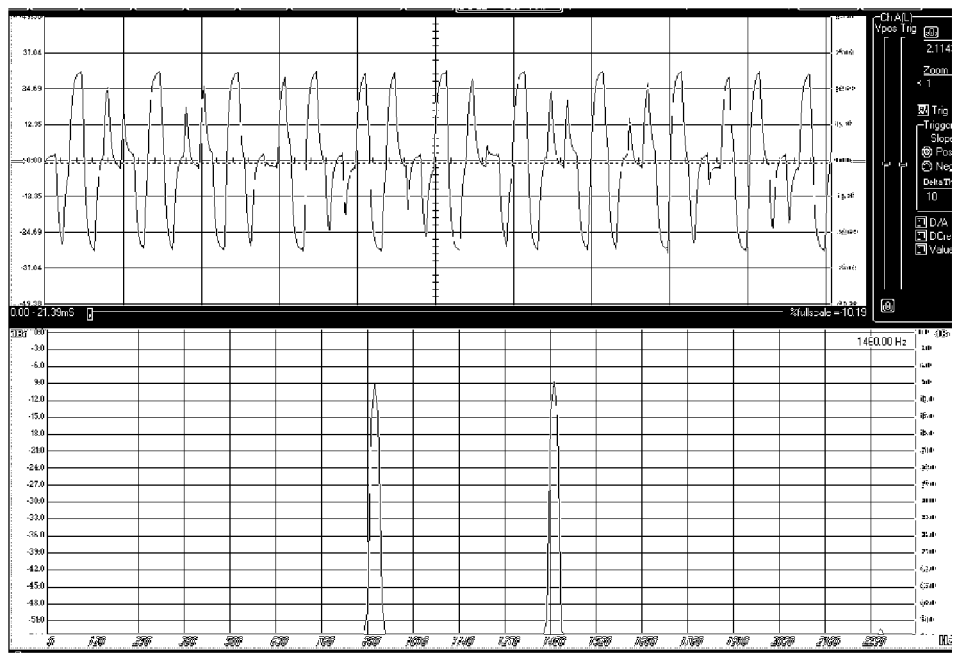
910 Hz (-9 dB); 1,410 Hz (-9 dB)
Figure 42a Mixer Test; Square Waves (No Flame)
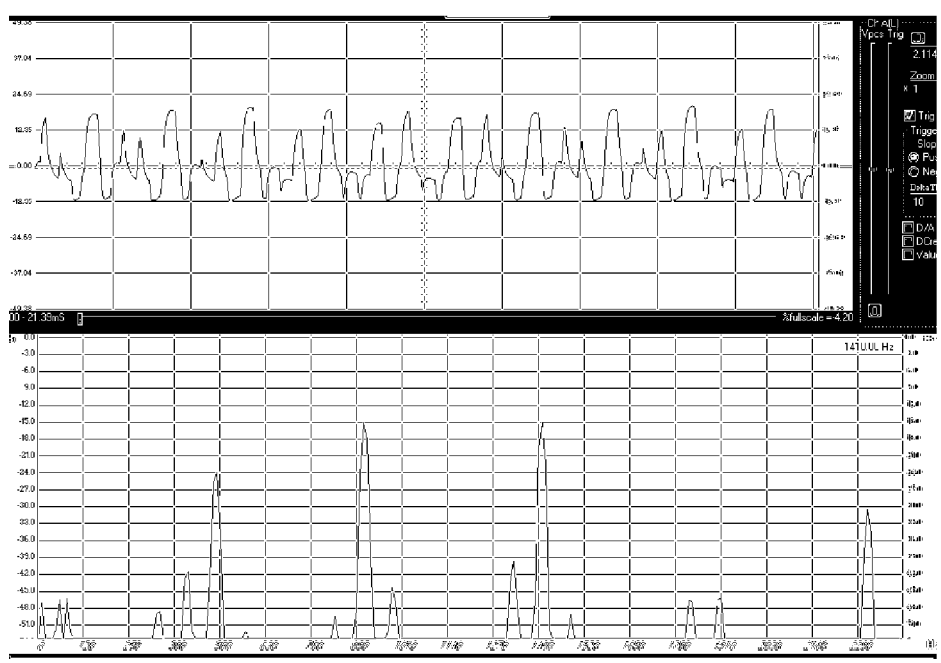
910 Hz (-15 dB); 1410 Hz (-15 dB); 500 Hz (-24 dB); 2,320 (-30 dB); 410 Hz (-41 dB)
Figure 42b Mixer Test; Square Waves (Flame)

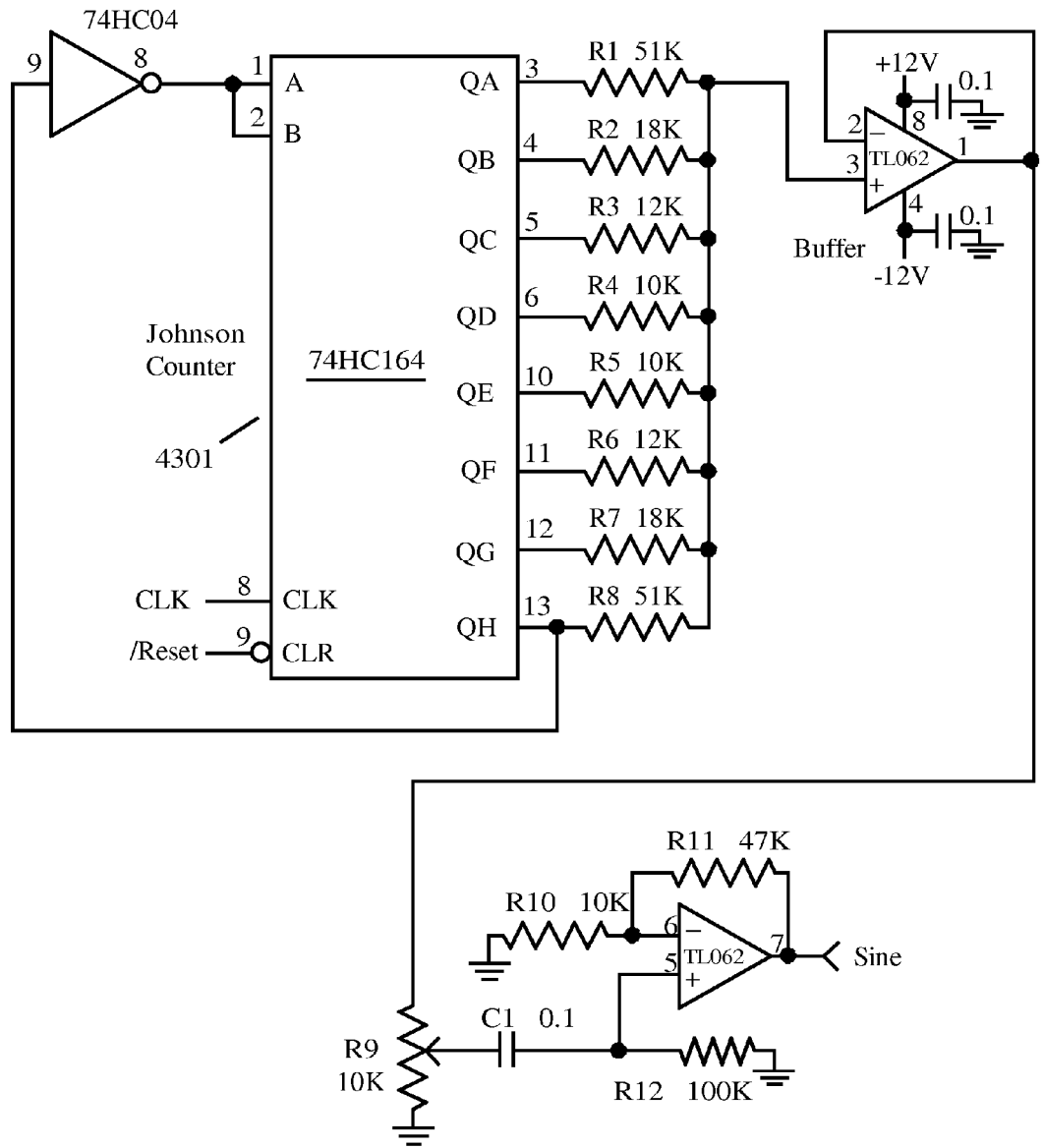
Figure 43a  Sine Wave Generator

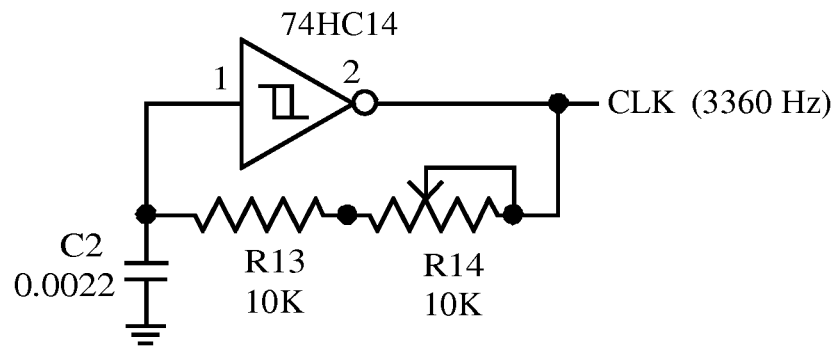
Figure 43b   Oscillator
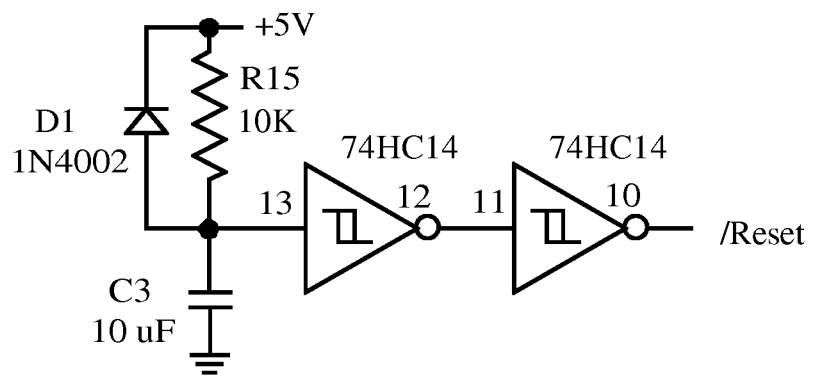
Figure 43c   Reset

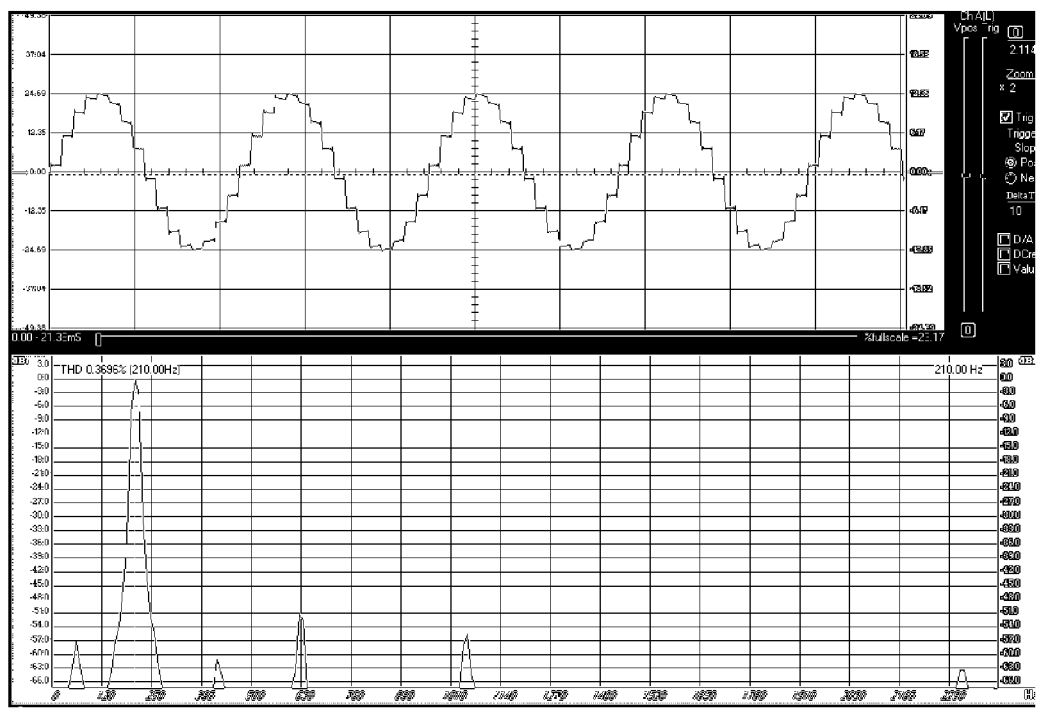
210 Hz Fundamental 0 dB; $2^{nd}$ Harmonic -61 dB; $3^{rd}$ Harmonic -51 dB;
$5^{th}$ Harmonic -54 dB; 60 Hz -57 dB
Figure 44 - Johnson Counter Results

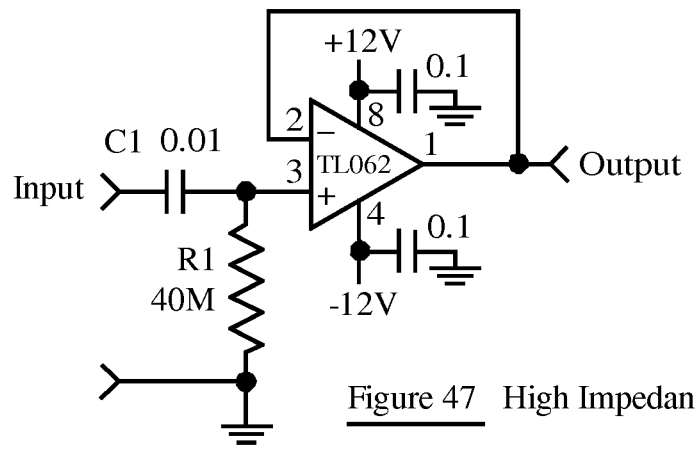
Figure 47  High Impedance Buffer
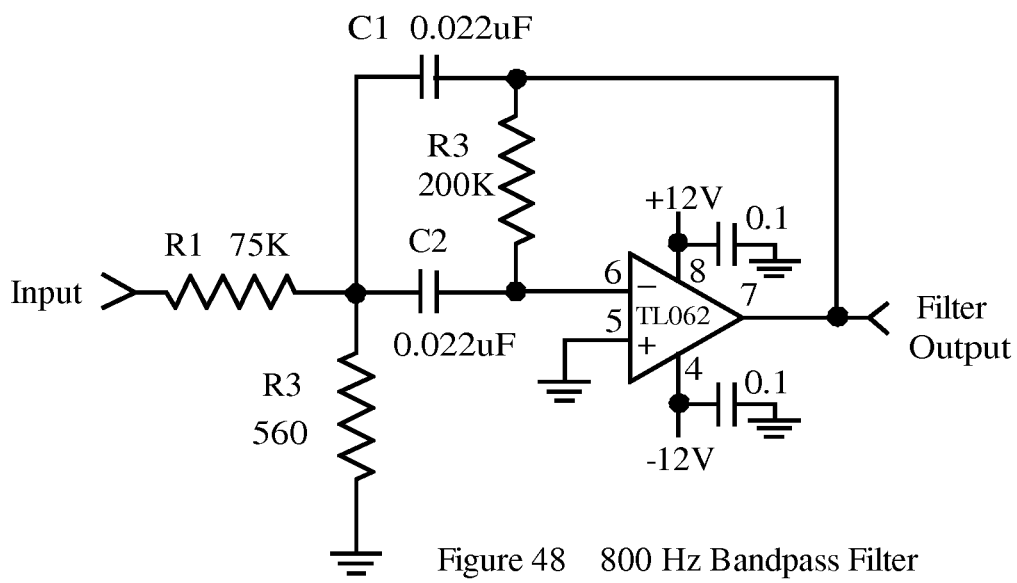
Figure 48  800 Hz Bandpass Filter
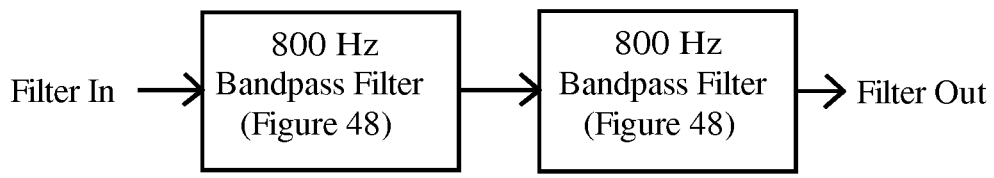
Figure 49  Two Cascaded Bandpass Filters

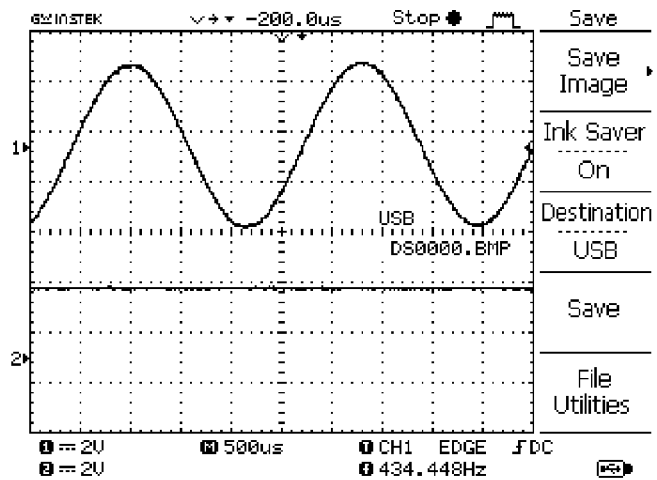
Figure 51a  Sine Wave; 435 Hz; Flame Off
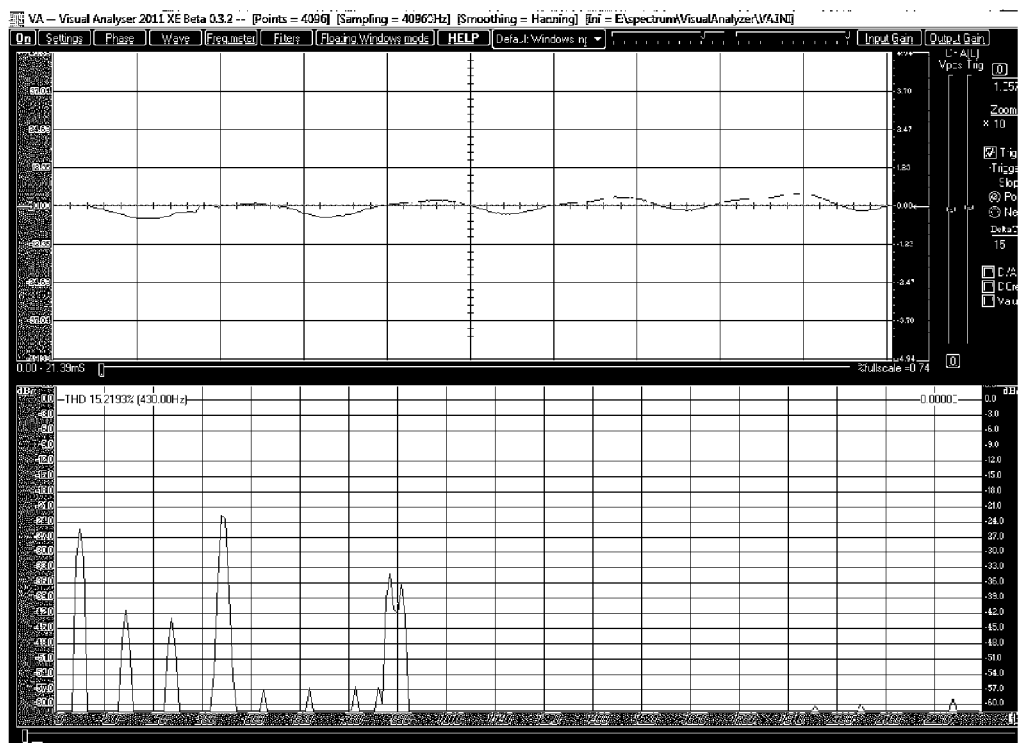
Figure 51b  Sine Wave; 435 Hz; Flame Off

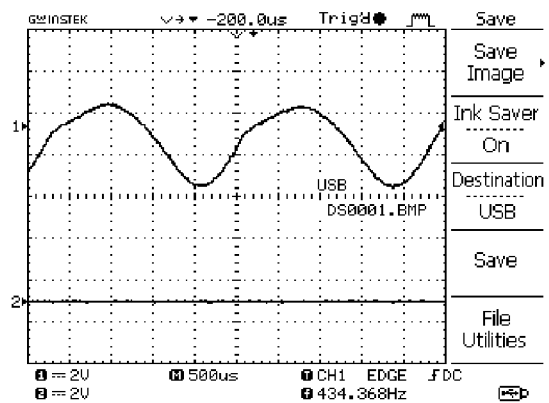
Figure 52a  Sine Wave; 435 Hz; Flame On
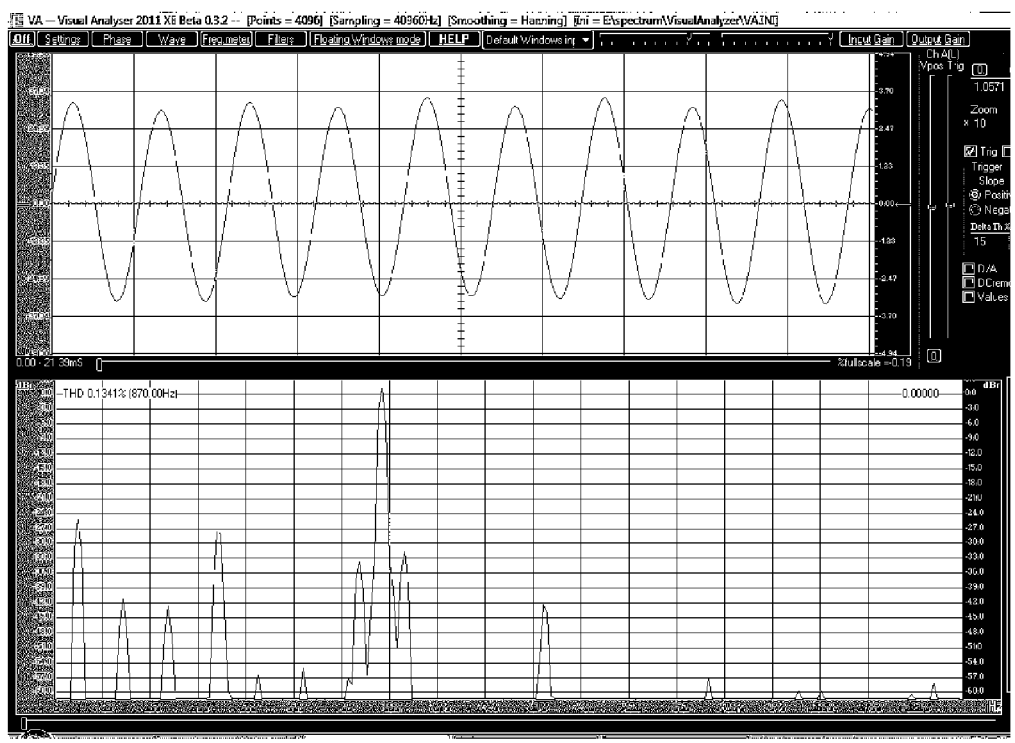
Figure 52b  Sine 435 Hz; Flame On

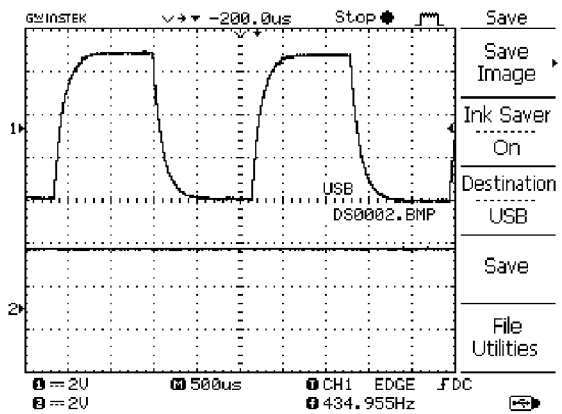
Figure 56a  Square Wave; 435 Hz; Flame Off
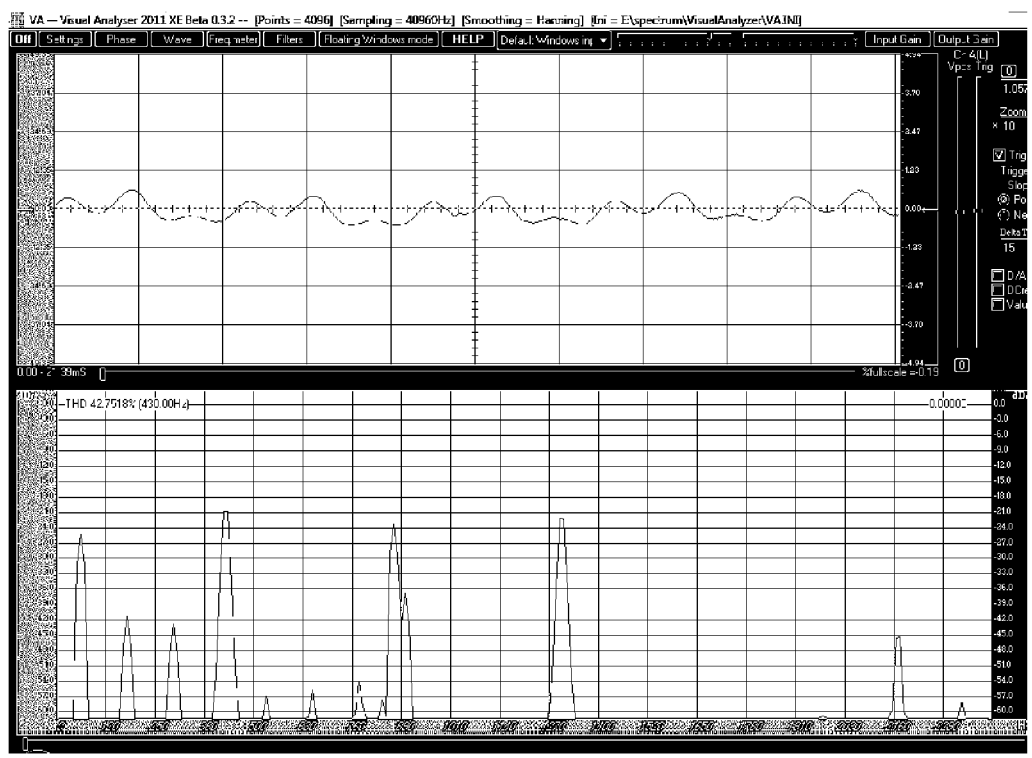
Figure 56b  Square Wave; 435 Hz; Flame Off

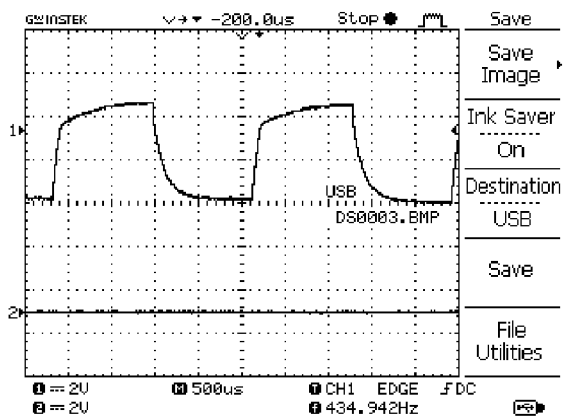
Figure 57a  Square Wave; 435 Hz; Flame On
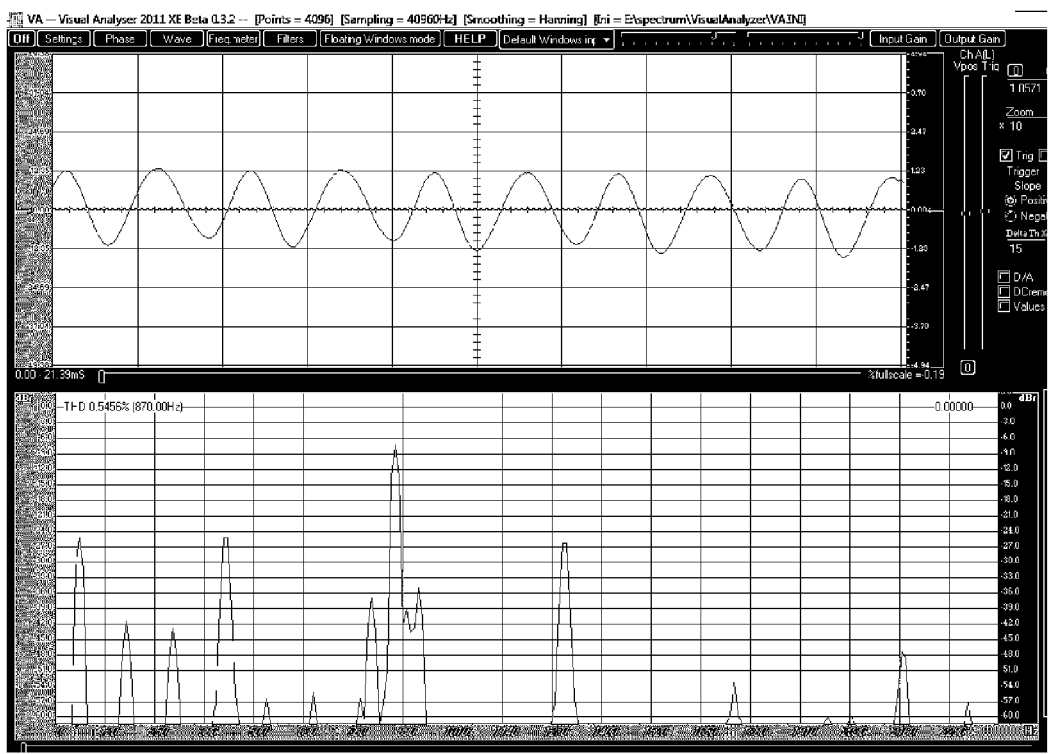
Figure 57b  Square Wave; 435 Hz; Flame On

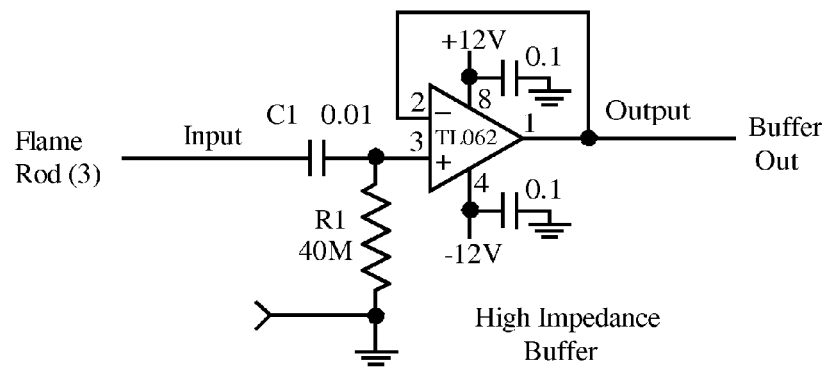
Figure 63
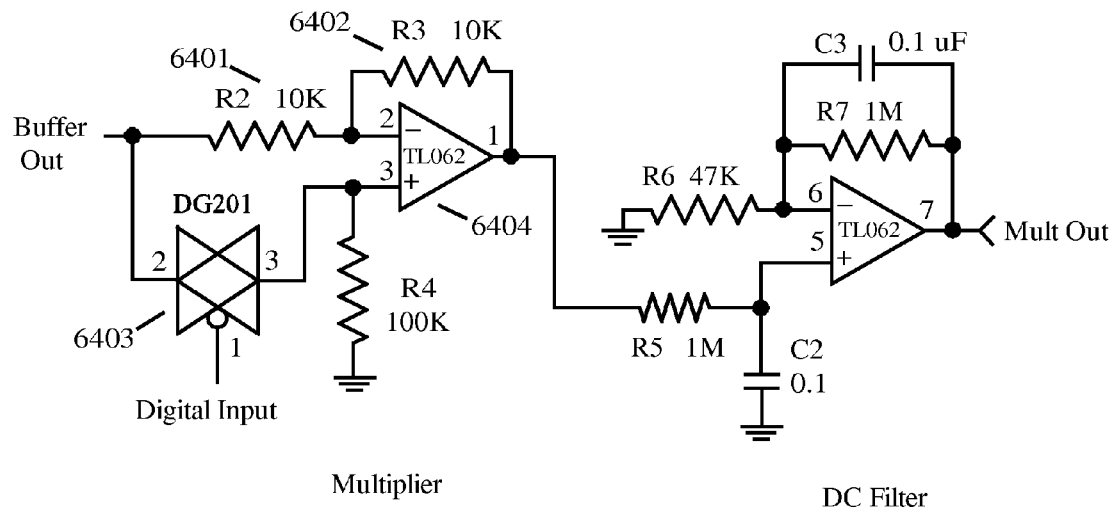
Figure 64    Multiplier and DC Filter

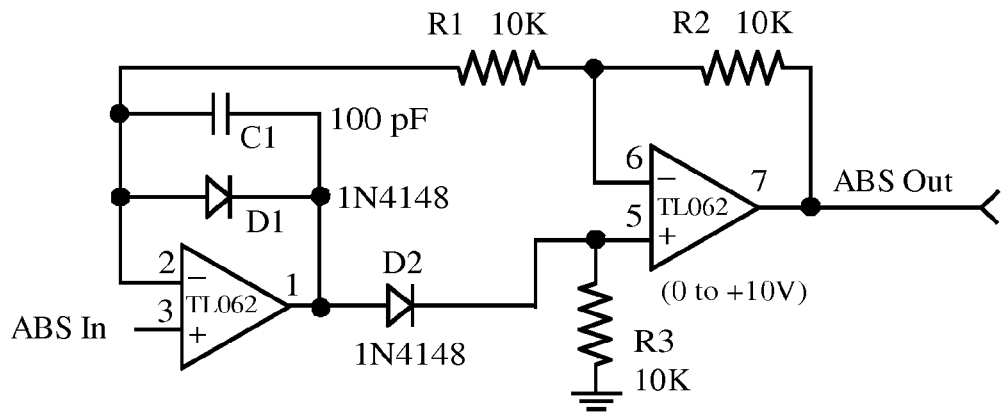
Figure 65    Absolute Value Amp
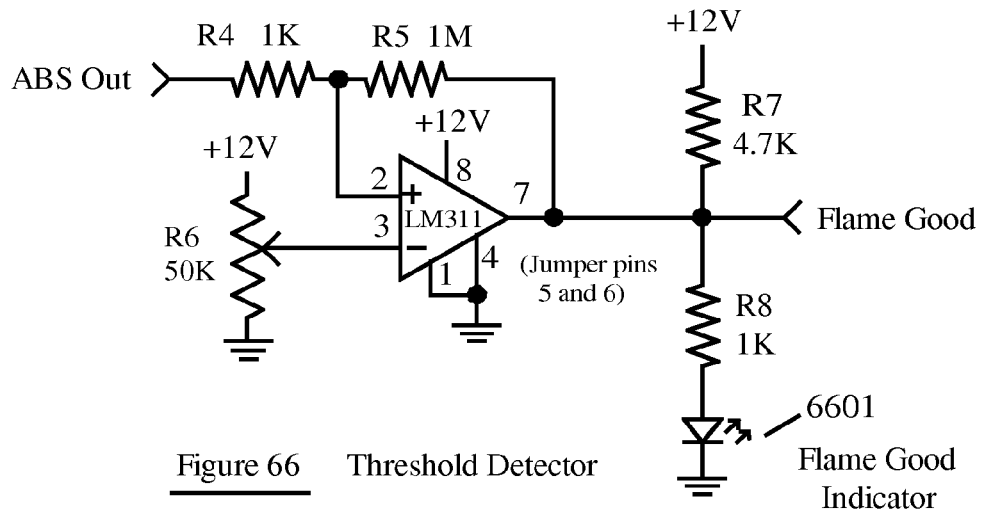
Figure 66    Threshold Detector
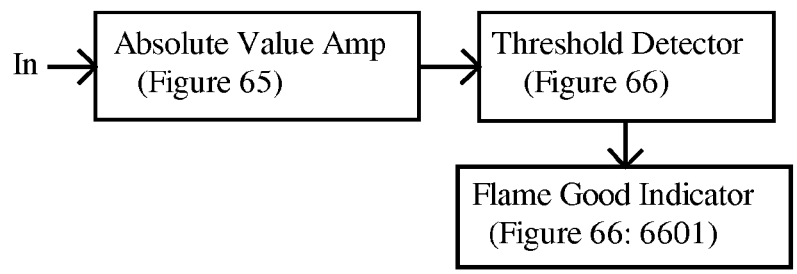
Figure 67    Threshold Detector

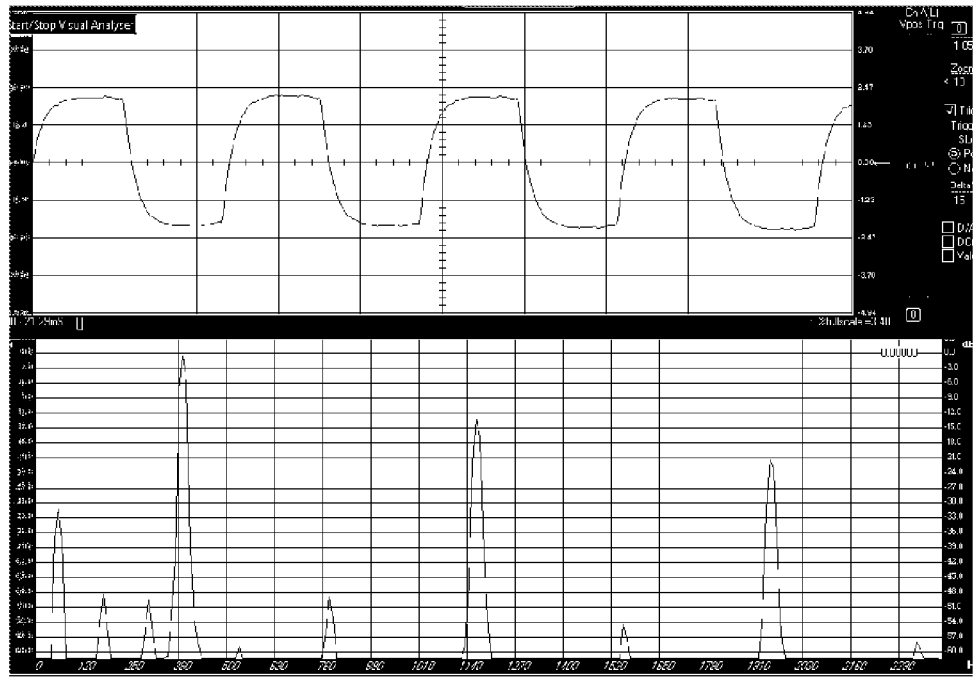
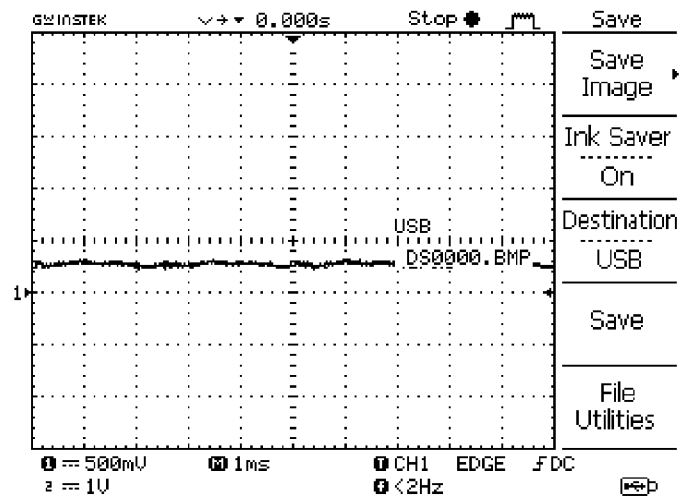
Experiment 14 Detecting a harmonic signal produced by flame rectification;
Signal Source: Symmetrical Square Wave
Detector: Simple Synchronous Detector
Flame: Off
Figure 68a

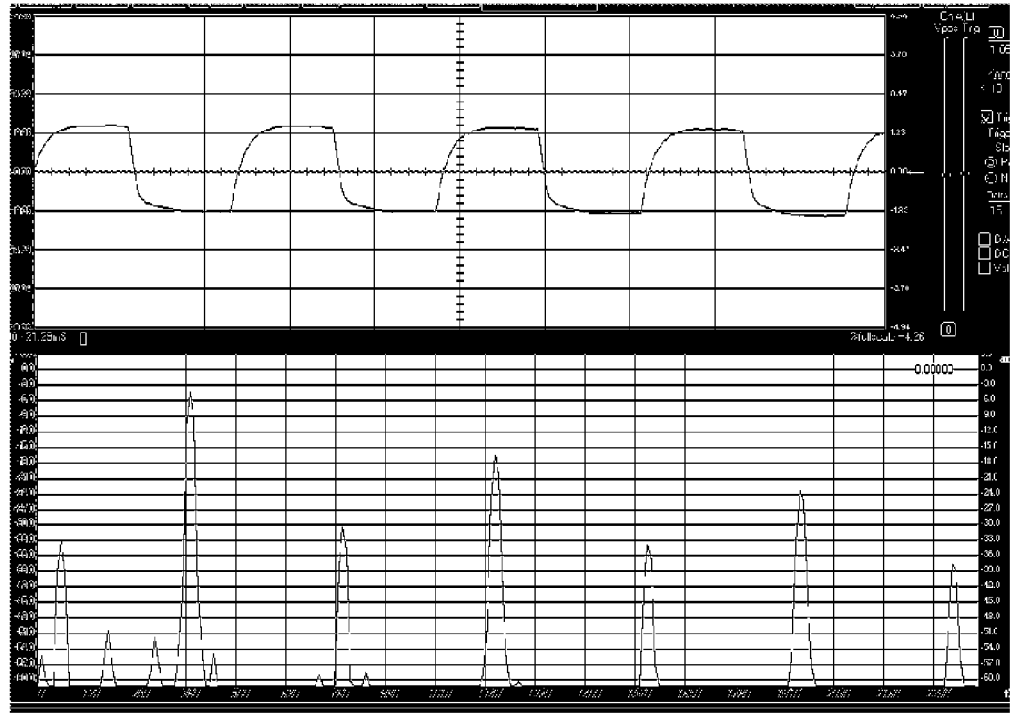
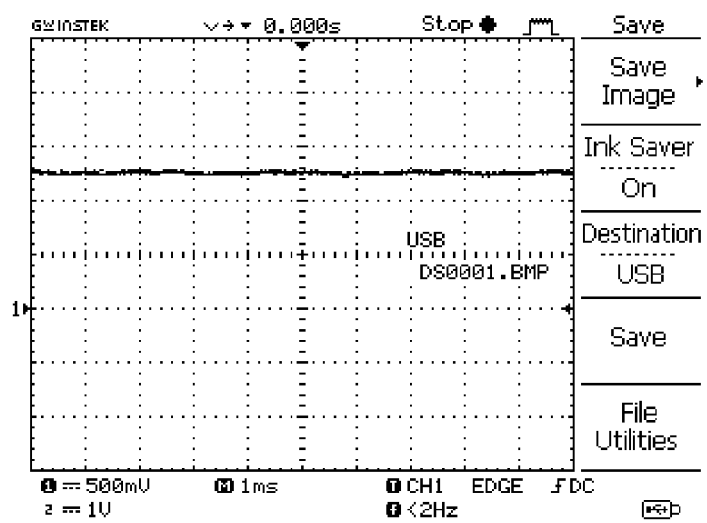
Experiment 14 Detecting a harmonic signal produced by flame rectification;
Signal Source: Symmetrical Square Wave
Detector: Simple Synchronous Detector
Flame: On
Figure 68b

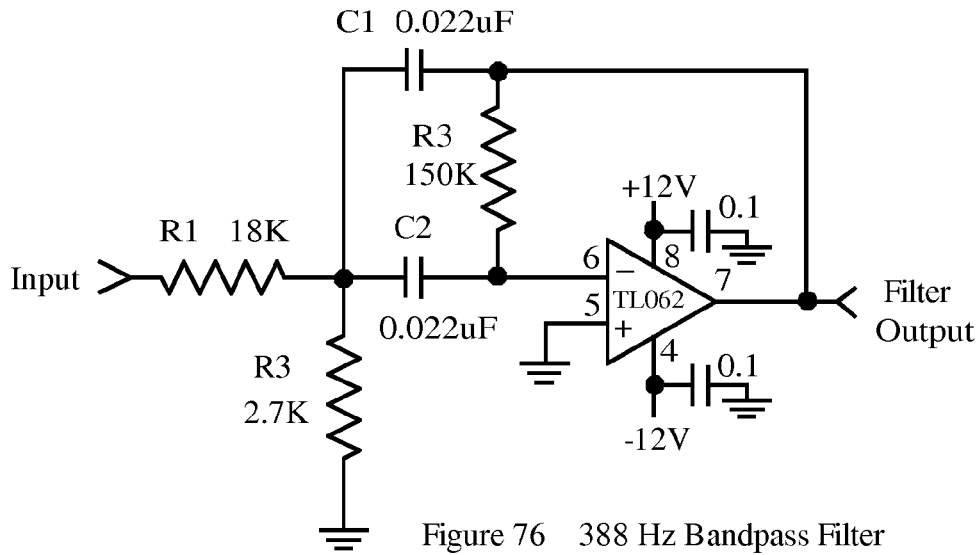
Figure 76  388 Hz Bandpass Filter
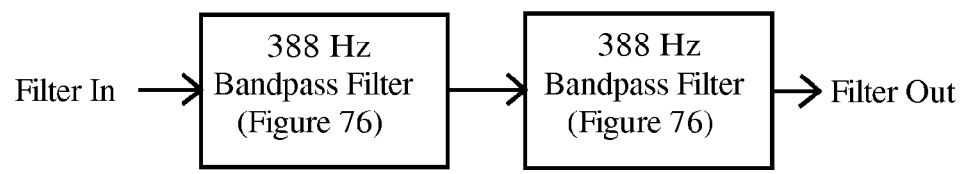
Figure 77  Two Cascaded Bandpass Filters

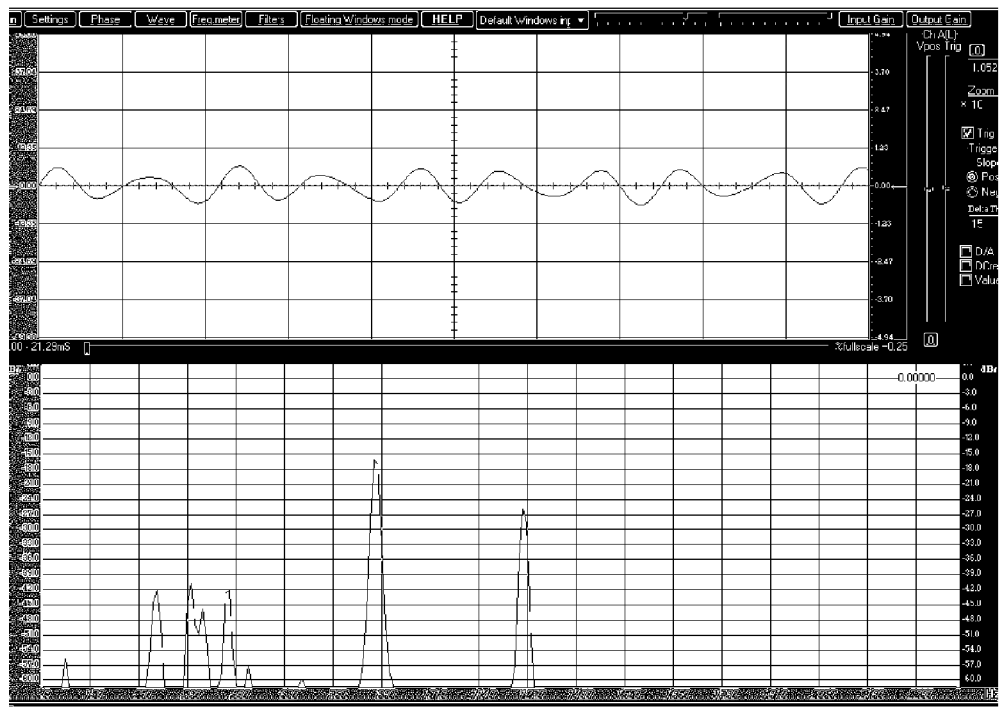
Figure 79a – Heterodyne Test – PLL Detector – Flame Off
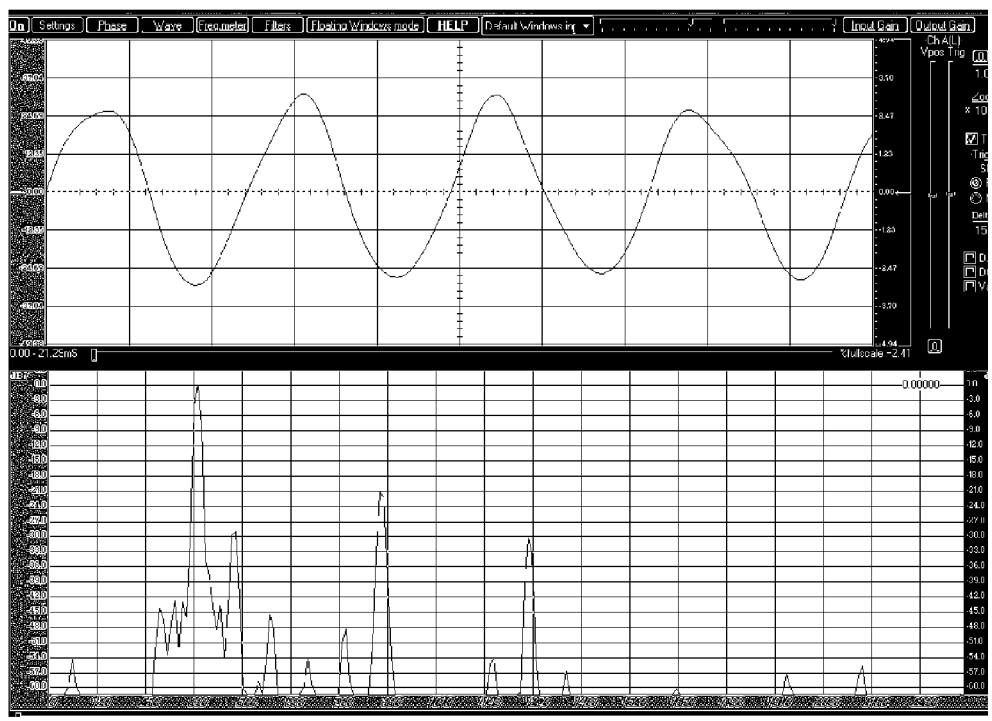
Figure 79b – Heterodyne Test – PLL Detector – Flame On

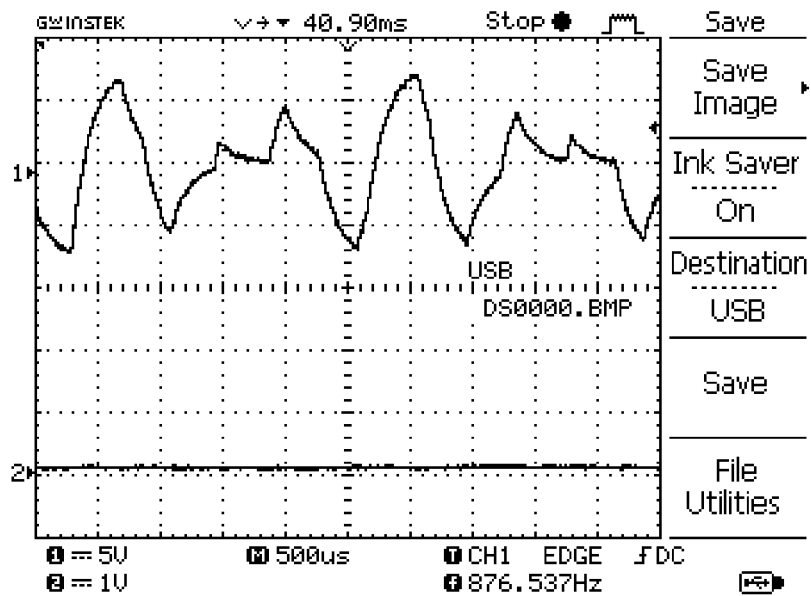
Figure 82a – Heterodyne Test – Simple Synchronous Detector – Flame Off
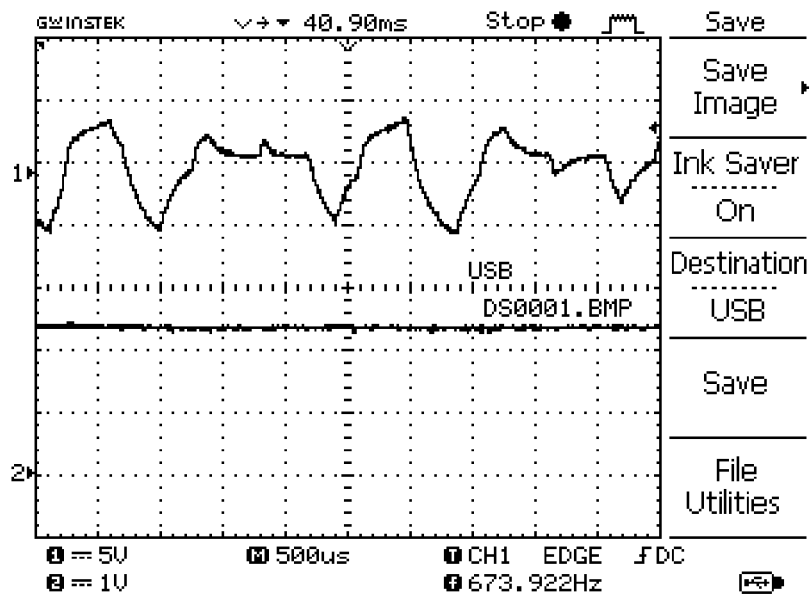
Figure 82b – Heterodyne Test – Simple Synchronous Detector – Flame On Figure 84 Sine/Cosine Wave Generator

FLAME SENSING SYSTEM

CROSS REFERENCES TO RELATED APPLICATIONS

This application claims the benefit of U.S. Provisional Application No. 62/005,199 filed on May 30, 2014, which is hereby incorporated by reference herein.

BACKGROUND OF THE INVENTION

Field of Invention

This invention relates to the field of sensing flames in equipment such as gas furnaces using the electrical properties of flames. In such equipment it is necessary to sense (detect) that a flame is actually being produced when fuel is being provided to a combustion burner. Otherwise the unburnt fuel will continue to flow and build up, and may cause asphyxiation and if it finds an ignition source may explode.

The term "combustion" means the process of oxidation of molecules of combustible substances that occurs readily at high temperatures with the release of energy. It is accompanied by that phenomenon which is called "flame" and by the generation of "heat energy".

The term "flame" means a self-sustaining propagation of a localized combustion zone at subsonic velocities.

The term "combustion burner" means a device used for facilitating the combustion of a gas or a liquid. The term "burner" means the same as combustion burner.

The term "flame conductivity" means the electrical conductivity of a flame. The unit of conductivity is the "mho". The term "flame conduction" means the same as flame conductivity.

The term "flame resistance" is the reciprocal of flame conductivity. The unit of resistance is the Ohm.

The term "flame rectification" means the property of flames to preferentially conduct electrical current depending on the direction of the electrical current.

The term "flame electrode" means an electrically conducting material immersed in a flame (when a flame is present), and which is electrically isolated from the combustion burner (except for a flame) and which may be electrically connected to something outside of the flame. The term "flame probe" means the same as flame electrode. The term "flame rod" means the same as flame electrode. The term "flame sensor" means the same as flame electrode.

The term "flame battery" means the voltage produced between a combustion burner and a flame electrode that is immersed in the flame produced by the combustion burner. The term "flame voltage" means the same as flame battery. The term "flame proof" means proof that a flame exists. The term "proof of flame" means the same as flame proof.

The term "plasma" means a collection of gas where a large proportion of atoms have enough energy that their electrons have been stripped away, creating ions, and that the proportion of ions to intact atoms is high enough that Coulomb forces have a significant effect on the behavior of the collection of gas. The ions creating the plasma will be termed "plasma ions".

The term "chemical ions" means reactive molecules, or atoms, that have unpaired electrons. The term "chemi-ionization" means the process by which molecules, or atoms, come to have unpaired electrons. The terms "chemi-ions", "radical", and "free radical" mean the same as chemical ions.

The term "thermionic emission" means the emission of electrons from the surface of an electrically conducting material when the material is heated to a temperature high enough to overcome the work function of the material, typically several electron volts. One electron volt is equal to approximately $1.602 \times 10^{-19}$ Joules.

The term "high impedance buffer" means a buffer whose input impedance is substantially higher than the impedance of the circuit it is intended to buffer. The terms "amplifier" and "buffer" will mean the same thing regardless of the gain of the circuit.

The term "mixer" means a circuit that accepts two signal inputs and forms an output signal at the sum and difference frequencies of the two signals. The terms "mixing" and "to mix" mean using a mixer. When two signals are mixed in this manner it is also called heterodyning.

The term "flame good indicator" will mean the same as "indicator".

The term "symmetrical square wave" means a square wave having a duty cycle of substantially 50%.

Prior Art

The electrical properties of flames comprise flame conduction, flame rectification, and the generation of a flame voltage between a metal burner and a flame rod.

U.S. Pat. No. 1,688,126 Method of and Apparatus for Control of Liquid Fuel Burners issued Oct. 16, 1928 to R. F. Metcalfe, assigned to Socony Burner Corporation {IDS Cite 1}. This patent teaches using the resistance of the flame for providing flame proof. It uses only the flame resistance, not flame rectification. Two electrodes are used (Contacts 7 and 8 in Metcalfe FIG. 1). From page 3, right column, lines 70-79:

> One of the main features of my invention is to utilize the phenomenon of the variation in resistance to the passage of sparks between any two contacts. The resistance in this instance is offered by the gases within the combustion chamber 4. I have found that I may take advantage of this phenomenon by utilizing the resistance to the passage of sparks between the points of the spark-plug employed for igniting the combustible mixture.

In Metcalfe FIG. 1 the secondary of Spark Coil 56 is used to produce an ignition spark between contacts 7 and 8. During ignition the resistance of the burning gas is reflected back through to the primary winding of Spark Coil 56. Since a spark coil has a high ratio of turns between the primary and secondary windings the resistance reflected back through the primary is much lower than if it was used directly. This lower resistance through the primary winding is apparently low enough to operate a relay (Electro-Magnet 58).

It appears that the spark is continuously produced. Later patents note that the continuous spark causes radio interference and they teach systems that do not require a continuous spark.

U.S. Pat. No. 2,112,736 Flame Detector issued Mar. 29, 1938 to William D. Cockrell, assigned to General Electric {IDS Cite 2}. This patent teaches using flame rectification for providing flame proof. Cockrell FIG. 1 shows an embodiment using one electrode (22) with the burner (2) used as the return. The AC used in the flame sensing circuit is used only for the flame sensing circuit and is not also used as a spark igniter. See Page 1, left column, line 41-Page 2, right column, line 15.

U.S. Pat. No. 2,136,256 Furnace Control System issued Nov. 8, 1938 to A. L Sweet, assigned to General Electric Company {IDS Cite 3}. This patent also teaches using flame rectification for providing flame proof and is an improvement on 2,112,736. Sweet introduces an additional electrode to allow the flame rectification circuit to operate reliably with an oil-fueled flame. See Page 1, left column, line 4-Page 2, left column line 2.

However, the wires from the two electrodes are surrounded by a shield. See Page 6, left column lines 36-55 and Sweet FIG. 4. Shielding the wires reduces the stray coupling from the mains power (60 Hz in the U.S.). It is possible that the problem Sweet has solved is the stray coupling from the mains power which may be made worse by the use of oil as a fuel.

U.S. Pat. No. 3,301,307 Device for detecting the configuration of a burning flame issued Jan. 31, 1967 to Kazuo Kobayashi, et al, assigned to Ngk Insulators Ltd {IDS Cite 4}. This patent teaches the use of the flame battery for flame proof. From Column 2, lines 3-15:

> The principle of the invention is based on, first of all, the recognition of the phenomenon that a negative potential to ground is produced in an electric conductor when it is located in a burning flame. It seems that such a phenomenon is due to an exchange of electric charges between the conductor acting as an electrode and ionized molecules through the contact surface of said electrode with the flame depending upon differences of temperature and degree of combustion between the inner and outer parts of said burning flame and atmospheric conditions. The phenomenon is inherent to flames and a potential difference in the order of 2-10 volts or more has been obtained by experiments.

U.S. Pat. No. 4,082,493 Gas Burner Control System issued Apr. 4, 1978 to Dahlgren, assigned to Cam-Stat, Incorporated {IDS Cite 5}. This patent also teaches the use of the flame battery for flame proof. See Dahlgren FIG. 2 and Column 3, lines 32-42.

U.S. Pat. No. 8,310,801 Flame sensing voltage dependent on application issued Nov. 13, 2012 to McDonald, et al., assigned to Honeywell {IDS Cite 6}. This patent teaches using flame rectification for providing flame proof. The claimed novelty is that in order to avoid excessive component stress, energy consumption, increased electrical noise, and contamination build-up, when accuracy is critical a higher voltage is used. Once a flame has been established, the AC voltage may be adjusted to a lower level. See Column 2, lines 10-44.

However, McDonald has not produced evidence that the use of a high AC voltage causes excessive build-up of contamination on a flame rod, increased energy consumption that generates extra heat, or that it stresses associated electronic circuitry. The commonly accepted theory is that contamination of the flame rod is caused by the products of combustion, notably carbon. Also, any extra heat that might be produced would not be wasted because the purpose of a furnace is usually to produce heat. It is likely that the real value of McDonald's system is that, since his high voltage AC is produced electronically, it is isolated from the AC mains. This is in contrast to the commonly used practice of using the un-isolated AC mains for the flame rod voltage. Since the combustion burner is typically used as the electrical return path for the flame rod and is electrically connected to the equipment cabinet (which is required to be grounded) this requires that mains neutral and mains ground be connected. According to the National Electrical Code this may only be done (and is required to be done) at the service entrance to the building and no place else. As a result, an electrical connection problem outside the furnace at the service entrance may cause a flame sensing circuit to malfunction even though there is no problem in the furnace itself. Since McDonald's invention produces the high voltage AC for the flame rod electronically (and is isolated from the mains) it would not be subject to this failure mode.

Current Practice for Providing Flame Proof

The current practice for providing flame proof uses the two general properties of flames: the optical properties of flames and the electrical properties of flame.

Flames have optical properties that range from infrared to ultraviolet. These optical properties are discussed in U.S. Pat. No. 6,404,342 Flame detector using filtering of ultraviolet radiation flicker issued Jun. 11, 2002 to Planer, et al. and assigned to Honeywell {IDS Cite 7}. From Column 1, lines 21-32:

> Another type of flame detector relies on directly on the radiation provided by the flame. However, the mere presence of visible or IR radiation does not necessarily indicate an active flame. Walls of combustion chambers tend to radiate visible and IR energy for a period of time after flame is lost. It was found, however, that active flames have characteristic flicker frequencies in the IR, visible, and UV wavelengths. Typically, an active flame flickers in the 5 to 15 hz. range (as well as in higher frequencies) in all of these wavelength bands. Heated refractory walls or glowing particles have different flicker frequencies or none at all. So flicker in these wavelengths can be used to reliably indicate flame.

The electrical properties of flames comprise flame conduction, flame rectification, and the generation of a flame voltage between a metal burner and a flame rod. These properties are exemplified in the prior art already presented. However, there is another electrical property of flames, namely that flames may absorb microwave radiation. See IDS Cite 8 Prediction and Measurement of Electron Density and Collision Frequency in a Weakly Ionised Pine Fire by Mphale, Mohan, and Heron. This electrical property appears to be used only for research and not for providing flame proof in operating equipment.

Processes that May Produce or Contribute to the Electrical Properties of Flames

The investigation of the electrical properties of flames goes back to at least the early 1900s with the work of J. J. Thomson. See IDS Cite 9 for an excerpt from Thomson's work Conduction of Electricity Through Gases (1903, 1906) Chapter IX Ionization in Gases from Flames. Thomson begins the chapter with an observation that modern researchers in the field should take notice of. Writing in 1903 he observed:

> 121. It has been known for more than a century that gases from flames are conductors of electricity; a well-known application of this fact—the discharge of electricity from the surface of a non-conductor by passing a flame over It—was used by Volta in his experiments in Contact Electricity. We shall not attempt to give any historical account of the earlier experiments on this subject, because the conditions in these experiments were generally such that the interpretation of the results obtained is always exceedingly difficult and often ambiguous: the reason of this is very obvious—to investigate the electrical conditions of the flame wires are generally introduced, these become incandescent and so at once add to the electrical phenomena in the flame the very complicated effects we have been discussing in the last chapter.

The electrical properties of flames comprise flame conduction, flame rectification, and the generation of a flame voltage between a metal burner and a flame rod (flame battery). FIG. 1 shows a representative Combustion Burner (1), Flame (2), and Flame Rod (3). FIG. 2 is a representative electrical model of the electrical properties of FIG. 1. Experiments will show that this is an AC model and that the flame battery is an integral part of Flame Diode D (23). In the absence of a flame (FIG. 3) the representative electrical model is an open circuit (FIG. 4).

There are several processes that may account for the electrical properties of flames.

Is Flame a Plasma?

An important question to ask in order to understand what causes the electrical properties of flames is: Is flame a plasma?

From the article About Plasmas from the Coalition For Plasma Science Plasma and Flames—The Burning Question {IDS Cite 10}:

The Medium Answer: Whether a plasma exists in a flame depends on the material being burned and the temperature. :

A plasma is an ionized gas. However, not all ionized gases are plasmas. In order for an ionized region of a flame to be plasma, it must contain enough charged particles for that region to exhibit unique electrical properties of plasma, which are distinctly different from properties of other states of matter. :

Since the density of charged particles increases as temperature increases, a high-temperature region in a flame may contain enough charged particles to be a plasma. Lower-temperature flames contain no significantly ionized regions and no plasma.

An example of a flame with relatively low temperatures is the flame of a household wax candle. The maximum temperature is less than 1,500 degrees Celsius, too low for much ionization to occur. However, some flames are much hotter than that. For example, in some burning mixtures of acetylene (made up of hydrogen and carbon) and oxygen, at a pressure of one atmosphere, the peak temperature in a flame has been measured to exceed 3,100 degrees Celsius.

Thus, the flame from a wax candle (less than 1,500 degrees Celsius) is not a plasma. The flame from acetylene and oxygen (around 3,100 degrees Celsius) probably is a plasma, at least in part.

The flame of a typical wax candle burns at approximately 1,500 degrees Celsius at its hottest. The flames of interest here are those produced by the hydrocarbon fuels natural gas and propane. Natural gas (methane) is $CH_4$. Propane is $C_3H_8$. In a typical burner using the oxygen in the air as the oxidizer, and producing a premixed flame, the flame temperature of natural gas is approximately 1,980 degrees Celsius. The temperature of a premixed propane flame is about the same. So, we need to look further.

The article Plasma Fundamentals and Applications by Dr. I. J. Van der Walt, Senior Scientist Necsa contains a chart {IDS Cite 11, PDF page 8} that graphs the electron temperature verses electron density for various processes. Flames are toward the bottom of the graph for electron density. It is unlikely that the flame from natural gas or propane contains any appreciable plasma.

We should discuss temperature. The temperature of a gas is a measure of the average kinetic energy of the gas molecules as they collide with each other and with the walls of the container. If the container walls are rigid the molecules will bounce off. With a flame the walls are the atmosphere, and the boundary between the flame and the atmosphere is a function of atmospheric pressure. The collisions between the molecules in the flame and the molecules in the atmosphere produce diffusion. It is this diffusion that makes diffusion flames possible. An example of a diffusion flame is the flame produced by a wax candle. The other type of flame is called a premixed flame and is where the oxidizer (the oxygen in the atmosphere) is mixed with the fuel before combustion. Premixed flames produce a more stoichiometric mixture than diffusion flames, so they burn more completely (and hotter). For this reason most furnaces use premixed flames.

Chemical Ions

The preceding doesn't mean there isn't a useable density of ions in a flame. There is, but they aren't plasma ions. They are chemical ions, or chemi-ions.

The oxidation of methane is: $CH_4+2O_2$, flame or spark→$CO_2+H_2O$+energy However, Nature does not like to make or break more than one chemical bond at a time. So there are a number of intermediate species produced between $CH_4+2O_2$ and $CO_2+H_2O$+energy. And it's a large number.

An excellent reference is Introduction to Combustion by Stephen R. Turns. See IDS Cite 12, page 108, PDF page 3. Turns reports (citing GRI Mech 2.11) that at least 325 intermediate reactions have been found in the combustion of methane (natural gas). See IDS Cite 12, page 159, PDF bottom of page 5. A portion of the list is reproduced in FIG. 14.

The presence of nitrogen in some of the equations indicates that the methane is being burned using air. By volume dry air contains 78.09% nitrogen, 20.95% oxygen, 0.93% argon, 0.039% carbon dioxide, and small amounts of other gases. Nitrogen compounds form starting at about 800 degrees Celsius, much lower than the temperature at which methane burns. The various species of nitrogen are generally represented as $NO_x$ which is toxic and considered a pollutant.

Additional Components in Natural Gas and Propane

There are more components in natural gas and propane. Since methane and propane are odorless, an odorant is added to make leaks easy to detect. The odorant most often used is mercaptan, which is methanethiol (also known as methyl mercaptan). Mercaptan is an organic compound with the chemical formula $CH_3SH$ (also written as $CH_4S$). The sulfur no doubt produces the putrid smell. The flue of a gas furnace does not have this smell because the mercaptan is broken down and forms sulfur oxides ($SO_2$ and $SO_3$). As long as the temperature of the flue gas is above the gas dewpoint temperature the sulfur oxides will vent into the air where they may combine with water to form $H_2SO_4$ (sulfuric acid). Furnaces that recapture heat from the flue gas may cause the flue gas to drop below the gas dewpoint temperature resulting in $H_2SO_4$ precipitating in the equipment. {IDS Cite 13} Also, in the data reported by Turns a number of the formulas contain the letter "M". "M" is not an element. In chemistry the letter "M" is used to represent an alkali metal. {IDS Cite 14}.

From Wikipedia {IDS Cite 15}:
   The alkali metals are the elements in Group 1 (1A). They are lithium, sodium, potassium, rubidium, cesium, and francium. These elements are best marked by their reactivity. Physically they are soft, shiny (when freshly prepared) solids with low melting points; they conduct electricity well. They all have one valence electron that they lose easily to almost any electronegative substance.

Why are there alkali metals in natural gas?
   Some are there naturally and some are there because of hydraulic fracturing, or "fracking". See U.S. Pat. No. 4,317,487 Method of recovering oil and other hydrocarbon values from subterranean formations issued Mar. 2, 1982 to Merkl, and assigned to Molecular Energy Research Company, Inc. See Column 2, line 59-Column 3, line 11. {IDS Cite 16}

There are even more components in the natural gas and propane used in furnaces and other equipment because Natural Gas is not 100% methane ($CH_4$) and Propane is not 100% propane ($C_3H_8$).

Natural Gas—From Turns pages 657-659 {IDS Cite 12—Turns pages 657-659; PDF pages 22-24}
   Although there are no industry or governmental standards for pipeline natural gas, contracts between producers and pipeline companies define general ranges of composition and other properties [26, 27]. Processing removes solid matter (e.g., sand), liquid hydrocarbons, sulfur compounds, water, nitrogen, carbon dioxide, helium, and any other undesirable compounds to meet contract specifications. The removal of sulfur compounds results in making an acidic, i.e., sour, gas sweet. Table 17.11 shows typical values, or ranges, of important properties of pipeline gas based on the General Terms and Conditions of a set of geographically dispersed pipeline companies in the United States and Canada.
   The composition of natural gas varies widely depending upon the source. Examples for U.S. sources of natural gas are shown in Table 17.12. Compositions for natural gases from a variety of non-U.S. sources are provided in Table 17.13.

The following table (Table 1) is an abridged reproduction of Table 17.12 from Turns. The complete Turns Table 17.12 has been reproduced as FIG. 15.

TABLE 1

(Abridged Turns Table 17.12)
Table 17.12 Composition (mol %) and properties of natural gas from sources in the United States [28][a]

| Location | $CH_4$ | $C_2H_6$ | $C_3H_8$ | $C_4H_{10}$ | $CO_2$ | $N_2$ |
|---|---|---|---|---|---|---|
| Alaska | 99.6 | — | — | — | — | 0.4 |
| Birmingham, | 90.0 | 5.0 | — | — | — | 5.0 |
| East Ohio[b] | 94.1 | 3.01 | 0.42 | 0.28 | 0.71 | 1.41 |
| Kansas City, | 84.1 | 6.7 | — | — | 0.8 | 8.4 |
| Pittsburgh, | 83.4 | 15.8 | — | — | — | 0.8 |

Thus, in Turns' sample natural gas ranged from a high of 99.6% in Alaska to a low of 83.4% in Pittsburgh.

Propane

There are three basic grades of propane: HD5, HD10, and Commercial Grade. From IDS Cite 17 (Propane101):
   HD-5 Propane
      HD5 grade propane is "consumer grade" propane and is the most widely sold and distributed grade of propane in the U.S. market. HD5 is the highest grade propane available to consumers in the United States and is what propane companies ordinarily sell to their customers. What does HD5 propane mean in terms of specification to an ordinary consumer? It means that the propane is suitable and recommended for engine fuel use, which was the original purpose of the HD5 grade propane specification. HD5 spec propane consists of:
      Minimum of 90% propane
      Maximum of 5% propylene—propylene is used in the manufacture of plastics
      Other gases constitute the remainder (iso-butane, butane, methane, etc.)
   HD-10 Propane and Commercial Propane
      HD10 propane is a grade below HD5 and is commonly found in California. HD10 grade propane allows up to 10% propylene in the propane/propylene mixture and is still labeled as "propane". Because propylene is used in creating plastics, HD10 can possibly create problems in some engines and vehicle applications. Propylene can cause engine components to "gum" or stick during operation. However, HD 10 spec propane works just fine in domestic and commercial propane powered appliances. The only problem that may be encountered in using HD-10 propane involves its use as an engine fuel (vehicles, forklifts, etc.).
      Commercial grade propane and HD10 grade propane are sometimes used interchangeably due to the fact that both grades are sub-HD5 spec product and do not meet the standards of engine grade propane. Refineries use commercial propane in their processes and fractionation of chemicals for end use in numerous industries. Although commercial grade propane can be used in a manner similar to that of HD10 propane, it is not used in vehicle applications.

The article The Truth About Propane {IDS Cite 18} goes a little farther. After discussing the Gas Processors' Association standard for propane, GPA 2140 (1932) which was the original HD5 standard, it then addresses the commercial grade of propane:
   By contrast, since 1975, oil refineries were able to take advantage of the definition of propane in the ASTM (American Society for Testing and Materials) standard, ASTM Standard D1835, to market oil refining "odds and ends," known by chemical engineers as "slop," because they could claim that the slop fit the definition of "commercial grade" propane: any hydrocarbon mixture that held a flame.

With HD5 and HD10 you have an idea of what you are getting. Apparently, commercial grade propane is the hotdog of the oil refining business.

The preceding paragraphs provide persuasive evidence that the temperature of the flame produced by the combustion of natural gas or propane is not high enough to produce an appreciable amount of plasma. Instead, the flame is a soup of chemical ions. This matters because the electrical properties of plasma may be different from the electrical properties of chemical ions.

In addition:
1. There are a large number of different chemical ions because there are a large number of intermediate chemical species;
2. The types of intermediate chemical species and their amounts will be affected by the exact composition of the gas (natural gas or propane) and there is a fairly wide latitude in the standards for the composition of natural gas and propane.

3. Gas obtained through fracking may contain a greater amount of alkali metals which may affect the electrical properties of the flame produced by the combustion of the gas.

Gas Pressure

A flame is not a bunch of chemical ions and free electrons in a sealed container. Gas and air come into the burner under pressure and combusts, producing chemical ions and free electrons which then form a large number of short-lived intermediate species ending with $CO_2$, $H_2O$, NOx, sulfur oxides, and probably more types of molecules. Then they go shooting off into the atmosphere. This process continues as long as there is new gas (unless the flame goes out for some reason). Because the gas pressure moves the gas molecules before combustion it is likely that after combustion this gas pressure gives the chemical ions and electrons a group velocity. But because different ions may have different masses, and because of the much smaller mass of the electron, the negative chemical ions and the electrons may get to the flame rod first. And the free electrons are not just from chemical ionization.

Thermionic Emission

As J. J. Thomson observed {IDS Cite 9}: "... to investigate the electrical conditions of the flame wires are generally introduced, these become incandescent and so at once add to the electrical phenomena in the flame the very complicated effects we have been discussing in the last chapter."
The effects caused by the incandescent wires are called Thermionic Emission. Thermionic emission is the emission of electrons from the surface of an electrically conducting material when the material is heated to a temperature high enough to overcome the work function of the material, typically several electron volts. One electron volt is equal to approximately $1.602 \times 10^{-19}$ Joules. Thermionic emission comes not just from the flame rod but also from the burner, assuming the burner is metal. (Some of the early flame experiments used a quartz burner.) In systems with two flame rods the second flame rod is also a source of thermionic emission.

Thermionic emission was discovered (or maybe rediscovered) by Thomas Edison while trying to discover the reason for breakage of lamp filaments and uneven blackening (darkest near one terminal of the filament) of the bulbs in his incandescent lamps. He placed an extra wire inside the bulb and discovered that current would only flow in one direction. However, he used this discovery only as a governor to control the output of dynamos. See IDS Cite 19—U.S. Pat. No. 307,031 Electrical indicator issued Oct. 21, 1884 to T. A. Edison. From page 1, lines 16-29:

I have discovered that if a conducting substance is interposed anywhere in the vacuous space within the globe of an incandescent electric lamp, and said conducting substance is connected outside of the lamp with one terminal, preferably the positive one, of the incandescent conductor, a portion of the current will, when the lamp is in operation, pass through the shunt-circuit thus formed, which shunt includes a portion of the vacuous space within the lamp. This current I have found to be proportional to the degree of incandescence of the conductor or candlepower of the lamp.

John Fleming improved upon Edison's invention. See IDS Cite 20—U.S. Pat. No. 803,684 Instrument for converting alternating electric currents into continuous current issued Nov. 7, 1905 to J. A. Fleming, assigned to Marconi Wireless Telegraph Company of America.

From Fleming, page 1, lines 11-37:

This invention relates to certain new and useful devices for converting alternating electric currents, and especially high-frequency alternating electric currents or electric oscillations, into continuous electric currents for the purpose of making them detectable by and measurable with ordinary direct-current instruments, such as a "mirror-galvanometer" of the usual type or any ordinary direct-current ammeter. Such instruments as the latter are not affected by alternating electric currents either of high or low frequency, which can only be measured and detected by instruments called "alternating current" instruments of special design. It is, however, of great practical importance to be able to detect feeble electric oscillations, such as are employed in Hertzian-wave telegraphy by an ordinary movable coil or movable needle mirror-galvanometer. This can be done if the alternating current can be "rectified"— that is, either suppressing all the constituent electric currents in one direction and preserving the others or else by changing the direction of one of the sets of currents which compose the alternating current so that the whole movement of electricity is in one direction.

Fleming had a reason for improving on Edison's work because he was looking for an improved detector for Hertzian waves (radio waves). To be fair to Edison, in 1884 there were no manmade Herztian waves to be detected. Hertz did not begin his experiments until 1888 and Tesla and Marconi did not begin their experiments in radio until a few years later.

Chemical Ions as an Electrolyte

The chemical ions in a flame may act much like the chemical ions in the electrolyte used in electrolytic rectifiers, electrolytic capacitors, and batteries. Technically, an electrolyte is a compound that ionizes when dissolved in suitable ionizing solvents such as water. {IDS Cite 21} For the purposes of this discussion we will assume that the compound is dissolved in a suitable solution.

Fleming's patent {IDS Cite 20} makes reference to an electrochemical rectifier. From Page 1, lines 38-52:

There are well-known forms of mechanical rectifier; also, there is a well-known form of electrochemical rectifier, depending on the fact that when a plate of carbon and aluminium is placed in any electrolyte which yields oxygen on electrolysis an electric current can only pass through this cell in one direction if below a certain voltage. Both these forms of rectifier are, however, inapplicable for high-frequency currents. I have found that the aluminium-carbon cell will not act with high-frequency currents.

Another name for an electrochemical rectifier is an electrolytic rectifier or an electrolytic cell.

From the 1917 Dissertation Counter Electromotive Force in the Aluminum Rectifier by Albert Lewis Fitch, page 15: {IDS Cite 22}:

I. INTRODUCTION.

THE anomalous action of aluminum in the electrolytic cell was first discovered by Wheatstone in 1855. Soon after this, Buff found that an electrolytic cell one electrode of which was aluminum would rectify the alternating current. Among the other men who have been interested in this cell may be mentioned Ducretet,[1] Hutin and Leblanc,[2] Montpellier,[3] Nodon,[4]

Guthe,[5] Greene,[6] and Schulze.[7] The latter has perhaps done the largest amount of work of any. His articles have appeared from time to time in a number of magazines.

The earlier experimenters with this cell confined themselves to the study of aluminum but later investigation[7] has shown that many other metals possess this same property to a greater or less degree. Among these may be mentioned iron, nickel, cobalt, magnesium, cadmium, tin, bismuth, zirconium, tantalum, etc.

A great many electrolytes may be used in the rectifier. The most commonly used are the alums, phosphates, and carbonates; however Greatz and Pollak[8] have shown that any electrolyte which will liberate oxygen on electrolysis may be used more or less satisfactorily.

It has been found that the ability of the cell to rectify alternating current depends upon the current density at the aluminum anode,[9] the inductance and resistance of the circuit,[10] and its temperature.[11] The cell works best when the current density is high and the inductance, resistance, and temperature are low.

The electrolytic rectifier led to the electrolytic capacitor. From U.S. Pat. No. 1,077,628 Electrolytic condenser issued Nov. 4, 1913 to Mershon {Ref 23} Page 1, lines 40-50:

The electrolytic condenser, like the electrolytic rectifier, depends for its action upon the properties of the film which may be formed electrolytically upon the surface of aluminum, tantalum, magnesium and other metals when immersed in certain electrolytes and subjected to the electric current. Inasmuch as the electrolytic rectifier is concerned in my invention, and as its explanation leads up to that of the condenser, it will be first described.

Mershon then presents a detailed explanation of the electrolytic rectifier followed by a detailed explanation of his electrolytic condenser (capacitor).

Both electrolytic rectifiers and electrolytic capacitors have two electrodes with an electrolyte between them. One electrode is termed the anode. While the other electrode is termed the cathode its purpose is only to provide electrical contact with the electrolyte which is the real cathode.

Indeed, modern aluminum electrolytic capacitors have the capability of acting as rectifiers (but not very good ones). From Nichicon, a leading manufacturer of electrolytic capacitors in General Descriptions of Aluminum Electrolytic Capacitors, 1-1 Principles of Aluminum Electrolytic Capacitors {IDS Cite 24, page 1}:

An aluminum electrolytic capacitor consists of cathode aluminum foil, capacitor paper (electrolytic paper), electrolyte, and an aluminum oxide film, which acts as the dielectric, formed on the anode foil surface.

A very thin oxide film formed by electrolytic oxidation (formation) offers superior dielectric constant and has rectifying properties. When in contact with an electrolyte, the oxide film possesses an excellent forward direction insulation property. Together with magnified effective surface area attained by etching the foil, a high capacitance yet small sized capacitor is available.

As previously mentioned, an aluminum electrolytic capacitor is constructed by using two strips of aluminum foil (anode and cathode) with paper interleaved. This foil and paper are then wound into an element and impregnated with electrolyte. The construction of aluminum electrolytic capacitor is illustrated in FIG. 1-1. {Nichicon FIG. 1-1 is reproduced as FIG. 16}

Since the oxide film has rectifying properties, a capacitor has polarity. If both the anode and cathode foils have an oxide film, the capacitors would be bipolar (nonpola) type capacitor.

{Emphasis added}

Thus, even modern electrolytic capacitors show their origins as rectifiers. And Nichicon's paper says that electrolytes are not limited to liquid electrolytes. Solid electrolytes may also be used.

Therefore, even though the chemical ions in a flame have a much lower density than the chemical ions in an electrolyte they may nonetheless play some part in the electrical properties of a flame.

Both electrolytic rectifiers and electrolytic capacitors have two electrodes and an electrolyte between them. Another device that has two electrodes and an electrolyte between them is the battery. (Technically, a battery has more than one battery cell but the term battery is frequently used to describe a single battery cell.) A battery cell has two electrodes with an electrolyte between them. The electrolyte can be liquid, solid, a paste, a gel, etc. What makes a battery cell different from an electrolytic capacitor? From the article: Batteries and electrochemical capacitors {IDS Cite 25}:

Batteries can generally store significantly more energy per unit mass than ECs, as shown in FIG. 1a, because they use electrochemical reactions called faradaic processes. Faradaic processes, which involve the transfer of charge across the interfaces between a battery's electrodes and electrolyte solution, lead to reduction and oxidation, or redox reactions, of species at the interfaces. When a battery is charged or discharged, the redox reactions change the molecular or crystalline structure of the electrode materials, which often affects their stability, so batteries generally must be replaced after several thousand charge-discharge cycles.

Another way to look at it is that in a battery the electrolyte and the electrodes are chemically changed. (In rechargeable batteries the change can be mostly reversed by sending current through it.) In modern electrolytic capacitors the two electrodes are made of the same material, such as aluminum, so they have the same galvanic response. Hence, it is not a battery. As noted previously, in an electrolytic capacitor the purpose of one of the electrodes (the cathode electrode) is to provide an electrical contact to the electrolyte which is the real cathode. Also note that the electrodes in Fleming's electrolytic rectifier {IDS Cite 20} are carbon and aluminum but the electrolyte has to have the property that it produces oxygen on electrolysis.

Therefore, once again, even though the chemical ions in a flame have a much lower density than the chemical ions in an electrolyte they may nonetheless play some part in the electrical properties of a flame. If they do, then the materials used in the combustion burner and the flame rod will have an effect on the voltage produced by the flame battery.

There is one more device that has two electrodes and an electrolyte: the electroplating cell. In an electroplating cell an electric current from anode to cathode causes the material in the anode to be deposited onto the cathode. {IDS Cite 26} It is telling that the metals used in the electrodes are called "rectifier metals." {IDS Cite 27: U.S. Pat. No. 3,956,080 Coated valve metal article formed by spark anodizing issued May 11, 1976 to Hradcovsky, et al.; Column 2 lines 10-48} The current involved in flame sensing circuits is so small (generally <1 uA.) that it is unlikely that any significant electroplating is going on. Even if a small amount of electroplating does occur it is unlikely that it would have an effect on the electrical properties of the flame.

Summary of the Processes that May Produce or Contribute to the Electrical Properties of Flames A. The Electrical Properties of Flames Comprise:
  1. Flame conduction.
  2. Flame rectification.
  3. The generation of a flame voltage between a metal burner and a flame rod.

FIG. 1 shows a representative Combustion Burner 1, Flame 2, and Flame Rod 3. FIG. 2 is a representative electrical model of the electrical properties of FIG. 1. Experiments will show that this is an AC model and that the flame battery is an integral part of Flame Diode D (23). In the absence of a flame (FIG. 3) the representative electrical model is an open circuit (FIG. 4).

B. The Processes that May Produce or Contribute to the Electrical Properties of Flames:
  1. Chemical Ions—Although flames produced by burning natural gas ($CH_4$) or propane ($C_3H_8$) in air are not plasma they do contain a large number of different chemical ions. Some additional chemical ions are present because the gas contains impurities that are not removed during refining. Some are the result of substances that are intentionally added to the gas, such as mercaptan. Some (like alkali metals) may be present when the gas was extracted by fracking.
  The chemical ions may provide for a simple conductive path for electrical current (flame conductivity).
  The chemical ions may act as an electrolyte which, with the combustion burner and flame, acts as an electrolytic rectifier (flame rectifier), a battery (flame battery), or an electrolytic capacitor.
  2. Gas pressure—Gas and air continually come into the burner under pressure and combust. The chemical ions and free electrons produced by combustion may have a group velocity but because the chemical ions have different masses and the electrons have a much smaller mass the negative chemical ions and the electrons may get to the flame electrode first.
  3. Thermionic Emission—The metal parts in the flame, such as the combustion burner and the flame rod, are hot enough to emit electrons from their surface.

EXPERIMENTS

It is already known that the conductivity of a flame is very low, meaning that the resistance is very high, on the order of megohms. This requires that a high impedance buffer be used. An example of a high impedance buffer is shown in FIG. 5. There is a potential problem with a high impedance unbalanced buffer because it is subject to picking up stray AC from the mains power. Stray AC from the mains power is everywhere and it is almost impossible to keep it out of a high impedance buffer that has connections off-board. It is even worse in a typical home gas furnace.

A typical gas furnace has a cabinet divided into two sections: the blower compartment and the burner compartment. The blower compartment contains the air blower and the control electronics. The burner compartment contains the combustion burner with its associated parts (gas valve, igniter, flame rod, and maybe an inducer blower, etc.) and a heat exchanger. The return air from the house coming from the return duct(s) comes into the blower compartment and is sent through the heat exchanger in the burner compartment. The air is heated in the heat exchanger and sent to the air ducts to heat the house. The heat exchanger is heated by the flame but is designed to keep combustion products out of the air flow. The combustion products are vented separately out through the flue. The control electronics must be located in the blower compartment because the burner compartment is thermally hot. Very Hot. As a result the control electronics must be connected to the components in the burner compartment such as the gas valve, the igniter, the flame rod, the inducer blower, and the inducer blower pressure switch (if an inducer blower is used). Typically, the wires to these components are bundled together in one cable harness. (This is for ease of manufacturing.) Thus, the wire for the flame rod is in a bundle of wires which contain AC mains voltage for the inducer blower and the igniter. Pickup of stray AC is unavoidable unless a shielded cable were used for the flame sensor. The prior art shows that this was sometimes done but it adds expense and it is generally not done now.

For experimental use an instrumentation amplifier can be used. An instrumentation amplifier has high impedance differential inputs. A simple instrumentation amplifier can be constructed out of a general purpose FET quad operational amplifier such as the TL064 shown in FIG. 6.

All of the experiments were done in the high desert of the Virginia City Highlands in Nevada at an altitude of approximately 6,000 feet. For some of the experiments the altitude and desert conditions may produce different results from experiments done at sea level.

Experiment 1—Determine the Capacitance Between Two Wires

Two wires were put side-by-side, held together with nylon lacing cord every few inches. The wires were not twisted together. The wires were AWG 14 gauge with insulation rated for 600V. This is typical of the wires used in home furnaces. The wires were ten feet long to make the measurement of capacitance easier.

The method used was to use the capacitance in an RC circuit shown in FIG. 7. The time constant of the circuit is T=R(71)*C(72) and is the time for the output voltage to reach about 63.2% of its final value. A pulse generator with adjustable pulse width was used. With an input pulse of 10 VDC and R(71)=1 megohm, for the pulse to reach 63.2% of 10V (6.32 V DC) was approximately 170 us. See FIG. 9 for a screen capture of the oscilloscope. Since T=R(71)*C(72), C(72)=T/R(71)=(170*10**−6)/(1*106)=170×10−12=170×10**−12. Therefore, the capacitance was approximately 170 picofarads (pF). Subtracting 10 pF for the oscilloscope probe leaves 160 pF for the ten feet of wire, or 16 pF per foot. Assuming a cable length of 30 inches (2.5 feet) in the furnace from the control electronics to the burner compartment, that gives a capacitance of approximately 40 pF.

The circuit shown in FIG. 8 represents the effects of capacitive coupling from a wire carrying 120 VAC to a circuit with an input impedance of 1 megohms. The transfer function of the circuit is shown in Table 2 (FIG. 10). Therefore, for $V\text{in}=120$ VAC; $R(82)=1$ megohm; $C(81)=40$ pF; Frequency=60 Hz the magnitude of Vout is approximately 1.81 VAC. The phase is a phase lead of approximately 8.9 degrees.

The presence of other wires in the cable bundle could make this coupled voltage higher or lower. Even the relative position of the other wires in the cable bundle can affect the capacitive coupling since there will also be capacitance between the 120 VAC mains hot and the 120 VAC mains neutral also going to the igniter, the flame rod, the inducer blower, etc. These capacitances will cause the total equivalent circuit of capacitances to act as a capacitive voltage divider. Where stray capacitance is a problem the wire to the flame rod can run separately from the cable bundle at least several inches away from it.

Experiment 2—Determine the DC Characteristics of the Flame Battery

This experiment was done using a Meker burner. A Meker burner is similar to a Bunsen burner but produces a larger-diameter flame. The burner that was used is believed to be made of nickel-plated brass. The test was done with a commercial flame rod from the inventor's Ruud propane furnace. In this test the flame rod was immersed in the flame about 0.75 inches from the surface of the burner.

One of the electrical characteristic of the flame is that a voltage is produced between a metal burner and a flame rod. See FIG. 11. The open circuit flame voltage produced between VOut and Common was measured with the instrumentation amplifier in FIG. 12 which is the instrumentation amplifier of FIG. 6 (1201) with a 0.1 uF capacitor (1202) across the input terminals to reduce the stray 60 Hz pickup. The open circuit flame voltage from Flame Battery 112 measured about −1.27 Volts. See FIG. 21a.

Referring to FIG. 13, when the output voltage was loaded with a resistor of about 4.3 megohms (131) the voltage dropped to about −0.68 Volts, which is about half of the open circuit flame voltage. See FIG. 21b. Therefore, the series resistance RB (111) is also 4.3 megohms.

Experiment 3—Determine More DC Characteristics of the Flame Battery

A battery was connected to the flame rod through a current sense resistor in order to measure the flame current with the battery connected to produce a negative current and then reversed in order to produce a positive current. The configuration is shown in FIG. 17 with the electrical model shown in FIG. 18. Battery 1701 consisted of two 9V batteries with a total voltage of 19.0V (VBAT). Sense Resistor 1702 had a value of about 533K Ohms. The voltage across the current sense resistor was measured with the Instrumentation Amplifier 1804 with Capacitor 1805 across its inputs. See FIG. 18.

Battery 1701 was connected to produce a negative current through the flame so that flame diode D(23) was off. The voltage measured across Sense Resistor 1702 was very small, about 40 mV. See FIG. 22a. The current through the flame would therefore be I=0.040V/533K which is about 0.075 uA. Using the electrical model of FIG. 2, the voltage across R2(22) is 19.0−0.04=18.96. With 0.075 uA going through R2(22), R2(22)=E/I=18.96V/0.075 uA=253 megohms. That would mean there is no R2(22).

Then the battery was connected to produce a positive current through the flame, thus turning flame diode D(23) on. The voltage measured across Sense Resistor 1702 was about 1.39V. See FIG. 22b. The current through the flame is therefore 1.39V/533K=2.61 uA. Using the electrical model of FIG. 2, the voltage across R1(21) is 19.0−1.39=17.61V. With 2.61 uA going through R1(21), R1(21)=E/I=17.61V/2.61 uA=6.75 megohms.

Since the following AC experiments show that there is, indeed, an R2(22), this experiment suggests that the electrical model in FIG. 2 does not work properly for DC. Since the current invention uses the AC properties of flames, no further research into the DC model of the flame was pursued.

Experiment 4—Determine the AC Characteristics of the Flame Model

Referring to FIG. 19, a 100 Hz triangle wave having a 20Vp-p waveform (Signal Generator 1901) was applied to Source Resistor 1902 having a value of about 10 megohms. The electrical model is shown in FIG. 20. This produced the output shown in FIG. 23a. The most positive voltage was +2.79V. The most negative voltage was −7.20V.

Since the effective load is the 10 megohm resistor R3 (1902) from the signal generator (1901), when VSource is negative Flame Diode D(23) is not conducting so the circuit is a voltage divider VOut/VSource=R2(22)/[R2(22)+R3 (1902)]. This works out to:

$$R3(1902)=R2(22)*(VOut/VSource-1)/(-VOut/VSource) \approx 25.8 \text{ megohms.}$$

When VSource is positive Flame Diode D(23) is conducting so we will be calculating the parallel resistance of R1(21) and R2(22) and call it "Req". VOut/VSource=Req/[Req+R3(1902)]. This works out to R3(1902)=Req*(VOut/VSource−1)/(−VOut/VSource)≈3.7 megohms.

Resistances R2(22) and R1(21) are in parallel and we know R2(22).

$$Req=[R1(21)*R2(22)]/[R1(21)+R2(22)] \text{ so } R1(21)=Req*R2(22)/[R2(22)-Req]$$

Therefore, R1(21)≈4.4 megohms.

There is an interesting section between −960 mV and 0 Volts. See FIG. 23b. As the voltage reaches −960 mV from the negative direction the voltage slope suddenly changes. Then, at 0V it resumes its normal slope. The waveform between −960 mV and 0V has the characteristics of a capacitor charging under constant current. Then, at 0V the flame diode kicks in. (The triangle wave at the bottom is from Signal Generator 1901. The reason the slope is different is because the oscilloscope channel gain is different. The reason for including it is to show that the source waveform is linear.)

There is a similar region on the trailing side of the triangle wave between −120 mV and −640 mV. See FIG. 23c.

This suggests that the flame diode is an electrolytic rectifier and is constantly formed and unformed by the AC current. It may also be unformed by the heat of the flame.

The experiment was repeated with a 200 Hz triangle waveform (also 20 Vp-p). The most positive voltage was +2.224V and the most negative voltage was −6.88V. See FIG. 24a. The leading edge (FIG. 24b) and trailing edge (FIG. 24c) showed characteristics similar to those at 100 Hz. The experiment was then repeated with a 400 Hz triangle waveform (also 20 Vp-p). Again, the results were similar to the experiment performed at 100 Hz except that the voltage ranges were smaller and the trailing edge was less distinct. See FIG. 25a, FIG. 25b, and FIG. 25c.

At 1 KHz the voltages continued to be even smaller and the trailing edge is almost completely indistinct. See FIG. 26a, FIG. 26b, and FIG. 26c.

The results are summarized in the following Table 3.

TABLE 3

| Frequency | Most Positive | Most Negative | Leading Section | Trailing Section |
|---|---|---|---|---|
| 100 Hz | +2.79 V | −7.20 V | −960 mV to 0 V | −640 mV to −1.20 V |
| 200 Hz | +2.24 V | −6.88 V | −760 mV to −120 mV | −680 mV to −1.39 mV |
| 400 Hz | +1.84 V | −6.32 V | −440 mV to +200 mV | −1.63 V to −2.00 V |
| 1 KHz | +0.92 V | −4.88 V | −340 mV to +440 mV | Indistinct |

The observation that the trailing edge is more sensitive to the frequency (and thus the rate of change of current) than the leading edge section suggests a capacitive effect due to the flame diode.

Experiment 5—Thermionic Emission

Since the flame causes thermionic emission from the burner and the flame rod it might be useful to examine another device that uses thermionic emission: the vacuum tube. Thermionic emission was measured for the following vacuum tubes: 5U4 GB, 5Y3GT, 6X4, and 12X4. All of them are dual diodes. The 5U4 GB and 5Y3GT use a directly heated cathode, which means that the filament is used as the cathode. The 6X4 and 12X4 use an indirectly heated cathode, which means that the filament is used to heat another closely located structure which then acts as the cathode. The front pages of the datasheets for the 5U4 GB, 5Y3GT, and 6X4/12X4 are reproduced in IDS Cite 28. The 6X4 and 12X4 are identical except that the 6X4 has a 6.3V filament while the 12X4 has a 12.6V filament.

Although four tubes of each type were tested, the results for only one tube of each type are being presented as being representative of the other tubes tested. The tests consisted of:
1. Powering the filament with a DC power supply adjusted to produce the appropriate voltage for each tube type;
2. Measuring the voltage produced at the Plate using the Instrumentation Amplifier of FIG. 12 to reduce the effects of stray AC coupling from the AC mains.

FIG. 27 shows the test setup for the 5Y4 GB and 5Y3GT. DC Power Supply 2701 provides power to the filament of tube 2702. The voltage produced by tube 2702 is measured by Instrumentation Amp 2704 with the addition of Capacitor 2703 to reduce stray 60 Hz from the Mains. FIG. 28 shows the test setup for the 6X4 and 12X4 which have indirectly heated cathodes shown as tube 2802. The selection of different pins was done using clip leads. The results for the 5U4GT are presented in FIG. 29; the results for the 5Y3GT are presented in FIG. 30.

Thermionic emission from the cathode produced a negative voltage at the plate. The amount of current produced was small. Although it was too small to be useful it was amazing to find any, because vacuum tubes are not generally considered a power generator, only a power regulator.

The 5U4 GB and the smaller 5Y3GT both exhibited the properties that the voltage produced at the plate depended on which side of the filament was used as a reference. (In the second test for each tube the filament voltage was reversed. It showed that the phenomenon followed the sign of the filament voltage.)

This is probably a function of the structure of the tube. Both diodes in each tube are mechanically identical and separate from each other. Each one has a long filament and a long rectangularly shaped plate element surrounding it. The only thing the two diodes have in common is that the filaments are wired in series. Also, the tube elements are connected to the pins at the tube base only at the end of the respective elements.

The reason for testing the 6X4 and 12X4 was because they both use indirectly heated cathodes so that the thermionic emission from the cathode is solely thermal and the voltage on the filament should not make a difference. It was also the reason for testing both the 6X4 and the 12X4. The two tubes are identical except for the filament voltage.

The results for the 6X4 are presented in FIG. 31; and the results for the 12X4 are presented in FIG. 32. The 6X4 and 12X4 exhibited no difference in plate voltage between the two sections even though the filaments are also connected in series. Connecting the cathode to either side of the filament also showed no difference.

The tubes showed interesting results for the voltage between the filament and the cathode. Depending on the side of the filament used as a reference the voltage at the plate could be negative or positive. Undoubtedly this is because the filament and the cathode are so close together.

Since these tubes are used as rectifiers operating at hundreds of volts and are followed by DC filters these phenomena are of no consequence. They do show why, in tubes with gain used in amplifiers (such as triodes) a tube with a directly heated cathode filament operating on AC could introduce hum into the amplifier.

In vacuum tubes the direct effect of thermionic emission is small. However, thermionic emission does allow the vacuum tube to control large external currents. That is why they are used as rectifiers in power supplies. In flames, thermionic emission might also contribute to flame rectification. However, it is more likely that thermionic emission from the burner and from the flame rod produces large numbers of free electrons which promote conductivity and which are also scarfed up by the chemical ions and affect the electrical properties of the flame that way.

Experiment 6—Flame Battery with Different Flame Rod Materials

The previous tests were done with a commercial flame rod from a Ruud propane furnace. Then it was discovered that the flame voltage was different when the flame rod was made from different materials. See Table 8. The test with aluminum had to be done quickly because it melts in the flame. The tests were done using the instrumentation amplifier in FIG. 12 to reduce the stray AC from the mains. For measuring current the current sense resistor was 533 KOhms. The galvanized steel wire (AWG 14) did about the same as the Ruud Flame Rod, probably because the flame burned off whatever the steel was plated with. The surprise was that the silicon carbide did so well considering that the resistance of silicon carbide was so high compared to steel. (The resistance of the silicon carbide igniter was about 10 Ohms.) A higher resistance means that the electron mobility in the material is lower. Yet the work functions of the silicon carbide and the steel were similar.

TABLE 8

| Flame Rod Material | Flame Voltage | Current Sense Voltage | Current |
|---|---|---|---|
| Ruud Flame Rod (probably chromium plated steel) | −1.63 V | −154 mV | 0.29 uA |
| Galvanized Steel Wire (AWG 14) | −1.62 V | −164 mV | 0.31 uA |

TABLE 8-continued

| Flame Rod Material | Flame Voltage | Current Sense Voltage | Current |
|---|---|---|---|
| Aluminum Wire (AWG 14) | −3.00 V | −272 mV | 0.51 uA |
| Copper Wire (AWG 14) | −1.55 V | −162 mV | 0.30 uA |
| Nichrome 60 (AWG xx) | −1.27 V | −172 mV | 0.32 uA |
| Tungsten (AWG xx) | −392 mV | −96 mV | 0.18 uA |
| Silicon Carbide (Igniter, not powered) | −1.55 V | −164 mV | 0.31 uA |

Experiment 7—Flame Battery with Two Parallel Flame Rods

Two Ruud commercial flame rods were immersed in the flame about 0.75 inches above the burner and about 0.25 inches apart. The results were that that the open circuit flame voltage was slightly lower than a single rod but the flame current was slightly higher. See Table 9. The flame voltage for the two flame rods together may have been lower because, with their additional width, neither one could be placed directly in the middle of the flame.

TABLE 9

| | Voltage | Current |
|---|---|---|
| Single Flame Rod | −1.63 V | −0.29 uA |
| Two Flame Rods | −1.46 V | −0.35 uA |
| Difference | −10% | +21% |

Experiment 8—Flame Battery with Two Vertically Spaced Flame Rods

The two Ruud Flame Rods were placed in the flame vertically spaced and the voltage between them was measured. The lower flame rod was about 0.5 inches above the burner and the upper flame rod was placed about 0.5 inches above the lower flame rod. The voltage at the upper flame rod measured about −304 mV referenced to the lower flame rod. There are possible reasons for this.

1. The upper flame rod was cooler than the lower flame rod. As a result it produced fewer electrons by thermionic emission than the lower flame rod. The lower flame won.
2. The gas pressure moving the chemical ions past the lower flame rod toward the upper flame rod.

Experiment 9—Using Flame Rectification to Produce Harmonic Distortion in a Signal Source The apparatus shown in FIG. 19 and FIG. 20 was used to introduce a signal source to a flame rod immersed in a flame and to buffer the output (VOut). Source Resistor R3 (1902) was about 10 megohms. The output of the instrumentation amplifier 2004 was connected to an input of a Behringer Q502USB mixer which digitized the signal and sent it to a PC's USB port. The PC ran a program called Visual Analyzer which is a real time software program that contains a comprehensive set of measurement instruments, including an FFT Analyzer {IDS Cite 29}. The spectra of the signal source were measured both with and without a flame. Since the flame also acts as a load resistor the amplitude of the signal source was adjusted as needed to provide a consistent reference of −3 dB as reported by Visual Analyzer.

Signal generator 1901 was used to produce a low distortion sine wave at about 200 Hz. FIG. 33a shows the system with the flame off. When the flame was on, flame rectification caused harmonic distortion of the sine wave and produced harmonics, starting with the second harmonic at 400 Hz that was about 20 dB below the fundamental. See FIG. 33b. The frequency of 200 Hz was used because the harmonics of 200 Hz do not coincide with harmonics of the 60 Hz mains. Since FIG. 33a shows the system with the flame off, it proves that the harmonic distortion was caused by the flame. The reason 60 Hz is not used as the reference sine wave is because other equipment on the AC mains may cause distortion that could mimic the distortion caused by flame rectification. In addition, the AC mains power itself may be dirty, especially if it is coming from a portable generator or an inverter.

The experiment was repeated using a symmetrical square wave as a signal source. A symmetrical square wave contains the fundamental and odd harmonics only. See FIG. 34a for the signal with the flame off. The second harmonic (400 Hz) in FIG. 34b is produced by flame rectification, and is about 39 dB below the fundamental. Note that the fourth harmonic is 38 dB below the fundamental, slightly better than the second harmonic.

The sine wave experiment was repeated with a reference frequency of 400 Hz. FIG. 35a shows the spectrum without a flame. FIG. 35b shows the distortion caused by flame rectification. The second harmonic is about 18 dB below the fundamental, slightly better than the test at 200 Hz. The test was repeated at 400 Hz with a square wave. FIG. 36a shows the spectrum without a flame. FIG. 36b shows the distortion caused by flame rectification. The second harmonic is about 30 dB below the fundamental, about 9 dB better than the square wave test at 200 Hz.

Experiment 10—Using Flame Rectification as a Mixer to Produce Sum and Difference Frequencies of Two Signal Sources In this experiment the flame rectifier is used as a mixer. A mixer is a circuit that accepts two signal inputs and forms an output signal at the sum and difference frequencies of the two signals. See IDS Cite 30 (Horowitz).

One type of mixer is a four-quadrant multiplier. For example, if you multiply two sine wave signals:

$$\sin(\omega_1 t)*\sin(\omega_2 t) \qquad \text{Equation 1}$$

and use a well known trigonometric identity you get:

$$\tfrac{1}{2}*\cos(\omega_1-\omega_2)t - \tfrac{1}{2}*\cos(\omega_1+\omega_2)t \qquad \text{Equation 2}$$

Horowitz uses the example of multiplying two cosines:

$$\cos(\omega_1 t)*\cos(\omega_2 t) \qquad \text{Equation 3}$$

and uses a well known trigonometric identity to get $$\tfrac{1}{2}*\cos(\omega_1-\omega_2)t + \tfrac{1}{2}*\cos(\omega_1+\omega_2)t \qquad \text{Equation 4}$$

Both are equivalent because $\cos(\omega)=\sin(\pi/2-\omega)$

Any non-linear circuit will produce sum and difference frequencies. However, depending on the non-linearity it may also produce harmonics of the two signals as well as components having other frequencies. The flame rectifier produces that kind of non-linearity.

In this experiment two sine wave signals were used. The apparatus shown in FIG. 37 and FIG. 38 was used to introduce two signal sources to a flame rod immersed in a flame and to buffer the output (VOut). Source Resistor R3 (3702) and Source Resistor R5 (3704) were both about 10 megohms. The output of the instrumentation amplifier 3801 was connected to an input of a Behringer Q502USB mixer which digitized the signal and sent it to a PC's USB port. The PC ran a program called Visual Analyzer which is a real time software program that contains a comprehensive set of measurement instruments, including an FFT Analyzer {IDS Cite 29}. The spectra of the signal sources were measured both with and without a flame. Although the flame also acts as a load resistor the amplitudes of the signal sources was not adjusted between flame and no-flame tests.

Signal Source 1 (3701) was adjusted to produce a low distortion sine wave at about 900 Hz. Signal Source 2 (3703) was adjusted to produce a low distortion sine wave at about 1,300 Hz. FIG. 39a shows the two signals through the system with no flame. These signals were both at about −7 dB. With a flame (FIG. 39b) flame conductivity reduced the two signals to −12 dB. Flame rectification produced a signal at the Difference Frequency of 400 Hz (1,300−900), the Sum Frequency of 2,200 Hz (1,300+900), =400, and several other components. These other components are produced because the flame rectifier is not a four-quadrant multiplier. For example, there is a component at 500 Hz which is the difference between Signal Source 1 (3701) at 900 Hz and the Difference Frequency at 400 Hz.

We are only interested in the Sum and Difference Components. Their relative amplitudes are: the Difference Frequency (400 Hz) is 15 dB below the signal sources; the Sum Frequency (2,200 Hz) is also 15 dB below the signal sources.

In FIG. 40 Signal Source 1 is 900 Hz and Signal Source 2 is 1,460 Hz. It produces a Difference Frequency of 560 Hz and a Sum Frequency of 2,360 Hz. The difference between Signal Source 1 (3701) at 900 Hz and the Difference Frequency at 560 Hz is 340 Hz which is the component below the Difference Frequency (560 Hz) in FIG. 40.

In FIG. 41 Signal Source 1 (3701) is 900 Hz and Signal Source 2 (3703) is 1,350 Hz. It produces a Difference Frequency of 450 Hz and a Sum Frequency of 2,250 Hz. The difference between Signal Source 1 (3701) at 900 Hz and the Difference Frequency at 450 Hz is 450 Hz which is the same as the Difference Frequency so it does not appear as a separate component.

The important result is that these components are only produced by the presence of a flame.

The above mixer test was repeated with symmetrical square waves with Signal Source 1 (3701) having a frequency of about 910 Hz and Signal Source 2 (3703) having a frequency of about 1,410 Hz. FIG. 42a shows the results without a flame. Symmetrical square waves contain the fundamental with only odd harmonics. In FIG. 42a the harmonics of the square waves are not shown in order to focus on the fundamental frequencies and lower frequencies. FIG. 42b shows the results when a flame is present. Again, the harmonics of the square waves are not shown in order to focus on the fundamental frequencies and lower frequencies. As with the experiment with sine waves, when a flame is present the mixing of the two signal sources (910 Hz and 1,410 Hz) produces signals at the sum of the two mixing signals (at 2,320 Hz) and the difference of the two mixing frequencies (at 500 Hz) along with the difference between Signal Source 1 (3701) and the Difference Frequency at 410 Hz. (The other components will be ignored.)

We are only interested in the Sum and Difference Components. Their relative amplitudes are: the Difference Frequency (500 Hz) is 9 dB below the signal sources; the Sum Frequency (2,320 Hz) is 15 dB below the signal sources.

Experiment 11—Making a Simple Low Distortion Sine Wave Generator

In this experiment a Johnson Counter was used to make a simple sine wave generator and its output was analyzed. The circuit is shown in FIG. 43a.

A Johnson Counter is actually a shift register with the output of the last stage inverted and fed back to the input stage. As a result a shift register with n stages produces a sequence having 2*n states.

The Johnson Counter in FIG. 43a uses an eight-bit shift register (4301). The bit sequence starting from a cleared state is shown in the following Table 10:

TABLE 10

| A B C D E F G H |
|---|
| 0 0 0 0 0 0 0 0 |
| 1 0 0 0 0 0 0 0 |
| 1 1 0 0 0 0 0 0 |
| 1 1 1 0 0 0 0 0 |
| 1 1 1 1 0 0 0 0 |
| 1 1 1 1 1 0 0 0 |
| 1 1 1 1 1 1 0 0 |
| 1 1 1 1 1 1 1 0 |
| 1 1 1 1 1 1 1 1 |
| 0 1 1 1 1 1 1 1 |
| 0 0 1 1 1 1 1 1 |
| 0 0 0 1 1 1 1 1 |
| 0 0 0 0 1 1 1 1 |
| 0 0 0 0 0 1 1 1 |
| 0 0 0 0 0 0 1 1 |
| 0 0 0 0 0 0 0 1 |

The outputs of the shift register stages are connected to resistors having values calculated to take advantage of the symmetrical properties of a sine wave.

A simple oscillator for producing the clock signal for the shift register is shown in FIG. 43b. The Johnson Counter must start from one of the states in Table 10. The state of all zeroes is convenient because the 74HC164 shift register (4301) has an input to clear all of the registers. A circuit to produce a Reset signal on Power-up is shown in FIG. 43c.

The results are very good and are shown in FIG. 44. With a 210 Hz fundamental normalized at 0 dB the $2^{nd}$ harmonic is at −61 dB, the $3^{rd}$ harmonic is at −51 dB, and the $5^{th}$ harmonic is at −54 dB. Note that the second harmonic (at −61 dB) is even lower than the 60 Hz mains (at −54 dB) which gets into almost everything. The result is a sine wave with a total harmonic distortion (THD) of less than 0.4%. Therefore, even though the waveform looks a little chunky in the time domain (the upper part of FIG. 44) no filtering is needed to produce a low distortion sine wave with this simple circuit.

Low distortion sine waves may also be produced by well known analog circuits such as those using Operational Amplifiers or Operational Transconductance Amplifiers. The use of Operational Amplifiers to produce sine waves is taught in Sine-Wave Oscillator, Application Notes SLOA060 by Texas Instruments {IDS Cite 31}. An example of a low distortion sine wave generator using Operational Transconductance Amplifiers is shown in the datasheet for the LM13700 {IDS Cite 32, FIG. 17}. Low distortion sine waves may also be produced by well known digitals methods such by stepping through a table of sine values and sending them to a Digital-to-Analog Converter (DAC). As an alternative the sine values can be calculated algorithmically and sent to a DAC.

Experiment 12—Produce a Symmetrical Square Wave

A simple method for producing a symmetrical square wave is shown in FIG. 45. The 74HC14 Integrated circuit (4501) is an inverter with a Schmidt trigger input. The delay caused by capacitor C1 (4502) and resistors R1 and R2 (4503 and 4504) causes the inverter (4501) to oscillate. The 74HC74 (4505) symmetrically divides the output of inverter (4501) by two. The output is adjustable by potentiometer 4506, AC coupled, and then amplified by TL062 (4507).

Experiment 13—Detecting a Harmonic Signal Produced by Flame Rectification with a Phase Locked Loop (PLL)

The setup is shown in FIG. 46. Sine Wave 4601 (at 400 Hz) is applied through Source Resistor 4602 to Flame Rod 3. Flame Rod 3 is also connected to the input of High Impedance Buffer 4603 (shown in FIG. 47). The output of High Impedance Buffer 4603 is connected to the input of the 800 Hz Bandpass Filter 4604 (FIG. 49). As is shown in FIG. 49 the 800 Hz Bandpass Filter 4604 is made by cascading two 800 Hz Bandpass Filters, each of which is shown in FIG. 48. The output of 800 Hz Bandpass Filter 4604 is connected to the input of Phase Locked Loop 4605 (FIG. 50) which detects the 800 Hz second harmonic of Sine Wave 4601 caused by flame rectification. FIG. 51a and FIG. 51b show the results when a flame is not present. When a flame is not present the output of Phase Locked Loop 4605 is high (FIG. 51a) which means that Phase Locked Loop 4605 is not locked. FIG. 51b shows the output of 800 Hz Bandpass Filter 4604. The signal at 800 Hz is the result of ringing in Bandpass Filter 4604 and its amplitude is below the amplitude of the fundamental frequency at 400 Hz. It is even below the amplitude of the stray pickup of 60 Hz from the Mains. FIG. 52a and FIG. 52b show the results when a flame is present. When a flame is present the output of Phase Locked Loop 4605 is low which means that Phase Locked Loop 4605 is locked. As shown in FIG. 50 an LED (5001) is connected to the output of the Phase Locked Loop to serve as the "Flame Good" indicator so that it comes on when the output of the Phase Locked Loop is low.

There are two things to note about the 800 Hz signal. First, In FIG. 52b the amplitude is approximately 27 dB above the 400 Hz fundamental. Second, the 800 Hz signal has prominent sidelobes. These sidelobes are caused by flame rectification causing the stray 60 Hz mains to modulate the 800 Hz signal. The absence of these sidelobes in FIG. 51b (no flame) is further evidence that the 800 Hz signal in FIG. 51b is produced by ringing in 800 Hz Bandpass Filter 4904. This experiment successfully and reliably detects a flame.

An alternative, if it is desired to reduce the ringing see FIG. 53. Instead of using 800 Hz Bandpass Filter 4604 (FIG. 49) made by cascading two 800 Hz Bandpass Filters (from FIG. 48) a single 800 Hz Bandpass Filter 5302 (FIG. 48) can be used if it is preceded by a 400 Hz notch filter 5301 (FIG. 54b) to attenuate the 400 Hz fundamental of this arrangement. An example of a notch filter is shown in FIG. 54a. This is a series LC circuit. However, instead of using an actual inductor, a simulated inductor is used as shown in FIG. 54b.

The need for pre-filtering in this experiment was dictated by the dynamic range of the 567 phase locked loop that was used. A phase locked loop with a greater dynamic range would not need a pre-filter.

The previous experiment with the sine wave source was repeated but used a symmetrical square wave instead of a sine wave. FIG. 55 shows the setup, which is the same as for the sine wave test except that a symmetrical square wave (5501) is used. The results are shown in FIG. 56a and FIG. 56b (flame off) and FIG. 57a and FIG. 57b (flame on). The signal at 1200 Hz is the third harmonic of the square wave and is attenuated by Bandpass Filter 4604 about the same as the 400 Hz fundamental. This experiment also successfully and reliably detects a flame.

As with the sine wave test there was some ringing in the cascaded 800 Hz Bandpass Filter. This can also be reduced by using a single 800 Hz Bandpass Filter (FIG. 48) preceded by a 400 Hz notch filter (FIG. 54b) to attenuate the 400 fundamental. However, it may also require a notch filter to attenuate the signal at 1200 Hz (the third harmonic of the fundamental) produced by the square wave.

Experiment 14—Detecting a Harmonic Signal Produced by Flame Rectification with a Simple Synchronous Detector—Square Wave Signal Source The setup is shown in FIG. 58. As per Equation 2, when two signals are multiplied together signals at the sum and difference frequencies of the two signals are produced. If the frequencies of the two signals are the same, the sum frequency is twice the original frequency and the difference frequency is zero frequency. Zero frequency is DC. If the two input signals are normalized to an amplitude of 1.0 and the two frequencies are exactly in phase, the DC term is +1.0. If the two frequencies are 180 degrees out of phase the DC term is −1.0. If the two signals are 90 degrees out of phase the DC term is 0.0. If the two signals are of different frequencies, even if the difference is small, the DC term will also be zero. For example, if the two input frequencies are 1 Hz apart, then the difference frequency will be 1 Hz, not DC.

A Phase Locked Loop uses this principal to control the frequency of the Voltage Controlled Oscillator (VCO). The frequency of the VCO is driven so that the difference frequency between the VCO and the signal to be detected is zero. In our case we know exactly the frequency of the signal to be detected (the second harmonic) because we are generating the fundamental frequency. For this experiment we will use a crystal oscillator and a counter to produce the second harmonic (781.25 Hz). Half of that (390.63 Hz) is the fundamental. Because these two signals are produced by a digital counter operating from the same clock, their frequencies are exactly locked together. See FIG. 60, which is represented as Oscillator and Divider 5801 in FIG. 58.

Referring to FIG. 60, oscillator 6001 is a crystal oscillator module operating at 1 Mhz. A crystal oscillator was used because of its good temperature stability but other types of oscillators may be used. The first counter (6002) is configured as a divide-by-ten counter to produce a clock at 100 KHz. The second counter (6003) and third counter (6004) are configured as straight binary counters. The outputs used in this experiment are 781.25 Hz (Clock 7) and 390.63 Hz (Clock 8). In FIG. 61 the 390.63 Hz (Clock 8) signal goes through a level control and a DC blocking capacitor, and is amplified. This is represented as Signal Source 5802 in FIG. 58.

As shown in FIG. 58, Signal Source 5802 is connected to Flame Rod 3 through Source Resistor 5803. The junction of Flame Rod 3 and Source Resistor 5803 is connected to High Impedance Buffer 5804 shown in detail in FIG. 63. The output of High Impedance Buffer 5804 is connected to a first input of Multiplier/DC Filter 5805. A second input to Multiplier/DC Filter 5805 connected to the 781.25 Hz (Clock 7) which is the frequency of the second harmonic of Signal Source 5802 produced by Flame 2 when a flame is present. Referring to FIG. 64, Multiplier/DC Filter 5805 is a four quadrant multiplier that multiplies an analog signal by a digital signal. When Analog Switch 6403 is turned off, Op Amp 6404 operates only as an inverting amplifier with a gain of −1 [−1*R3 (6402)/R2 (6401)]. When Analog Switch 6403 is turned on, Op Amp 6404 still operates as an inverting amplifier with a gain of −1 [−1*R3 (6402)/R2 (6401)]. However it also operates as a non-inverting amplifier with a gain of +2 [1+R3 (6402)/R2 (6401)]. The net result is that it operates as a non-inverting amplifier with a gain of +1. Since the gain is switched between +1 and −1 the analog input is multiplied by either +1 or −1. The DC Filter is of conventional design and uses two cascaded first-order low pass filters.

Because the output of the 5805 Multiplier/DC Amp can range between positive and negative voltages depending on the phase between the second harmonic of Signal Source 5802 and the reference Clock 7 the absolute value of the voltage is taken in Absolute Value Amp 5806 (FIG. 65) so that it can only be positive, and a threshold test is applied in Threshold Detector 5807 (FIG. 66). When the voltage exceeds a selected value Flame Good Indicator 6601 (FIG. 66) is turned on. As an alternative, the threshold test can be for the voltage being greater than the positive threshold or less than the negative threshold. The method used for this test will be to take the absolute value and use a single positive threshold test. FIG. 65 and FIG. 66 are combined in FIG. 67. The advantage of this system is that its operation is not sensitive to temperature. As long as oscillator 6001 (FIG. 60) is working everything else is locked to that frequency even if the oscillator drifts some.

As was previously discussed even if the two signals have exactly the same frequency but are 90 degrees out of phase the output of the multiplier will be zero. How could this 90 degree phase shift happen? It could happen because in some systems the wire going to the flame rod may be bundled with other wires creating appreciable capacitance on the flame rod wire. See Experiment #1. One way of dealing with this potential problem is to be able to have an adjustable time delay in one of the signals, either the fundamental frequency going to the flame rod (390.63 Hz) or in the second harmonic signal (781.25 Hz) going to the Multiplier 5805. The time delay produces a phase delay. See FIG. 59 with Phase Delay 5901. An example of a simple circuit to produce an adjustable time delay is shown in FIG. 62.

The results of the test using the setup of FIG. 59 are shown in FIG. 68a (flame off) and FIG. 68b (flame on). The top part of each figure is the spectrum at the output of High Impedance Buffer 5804. No bandpass filter was used. The bottom part of each figure is a screen capture of the voltage at the output of Absolute Value Amp 5806.

With the flame off (FIG. 68a) the spectrum shows the fundamental of the square wave signal source of 390.63 Hz at the reference of 0 dB. The third harmonic (1171.89 Hz) is 12 dB below that. The second harmonic (781.25 Hz) is an artifact of some kind but is 48 dB below the fundamental. The stray AC from the 60 Hz mains is 31 dB below the fundamental. The output of Absolute Value Amp 5806 is about 0.3 Volts.

With the flame on (FIG. 68b) the spectrum shows the fundamental of the square wave signal source of 390.63 Hz at −4 dB. The third harmonic (1171.89 Hz) is 12 dB below that. The second harmonic (781.25 Hz) is 26 dB below the fundamental. The stray AC from the 60 Hz mains is 29 dB below the fundamental. The output of Absolute Value Amp 5806 is about 1.3 Volts. This gives a ratio of 1.3/0.3=4.3:1 for flame on versus flame off. The use of a bandpass filter (FIG. 49) would improve this ratio but even without it this test with the Meker Burner shows this circuit to be a robust system for detecting the presence of a flame.

The drawbacks of using an adjustable phase delay circuit (FIG. 62) are that: 1) it has to be adjusted and 2) the capacitance in the cable bundle could change if the cable bundle is moved around. Another way to deal with the problem of phase delay is to use a quadrature detector as shown in FIG. 69. The quadrature detector uses two multipliers. The first input of both the first Multiplier 5805 and the second Multiplier 6902 comes from the High Impedance Buffer 5804. In the first Multiplier (5805) the second input is the 781.25 Hz reference. In the second Multiplier (6902) the second input is the 781.25 Hz signal delayed by 90 degrees. This 90 degree delay is performed by the circuit in FIG. 70a. The timing chart of the circuit is shown in FIG. 70b. The output of Multiplier 5805 goes to Absolute Value Amp 5806 and the output of Multiplier 6902 goes to Absolute Value Amp 6903. The outputs of Absolute Value Amp 5806 and Absolute Value Amp 6903 are then added in Adder 6904. (The precise magnitude would be obtained by taking the square root of the sum of squares. In this application it is sufficient to simply sum the absolute values.) Threshold Detector 5807 (shown in detail in FIG. 66) applies a threshold test and, when the voltage is above a selected threshold, turns on Flame Good Indicator 6601. The use of the quadrature detector makes any phase delay in the system irrelevant.

Performance can be improved by using a low distortion sine wave instead of a symmetrical square wave. FIG. 71 shows a low distortion sine wave used for the Signal Source with a quadrature detector. For simplicity square waves are used in the quadrature detector. Sine waves could be used there, too, which would require additional circuit complexity. It would also require that the multipliers accept two analog signals instead of one analog signal and one digital signal. Such multipliers are more expensive than the simple circuit shown in FIG. 64.

In FIG. 71 Signal Source 7101 uses the Johnson Counter shown in FIG. 43a. Since the Johnson Counter uses 16 clocks for a single sine wave period the input clock is 16×390.63≈6.25 KHz. The remainder of the circuits operates the same way as the circuit in FIG. 69

Experiment 15—Using Flame Rectification to Mix Two Signals and Detect the Difference Frequency (the Heterodyne Method)

These experiments were done with the two signal sources having symmetrical square waves. As Experiment 10 shows, the results can be expected to be substantially the same if two low distortion sine waves were used. Experiment 10 was done first with sine waves with the results shown in FIGS. 39a and 39b and then with symmetrical square waves with the results shown in FIGS. 42a and 42b.

While two free running oscillators may be used to produce the two signal sources this can only be used when a phase locked loop is used to detect the difference signal produced by flame rectification. Since the use of a synchronous detector requires that the two signal sources and the reference signal be locked together, for the purposes of this experiment a common clock will be used to produce the signal sources even when a phase locked loop is used for the detector.

Also, although this experiment will detect the difference signal, it is equally applicable to a system that detects the sum frequency.

Since we want to have a master clock from which we can derive three frequencies that cannot be derived from each other we start by producing the product of the three frequencies. That way we know we can derive each frequency from the master clock. We will select 900 Hz and 1,300 Hz to give us a difference frequency of 400 Hz. The product of 900*1,300*400=468.0 Mhz. We can scale that down quite a bit with integers. See the following Table 11.

TABLE 11

| | | Master Clock (Hz) | Divisor 1 | Freq 1 | Divisor 2 | Freq 2 | Divisor 3 | Freq 3 |
|---|---|---|---|---|---|---|---|---|
| | | 468,000,000 | 520,000 | 900.000 | 360,000 | 1,300.00 | 1170000 | 400 |
| Divide by | 1000 | 468,000 | 520 | 900.000 | 360 | 1,300.00 | 1170 | 400 |
| Divide by | 5000 | 93,600 | 104 | 900.000 | 72 | 1,300.00 | 234 | 400 |

If we start with a 1 MHz oscillator we can divide 1 MHz by 11 and get 90.909 KHz. If we use that instead of 93.600 KHz, by using the same divide ratios we get frequencies of: Frequency 1=874.126 Hz, Frequency 2=1,262.626 Hz, and Frequency 3=388.500 Hz. Frequency 1 will be Signal Source 1, Frequency 2 will be Signal Source 2, and Frequency 3 will be the difference frequency between Frequency 1 and Frequency 3. The difference frequency is also scaled, and becomes 388.500 Hz.

Since all of the divide ratios are even we will divide them by two to double all the resulting output frequencies and then divide the resulting output frequencies by two to obtain symmetrical square waves. The clock chain is shown in FIG. 72, FIG. 73, and FIG. 74. In FIG. 72 the master oscillator Clock 1 (7201) operates at 1 MHz. Counter 7202 divides it by 11 to produce Clock 2 at 90.909 KHz. Counters 7203 and 7204 divide it by 52 to produce Clock 3 at 1,748 Hz. Flip Flop 7205 divides it by two to produce Clock 4 at 874.126 Hz (Frequency 1). In FIG. 73 Counters 7301 and 7302 divide Clock 2 (90.909 KHz) by 36 to produce Clock 5 at 2,525.252 Hz. Flop Flop 7303 divides it by two to produce Clock 6 at 1,262.626 Hz (Frequency 2). In FIG. 74 Counter 7401 and 7402 divide Clock 2 (90.909 KHz) by 117 to produce Clock 7 at 777.001 Hz. Flop Flop 7403 divides it by two to produce Clock 8 at 388.500 Hz (Frequency 3). Flip Flop 7404 uses Clock 7 and Clock 8 to produce a quadrature version of Clock 8. However, because Clock 8 is not symmetrical, instead of Clock 8Q being 90 degrees out of phase with Clock 8, it is about 79 degrees out of phase. That is close enough for this application. If necessary it can be made closer by using the existing clocks with additional circuitry.

When it is desired to use low distortion sine waves for Signal Source 1 and Signal Source 2 this can be accomplished by using a 16 MHz oscillator for oscillator 7201 which will scale all frequencies by a factor of 16. Signal Source 1 and Signal Source 2 can then be produced by using a Johnson Counter shown in FIG. 43a for each signal source. Where the difference reference of 388.500 is to be a square wave Clock 8 may be further divided by 16. Where the difference reference is to be a sine wave, Clock 8 can be used with the Johnson Counters shown in FIG. 84 to produce both sine and cosine versions of the difference reference of 388.500 Hz.

The system where the Signal Detector is a phase locked loop is shown in FIG. 75. The Clock Generator 7501 produces and combines Signal Source 1 and Signal Source 2 to produce the Source Sum 7304. (The details are shown in FIG. 72, FIG. 73, and FIG. 74.) The Source Sum 7304 is connected to Flame Rod 3 through Source Resistor 7502. The junction of Flame Rod 3 and Source Resistor 7502 is also connected to the input of High Impedance Buffer 7503. The output of High Impedance Buffer 7503 is connected to the input of Bandpass Filter 7504 (shown in detail in FIG. 77). The Output of Bandpass Filter 7504 is connected to the input of Phase Locked Loop 7505 (shown in detail in FIG. 78). When Flame 2 is present it acts as a mixer to produce signals at the sum and difference frequencies of Signal Source 1 and Signal Source 2. Phase Locked Loop 7505 is configured to detect the signal at the difference frequency. When a flame is present the output of Phase Locked Loop 7505 (shown in more detail in FIG. 78) turns on the Flame Good Indicator 7801.

In the results shown by the Visual Analyzer program the signal was taken at the output of Bandpass Filter 7504. FIG. 79a shows the spectrum with the flame off. As with the harmonic tests there is some ringing in Bandpass Filter 7504 at 388.5 Hz. FIG. 79b shows the spectrum with the flame on. With the flame on, the Difference Frequency (388.5 Hz) is about 36 dB louder than it is with the flame off. The amplitude with the flame off is below the detection threshold of Phase Locked Loop 7505. With the flame on, Phase Locked Loop 7505 robustly detects the 388.5 Hz difference frequency. As noted previously, the need for pre-filtering was dictated by the dynamic range of the 567 phase locked loop that was used. A phase locked loop with a greater dynamic range would not need a pre-filter.

The system where the Signal Detector is a simple synchronous detector is shown in FIG. 80. The Clock Generator 7501 produces and combines Signal Source 1 and Signal Source 2 to produce the Source Sum 7304. (The details are shown in FIG. 72, FIG. 73, and FIG. 74.) The Source Sum 7304 is connected to Flame Rod 3 through Source Resistor 7502. Clock Generator 7501 also produces a Reference Signal Clock8 at the frequency of the difference frequency between Signal Source 1 and Signal Source 2. Clock8 goes to Phase Delay 8001 (shown in detail in FIG. 81) which provides an adjustable phase delay (Clock8D) for those systems that need it. For those systems that do not need the phase delay it can be omitted and Clock8 is used instead of Clock8D. The junction of Flame Rod 3 and Source Resistor 7502 is also connected to the input of High Impedance Buffer 7503. The output of High Impedance Buffer 7503 is connected to a first input of Multiplier/DC Filter 8002. (The details of Multiplier/DC Filter 8002 are shown in FIG. 64.) The second input of Multiplier/DC Filter 8002 is connected to the output of Phase Delay 8001 Reference Signal Clock8D. The output of Multiplier/DC Filter 8002 is connected to the input of Absolute Value Amp 8003 which produces the absolute value of its input. The output of Absolute Value Amp 8003 is connected to the input of Threshold Detector 8004. (The details of Threshold Detector 8004 are shown in FIG. 66.) Threshold Detector 8004 applies a threshold test and, when the voltage is above a selected threshold, turns on Flame Good Indicator 6601. The results are shown in FIG. 82*a* and FIG. 82*b*, looking at the output of Absolute Value Amp 8003. FIG. 82*a* shows an output of 0.1 volts with the flame off. FIG. 82*b* shows an output of 2.4 volts with the flame on. Therefore, this method robustly detects the presence of a flame.

The system where the Signal Detector is a quadrature synchronous detector is shown in FIG. 83. The Clock Generator 7501 produces and combines Signal Source 1 and Signal Source 2 to produce the Source Sum 7304. (The details are shown in FIG. 72, FIG. 73, and FIG. 74.) The Source Sum 7304 is connected to Flame Rod 3 through Source Resistor 7502. Clock Generator 7501 also produces a Reference Signal Clock8 at the frequency of the difference frequency between Signal Source 1 and Signal Source 2. Clock Generator 7501 also produces Reference Signal Clock8Q which has the same frequency as Reference Signal Clock8 but is nominally 90 degrees out of phase. (In this implementation it is 79 degrees out of phase). The Source Sum 7304 is connected to Flame Rod 3 through Source Resistor 7502. The junction of Flame Rod 3 and Source Resistor 7502 is also connected to the input of High Impedance Buffer 7503. The output of High Impedance Buffer 7503 is connected to the first input of Multiplier/DC Filter 8002 as well as to the first input of Multiplier/DC Filter 8301. (The details of Multiplier/DC Filter 8002 and Multiplier/DC Filter 8301 are shown in FIG. 64.) The second input of Multiplier/DC Filter 8002 is connected to Reference Signal Clock8. The second input of Multiplier 8301 is connected to Reference Signal Clock8Q. The output of Multiplier/DC Filter 8002 is connected to the input of Absolute Value Amp 8003 which produces the absolute value of its input. The output of Multiplier/DC Filter 8301 is connected to the input of Absolute Value Amp 8302 which produces the absolute value of its input. The outputs of Absolute Value Amp 8003 and Absolute Value Amp 8302 are summed in Adder 8303. The output of Adder 8303 is connected to the input of Threshold Detector 8004. (The details of Threshold Detector 8004 are shown in FIG. 66.) Threshold Detector 8004 applies a threshold test and, when the voltage is above a selected threshold, turns on Flame Good Indicator 6601.

OBJECTS AND ADVANTAGES

The objects and advantages of the current invention are to produce a flame sensing system that uses a low voltage and does not rely on the connection between AC Mains neutral and ground. In addition, in some of the embodiments the operation of the circuits is not subject to temperature sensitivity. If the components are rated to work at −40 degrees Celsius then the flame sensing system will work at −40 degrees Celsius.

SUMMARY OF THE INVENTION

In the following preferred embodiments flame rectification is used to cause distortion of a selected waveform. The term "selected waveform" means a waveform selected to not have substantial harmonics of interest of the fundamental frequency. An example of a selected waveform is a symmetrical square wave. A symmetrical square wave contains components at the fundamental frequency and only odd harmonics. Any even harmonics present will be due solely to the distortion caused by flame rectification, so the even harmonics will be the harmonics of interest. A symmetrical square wave can be produced by several well known methods such as by a simple free-running oscillator followed by a flip-flop to divide the frequency by two to make it symmetrical, or by a stable oscillator such as a crystal oscillator followed by a divider chain as required. Another example of a selected waveform is a low distortion sine wave. A low distortion sine wave contains only the fundamental frequency. Any harmonics present (whether even or odd) will be due solely to the distortion caused by flame rectification and will therefore be harmonics of interest. A low distortion sine wave can be produced by several well known methods including the use of a Johnson Counter.

In a first preferred embodiment a flame rod is located where it will be immersed in a flame (when a flame is present) and flame rectification is used to cause distortion in a selected waveform. Because the distortion caused by the flame rectifier produces harmonics of interest the waveform is selected to not contain those harmonics. Since the flame's electrical characteristics constitute a high impedance circuit a high impedance buffer is used to buffer the signal. The selected harmonic of the selected waveform is detected by a Phase-Lock-Loop (PLL). If necessary a filter can be used to reduce the possibility of saturating the input of the PLL. For example, this filter may comprise a high pass filter to reduce the fundamental, a notch filter to reduce the fundamental, or a bandpass filter to pass the selected harmonic, all using well-known circuits. Since the selected harmonic is produced only in the presence of a flame this constitutes proof of flame which can be displayed on an indicator and/or used by a furnace controller.

In a second preferred embodiment a flame rod is located where it will be immersed in a flame (when a flame is present) and flame rectification is used to cause distortion in a selected waveform. Because the distortion caused by the flame rectifier produces harmonics of interest the waveform is selected to not contain those harmonics. Since the flame's electrical characteristics constitute a high impedance circuit a high impedance buffer is used to buffer the signal. The selected harmonic of the selected waveform is detected by a simple synchronous detector which is a multiplier that multiplies the signal from the high impedance buffer by a reference signal at the same frequency as the selected harmonic. This reference signal should be produced from the oscillator that produces the selected waveform. The output of the simple synchronous detector is filtered by a simple DC filter and may be further processed in an absolute value amplifier to form the absolute value of the results. The results go to a threshold detector having a selectable threshold and which produces a signal indicating the presence of the selected harmonic. Since the selected harmonic is produced only in the presence of a flame this constitutes proof of flame which can be displayed on an indicator and/or used by a furnace controller.

In a third preferred embodiment a flame rod is located where it will be immersed in a flame (when a flame is present) and flame rectification is used to cause distortion in a selected waveform. Because the distortion caused by the flame rectifier produces harmonics of interest the waveform is selected to not contain those harmonics. Since the flame's electrical characteristics constitute a high impedance circuit a high impedance buffer is used to buffer the signal. The selected harmonic of the selected waveform is detected by a quadrature synchronous detector of standard design which makes the signal detector insensitive to phase. The quadrature synchronous detector consists of two multipliers. The output of the high impedance buffer goes to the first input of the first multiplier and also to the first input of the second multiplier. The second input to the first multiplier receives a first reference signal having the same frequency as the selected harmonic to be detected and is derived from the fundamental frequency of the selected waveform. The second input to the second multiplier receives a second reference that is substantially 90 degrees out of phase with the first reference signal. The output of each multiplier is separately processed in its own absolute value amplifier to form the absolute value of each result. The output of each absolute value amplifier is summed in an adder. The output of the adder goes to a threshold detector having a selectable threshold and which produces a signal indicating the presence of the selected harmonic. Since the selected harmonic is produced only in the presence of a flame this constitutes proof of flame which can be displayed on an indicator and/or used by a furnace controller.

In the following preferred embodiments flame rectification is used as a mixer to cause two signals having selected waveforms to produce sum and difference signals.

In a fourth preferred embodiment a flame rod is located where it will be immersed in a flame (when a flame is present) and flame rectification is used as a mixer to cause two signals having selected waveforms to produce sum and difference signals. Since the flame's electrical characteristics constitute a high impedance circuit a high impedance buffer is used to buffer the signals. The sum and/or difference signals are detected thereby providing flame proof. The two signals having selected waveforms should be of different frequencies. Since the flame's electrical characteristics constitute a high impedance circuit a high impedance buffer is used to buffer the signal. As an example, the difference frequency of the two selected waveforms is detected by a Phase-Lock-Loop (PLL). If necessary a filter can be used to reduce the possibility of saturating the input of the PLL. For example, this filter may comprise a bandpass filter to pass the difference frequency. Since the difference frequency is produced only in the presence of a flame the detection of a signal at the difference frequency constitutes proof of flame which can be displayed on an indicator and/or used by a furnace controller.

In a fifth preferred embodiment a flame rod is located where it will be immersed in a flame (when a flame is present) and flame rectification is used as a mixer to cause two signals having selected waveforms to produce sum and difference signals. Since the flame's electrical characteristics constitute a high impedance circuit a high impedance buffer is used to buffer the signals. The sum and/or difference signals are detected thereby providing flame proof. The two signals having selected waveforms should be of different frequencies. Since the flame's electrical characteristics constitute a high impedance circuit a high impedance buffer is used to buffer the signal. As an example, the difference signal at the difference frequency of the two selected waveforms is detected by a detector using a simple synchronous detector which is a multiplier that multiplies the signal from the high impedance buffer by a reference signal at the same frequency as the difference frequency. This reference signal should be produced from the oscillator that produces the selected waveform. The output of the simple synchronous detector is filtered by a simple DC filter and may be further processed in an absolute value amplifier to form the absolute value of the results. The results go to a threshold detector having a selectable threshold and which produces a signal indicating the presence of the difference signal. Since the difference signal is produced only in the presence of a flame this constitutes proof of flame which can be displayed on an indicator and/or used by a furnace controller.

In a sixth preferred embodiment a flame rod is located where it will be immersed in a flame (when a flame is present) and flame rectification is used as a mixer to cause two signals having selected waveforms to produce sum and difference signals. Since the flame's electrical characteristics constitute a high impedance circuit a high impedance buffer is used to buffer the signals. The sum and/or difference signals are detected thereby providing flame proof. The first signal and the second signal should be of different frequencies. The sum and/or difference frequencies may be detected by using a quadrature synchronous detector of standard design which makes the signal detector insensitive to phase. The quadrature synchronous detector consists of two multipliers. The output of the high impedance buffer goes to the first input of the first multiplier and also to the first input of the second multiplier. The second input to the first multiplier receives a first reference signal having the same frequency as the difference signal to be detected and is derived from the clock that produces the two selected waveforms. The second input to the second multiplier receives a second reference that is substantially 90 degrees out of phase with the first reference signal. The output of each multiplier is further processed in its own absolute value amplifier to form the absolute value of each result. The output of each absolute value amplifier is summed in an adder. The output of the adder goes to a threshold detector having a selectable threshold and which produces a signal indicating the presence of the difference signal. Since the difference signal is produced only in the presence of a flame this constitutes proof of flame which can be displayed on an indicator and/or used by a furnace controller.

In all of the preferred embodiments the circuitry can be mostly analog or it can be a combination of less analog and more digital. For example, the selected waveforms may be produced using a Direct Digital Synthesizer (DDS). In addition, such as a system using only a flame rod, a high impedance buffer, and a digital signal processor (DSP) or a suitable microcontroller having an analog-to-digital converter (ADC) the DSP (or microcontroller) can use software to perform the functions of producing symmetrical square waves (or low distortion sine waves), implementing a synchronous detector (either simple or quadrature), and driving an indicator. The use of a DSP (or microcontroller) also presents an additional option. The mostly analog systems described that use a synchronous detector are performing a continuous Fourier Transform at a selected frequency. The DSP (or microcontroller) can also do that. Alternatively, it can do the following:

1. Use either a prestored frame of data representing the Signal Source or calculate a frame of the Signal Source during runtime;
2. At substantially the same time that the frame of data representing the Signal Source is being sent out, capturing a frame of data from the High Impedance Buffer;
3. After the frame of data is captured it can be analyzed by the DSP (or microcontroller) by using a Discrete Fourier Transform at the desired frequency (or a few desired frequencies) or by performing a full Fast Fourier Transform (FFT) to analyze the full spectrum.

4. Since it is not necessary for data frames to be continuous a data frame can be sent and captured, then the DSP (or microcontroller) can take some time to perform the analysis of the received data frame.

An example of how this may be used is to look at the 60 Hz stray pickup from the Mains. This information could be used during manufacturing or installation to warn of cable placement problems. The analysis of the data may also be used to characterize flame quality.

In addition to its uses in gas furnaces the embodiments of the invention may also be used in other appliances such as gas hot water heaters and gas ovens. Another application may be in outdoor gas grills, heaters or torches where the flame may be extinguished by the wind. In this application the circuitry may be powered by batteries recharged by solar photovoltaic cells. A control unit for the unit may also be used to provide additional functions such as a clock/timer. It may also use a sensor such as a strain gauge to measure the weight of a fuel tank (such as a propane cylinder) to accurately measure the amount of fuel remaining. It may also contain a security camera, microphone, and motion sensor. The invention may also be used in jet engines and rocket engines where flame detection is critical because flames are essential to their operation.

BRIEF DESCRIPTION OF THE DRAWINGS

The invention may best be understood by referring to the following description and accompanying drawings which illustrate the invention. In the drawings:

FIG. 14 is a reproduction of Table 5.4 from the Turns reference (Reference 12).

FIG. 15 is a reproduction of Table 17.12 from the Turns reference (Reference 12).

FIG. 16 is a reproduction of Table 1-1 from the Nichicon reference (Reference 24).

FIG. 17 is a general illustration showing the method used for measuring the flame conductivity when driven by a DC source.

FIG. 18 is a general illustration showing the electrical circuit for the method used for measuring the flame conductivity when driven by a DC source.

FIG. 19 is a general illustration showing the method used for measuring the flame conductivity when driven by an AC signal source.

FIG. 20 is a general illustration showing the electrical circuit for the method used for measuring the flame conductivity when driven by an AC signal source.

FIG. 29 is the table of test data obtained by testing a 5U4 GB vacuum tube.

FIG. 30 is the table of test data obtained by testing a 5Y3GT vacuum tube.

FIG. 31 is the table of test data obtained by testing a 6X4 vacuum tube.

FIG. 32 is the table of test data obtained by testing a 12X4 vacuum tube.

FIG. 33a is a screen capture of the display of a spectrum analyzer program showing the results of an experiment in flame rectification done with a sine wave at 200 Hz with no flame. FIG. 33b is a screen capture of the display of a spectrum analyzer program showing the results of an experiment in flame rectification done with a sine wave at 200 Hz with a flame.

FIG. 34a is a screen capture of the display of a spectrum analyzer program showing the results of an experiment in flame rectification done with a square wave at 200 Hz with no flame. FIG. 34b is a screen capture of the display of a spectrum analyzer program showing the results of an experiment in flame rectification done with a square wave at 200 Hz with a flame.

FIG. 35a is a screen capture of the display of a spectrum analyzer program showing the results of an experiment in flame rectification done with a sine wave at 400 Hz with no flame. FIG. 35b is a screen capture of the display of a spectrum analyzer program showing the results of an experiment in flame rectification done with a sine wave at 400 Hz with a flame.

FIG. 36a is a screen capture of the display of a spectrum analyzer program showing the results of an experiment in flame rectification done with a square wave at 400 Hz with no flame. FIG. 36b is a screen capture of the display of a spectrum analyzer program showing the results of an experiment in flame rectification done with a square wave at 400 Hz with a flame.

FIG. 39a is a screen capture of the display of a spectrum analyzer program showing the results of an experiment using flame rectification as a mixer done with sine waves at 900 Hz and 1,300 Hz with no flame present. FIG. 39b is a screen capture of the display of a spectrum analyzer program showing the results of an experiment using flame rectification as a mixer done with sine waves at 900 Hz and 1,300 Hz with a flame present.

FIG. 40 is a screen capture of the display of a spectrum analyzer program showing the results of an experiment using flame rectification as a mixer done with sine waves at 900 Hz and 1,460 Hz with a flame present.

FIG. 41 is a screen capture of the display of a spectrum analyzer program showing the results of an experiment using flame rectification as a mixer done with sine waves at 900 Hz and 1,350 Hz with a flame present.

FIG. 42a is a screen capture of the display of a spectrum analyzer program showing the results of an experiment using flame rectification as a mixer done with square waves at 910 Hz and 1,410 Hz with no flame present. FIG. 42b is a screen capture of the display of a spectrum analyzer program showing the results of an experiment using flame rectification as a mixer done with square waves at 910 Hz and 1,410 Hz with a flame present.

FIG. 43a is a general illustration showing an electrical circuit for using a Johnson Counter to produce a sine wave. FIG. 43b is a general illustration showing an electrical circuit for a simple clock oscillator. FIG. 43c is a general illustration showing an electrical circuit for a simple Power-On-Reset circuit.

FIG. 44 is a screen capture of the display of a spectrum analyzer program showing the spectrum produced by using a Johnson Counter to generate a sine wave.

FIG. 47 is a general illustration showing an electrical circuit for an AC coupled high impedance buffer.

FIG. 48 is a general illustration showing an electrical circuit for a bandpass filter.

FIG. 49 is a general illustration showing two of the bandpass filters of FIG. 52 cascaded.

FIG. 51a and FIG. 51b are screen captures of a test with the flame off.

FIG. 52a and FIG. 52b are screen captures of a test with the flame on.

FIG. 56a and FIG. 56b are screen captures of a test with the flame off.

FIG. 57a and FIG. 57b are screen captures of a test with the flame on.

FIG. 63 is a general illustration showing an electrical circuit for an AC coupled high impedance buffer.

FIG. 64 is a general illustration showing an electrical circuit for a multiplier and DC filter.

FIG. 65 is a general illustration showing an electrical circuit for an amplifier that produces the absolute value of its input.

FIG. 66 is a general illustration showing an electrical circuit for a threshold detector and output indicator FIG. 67 is a general illustration showing the combination of FIG. 65 and FIG. 66.

FIG. 68a shows screen captures of the results of a test with the flame off. FIG. 68b shows screen captures of the results of a test with the flame on.

FIG. 70b is a general illustration of a timing chart showing the timing signals for FIG. 71a.

FIG. 76 is a general illustration showing an electrical circuit for a bandpass circuit.

FIG. 77 is a general illustration showing two bandpass circuits cascaded.

FIG. 79a and FIG. 79b are screen captures of a test using a phase locked loop detector.

FIG. 82a and FIG. 82b are screen captures of a heterodyne test using a simple synchronous detector.

DETAILED DESCRIPTION

In the following description, numerous specific details are set forth to provide a thorough understanding of the invention. However, it is understood that the invention may be practiced without these specific details. In other instances well-known circuits, structures, and techniques have not been shown in detail in order not to obscure the invention.

In the first embodiment flame rectification causes distortion of a signal source having a selected waveform, producing a selected harmonic signal that does not otherwise exist in the selected waveform. In this specific example the selected harmonic is the second harmonic but other harmonics may be selected. The selected harmonic is detected by using a phase locked loop.

Figure 85:
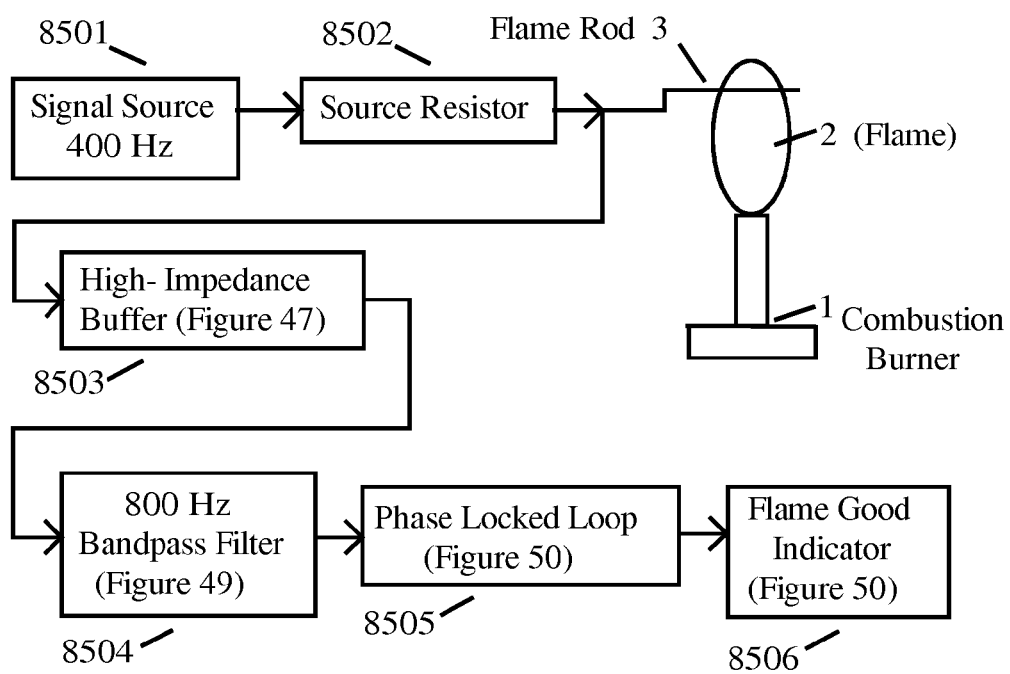
FIG. 85 is a general illustration showing the use of flame rectification to produce harmonic distortion of a selected waveform and detect the harmonic distortion with a phase locked loop.

The system is shown in FIG. 85. Signal Source 8501 produces a 400 Hz Selected Waveform that is selected to not contain even harmonics. Examples of selected waveforms that do not contain even harmonics include low distortion sine waves and symmetrical square waves. Signal Source 8501 is applied through Source Resistor 8502 to Flame Rod 3. Flame Rod 3 is also connected to the input of High Impedance Buffer 8503 (shown in more detail in FIG. 47).

Figure 1:
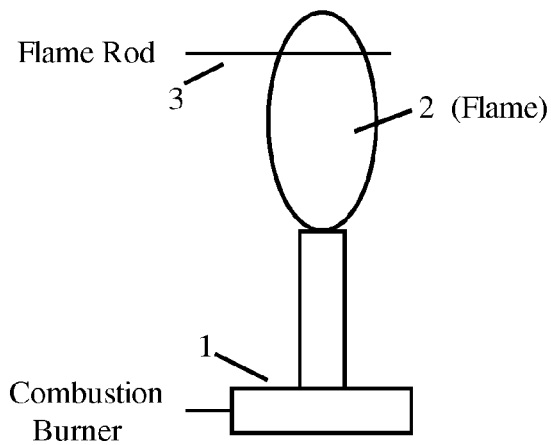
FIG. 1 is a general illustration showing a flame rod immersed in a flame produced by a combustion burner.
Figure 2:
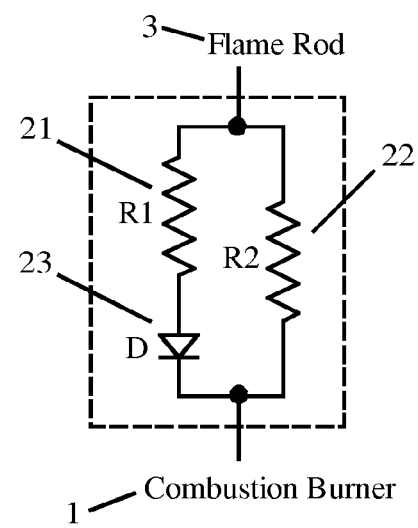
FIG. 2 is a general illustration showing an electrical model of a flame rod immersed in a flame produced by a combustion burner.
Figure 3:
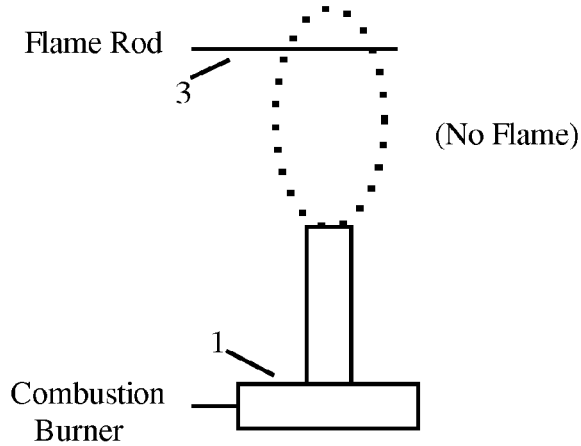
FIG. 3 is a general illustration showing a flame rod and a combustion burner but no flame.
Figure 4:
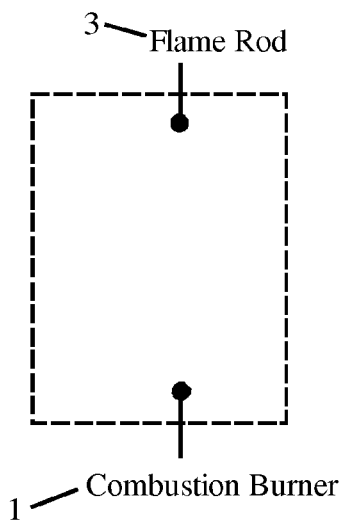
FIG. 4 is a general illustration showing an electrical model of a flame rod and a combustion burner but no flame.
Figure 5:
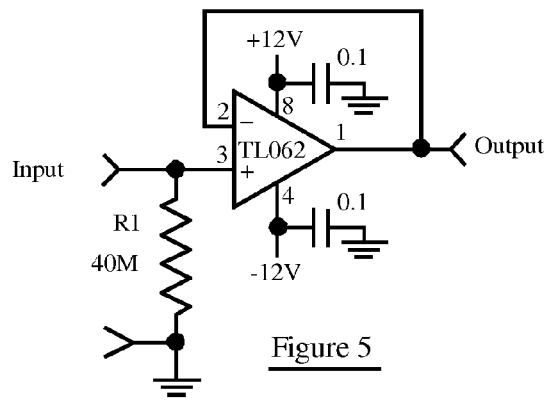
FIG. 5 is a general illustration showing the electrical circuit for a high impedance unbalanced buffer.
Figure 6:
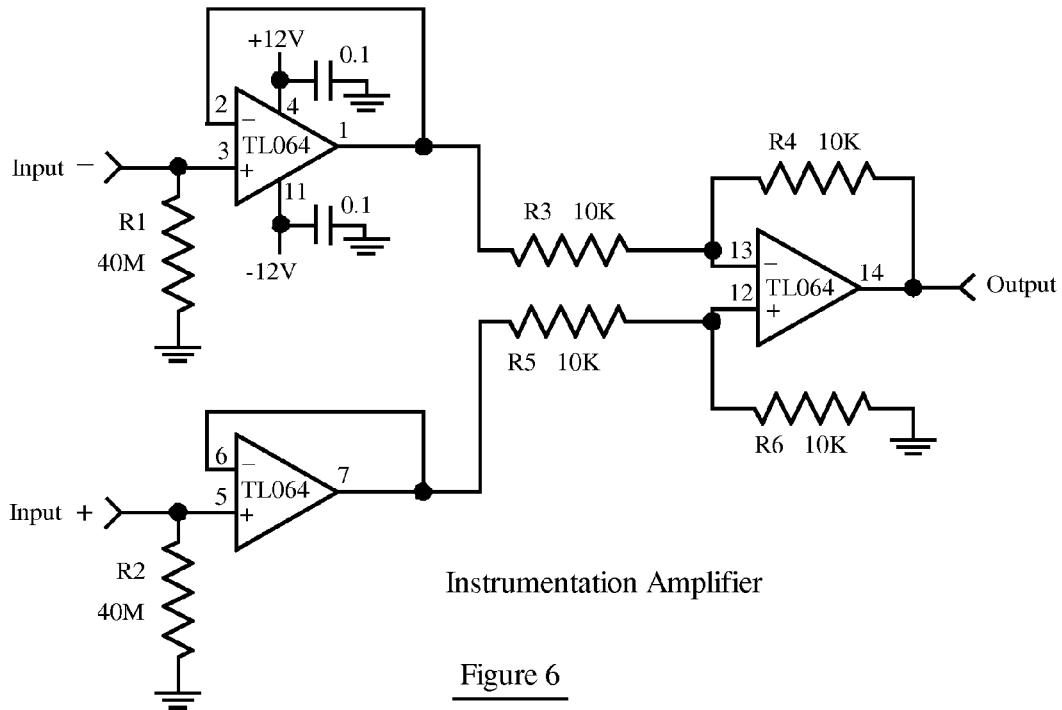
FIG. 6 is a general illustration showing the electrical circuit for a high impedance balanced instrumentation amplifier.
Figure 7:
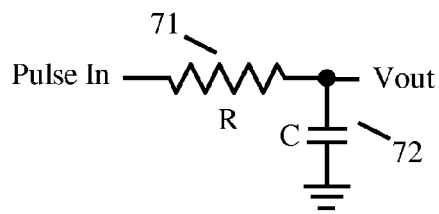
FIG. 7 is a general illustration showing the RC model used to determine the capacitance of two wires positioned next to each other.
Figure 8:
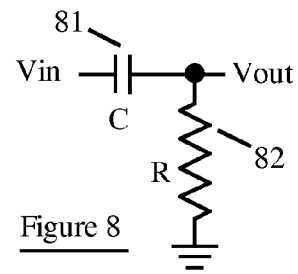
FIG. 8 is a general illustration of the RC model used to determine the voltage produced in a resistor from capacitive coupling.
Figure 9:
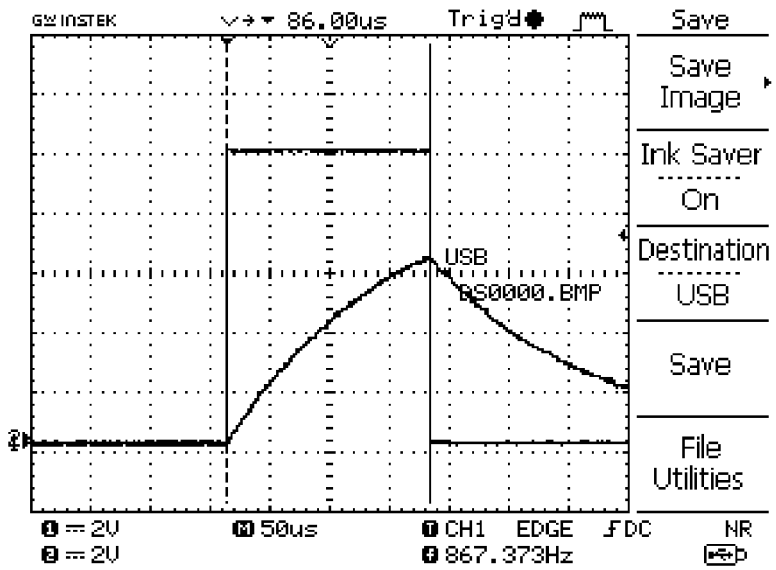
FIG. 9 is a general illustration showing the waveform produced by the circuit of FIG. 7 when driven by a pulse generator having an adjustable pulse width.
Figure 10:
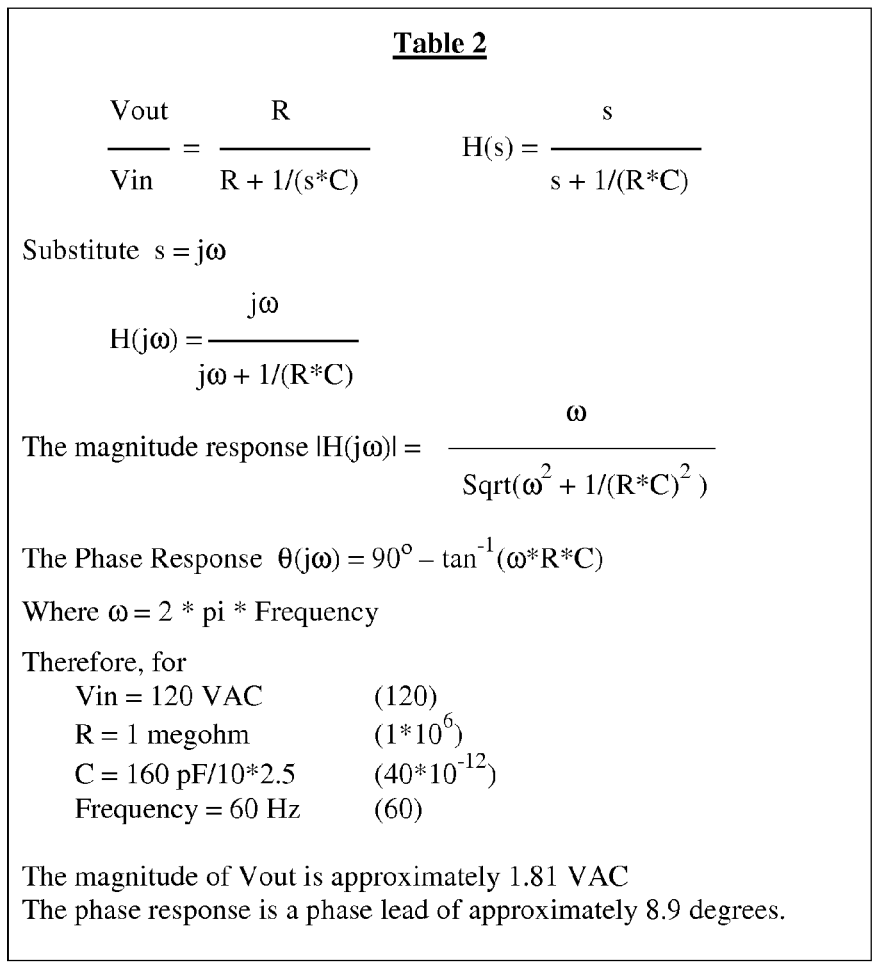
FIG. 10 is a general illustration showing the derivation of the frequency response of FIG. 8.
Figure 11:
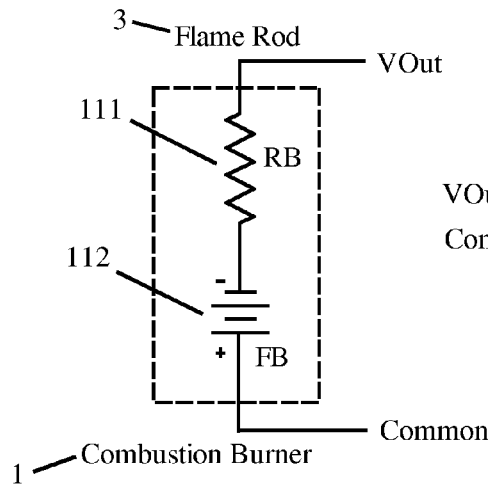
FIG. 11 is a general illustration showing an electrical model of a flame battery.
Figure 12:
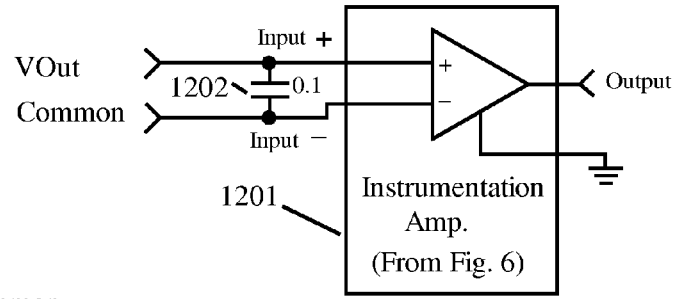
FIG. 12 is a general illustration showing the instrumentation amplifier of FIG. 6 with a capacitor added to the input.
Figure 13:
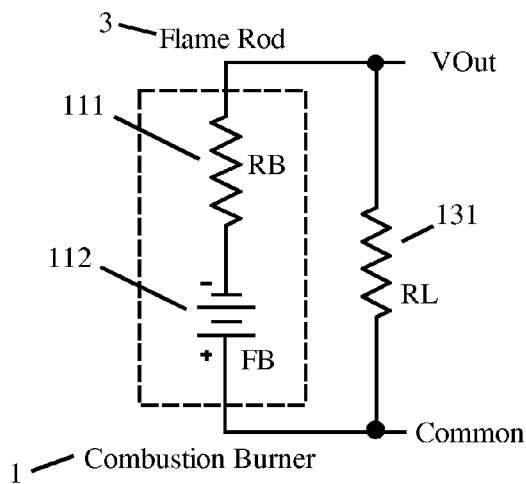
FIG. 13 is a general illustration showing the method of testing electrical model of FIG. 11.
Figure 21A:
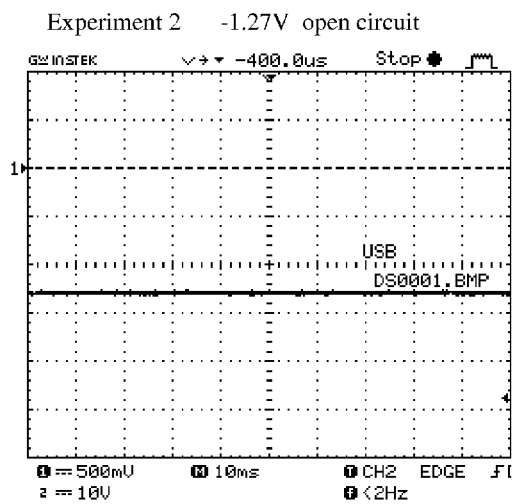
FIG. 21a is a screen capture from an oscilloscope showing the results of a test to determine the electrical characteristics of a flame.
Figure 21B:
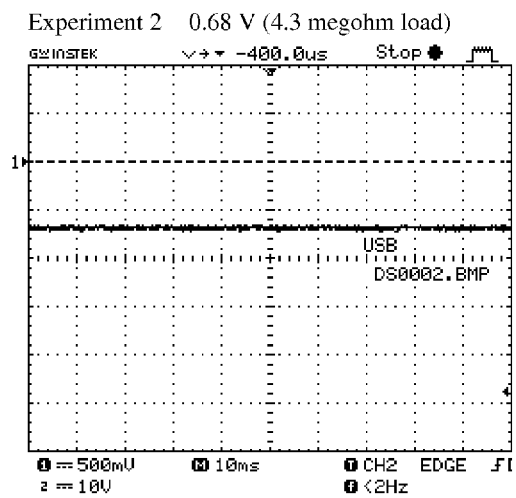
FIG. 21b is a screen capture from an oscilloscope showing the results of a test to determine the electrical characteristics of a flame.
Figure 22A:
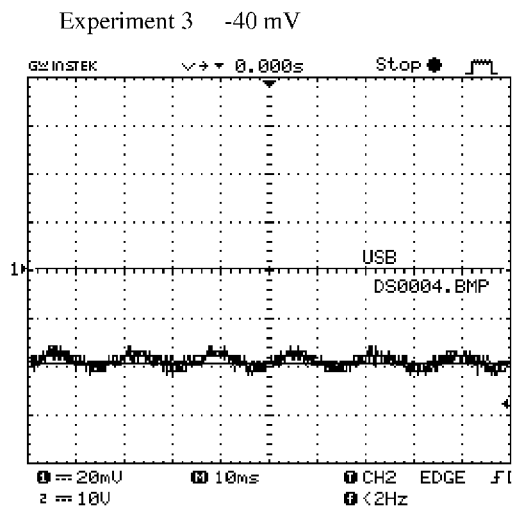
FIG. 22a is a screen capture from an oscilloscope showing the results of a test to determine the electrical characteristics of a flame.
Figure 22B:
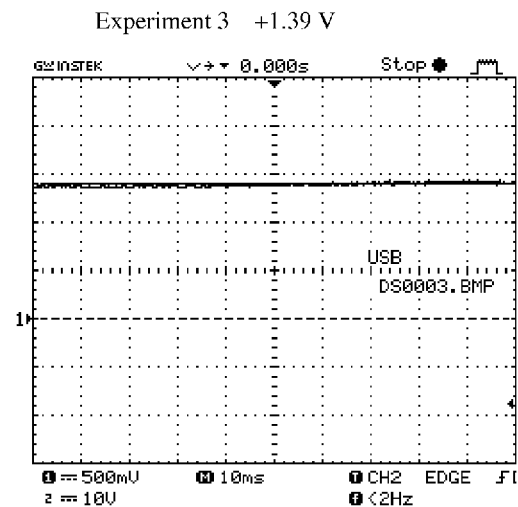
FIG. 22b is a screen capture from an oscilloscope showing the results of a test to determine the electrical characteristics of a flame.
Figure 23A:
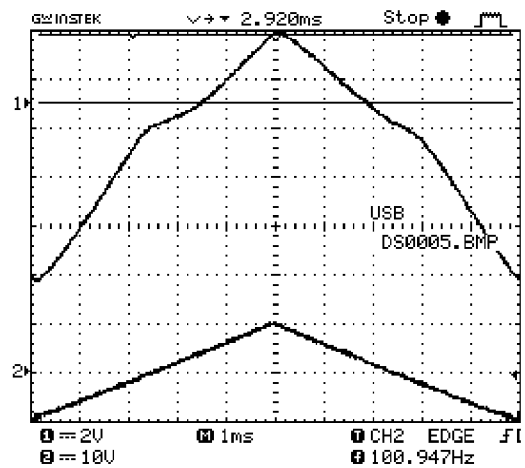
FIG. 23a is a screen capture from an oscilloscope showing the results of a test to determine the electrical characteristics of a flame.
Figure 23B:
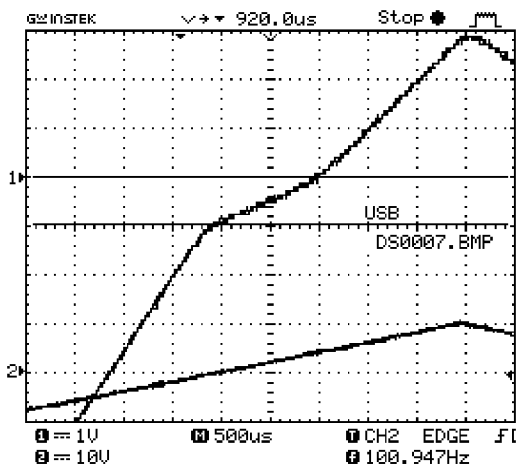
FIG. 23b is a screen capture from an oscilloscope showing the results of a test to determine the electrical characteristics of a flame.
Figure 23C:
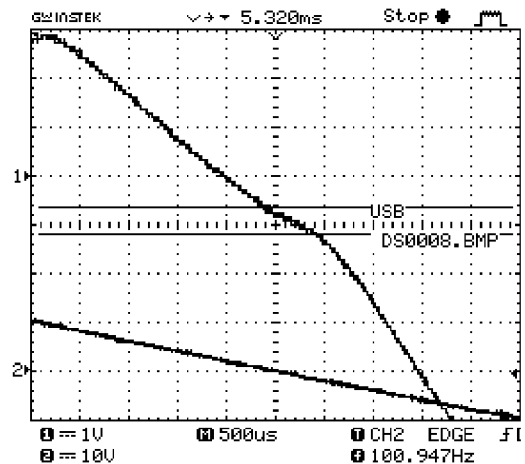
FIG. 23c is a screen capture from an oscilloscope showing the results of a test to determine the electrical characteristics of a flame.
Figure 24A:
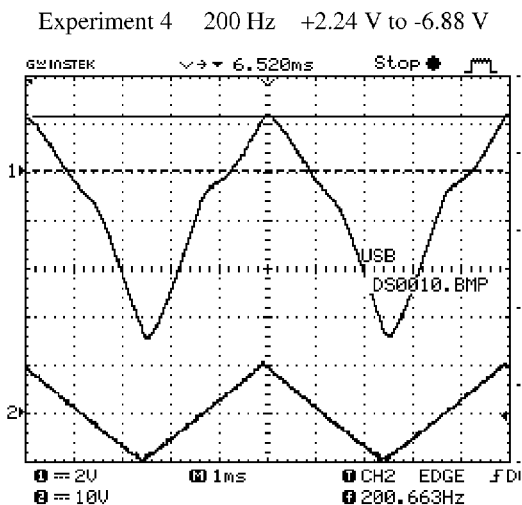
FIG. 24a is a screen capture from an oscilloscope showing the results of a test to determine the electrical characteristics of a flame.
Figure 24B:
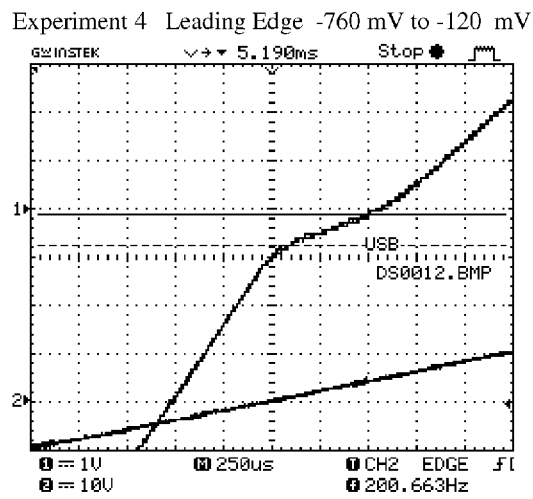
FIG. 24b is a screen capture from an oscilloscope showing the results of a test to determine the electrical characteristics of a flame.
Figure 24C:
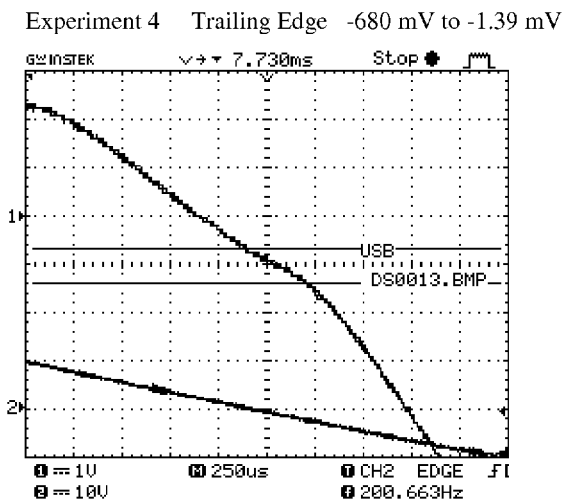
FIG. 24c is a screen capture from an oscilloscope showing the results of a test to determine the electrical characteristics of a flame.
Figure 25A:
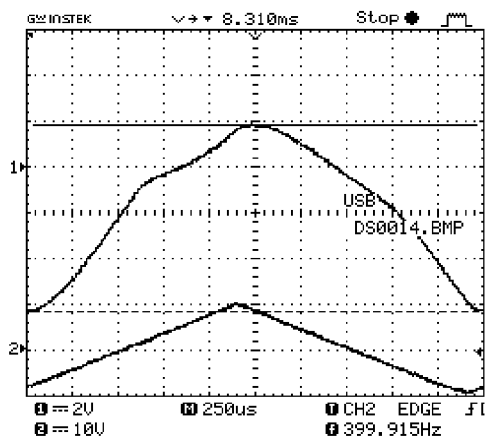
FIG. 25a is a screen capture from an oscilloscope showing the results of a test to determine the electrical characteristics of a flame.
Figure 25B:
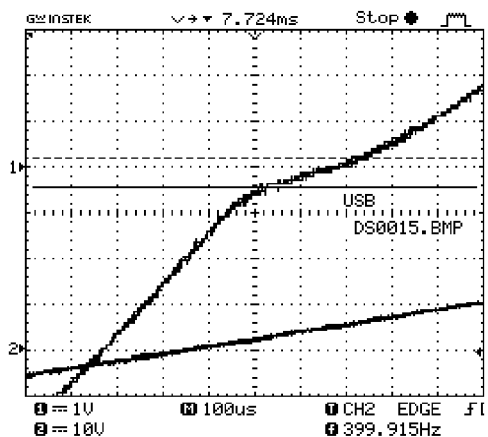
FIG. 25b is a screen capture from an oscilloscope showing the results of a test to determine the electrical characteristics of a flame.
Figure 25C:
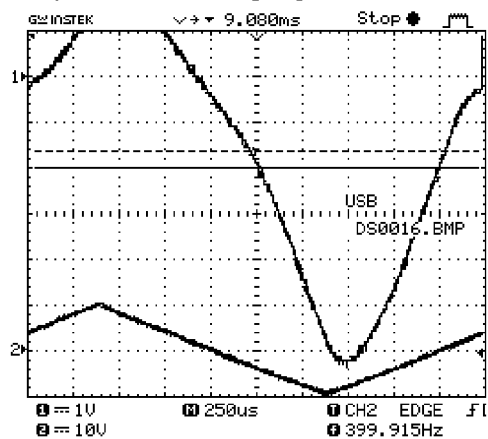
FIG. 25c is a screen capture from an oscilloscope showing the results of a test to determine the electrical characteristics of a flame.
Figure 26A:
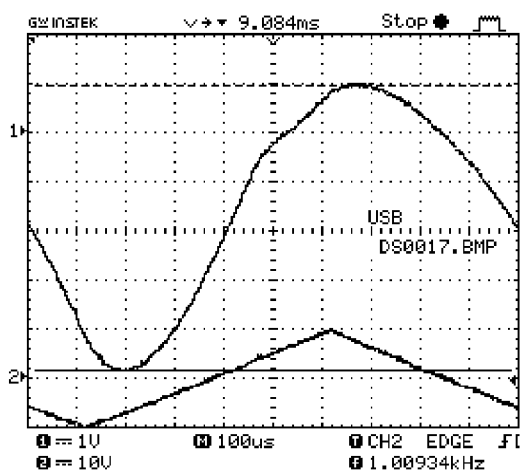
FIG. 26a is a screen capture from an oscilloscope showing the results of a test to determine the electrical characteristics of a flame.
Figure 26B:
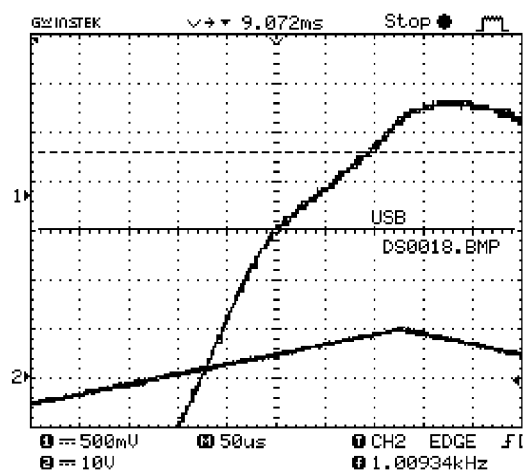
FIG. 26b is a screen capture from an oscilloscope showing the results of a test to determine the electrical characteristics of a flame.
Figure 26C:
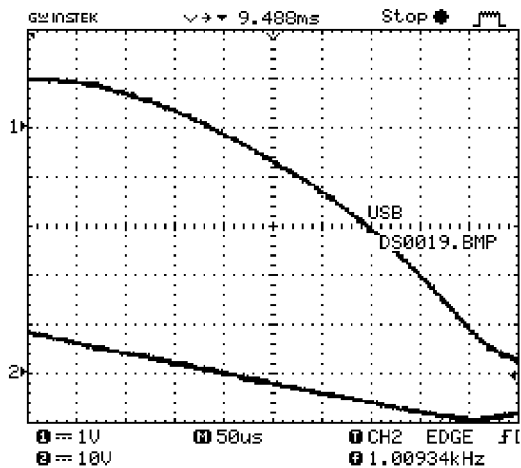
FIG. 26c is a screen capture from an oscilloscope showing the results of a test to determine the electrical characteristics of a flame.
Figure 27:
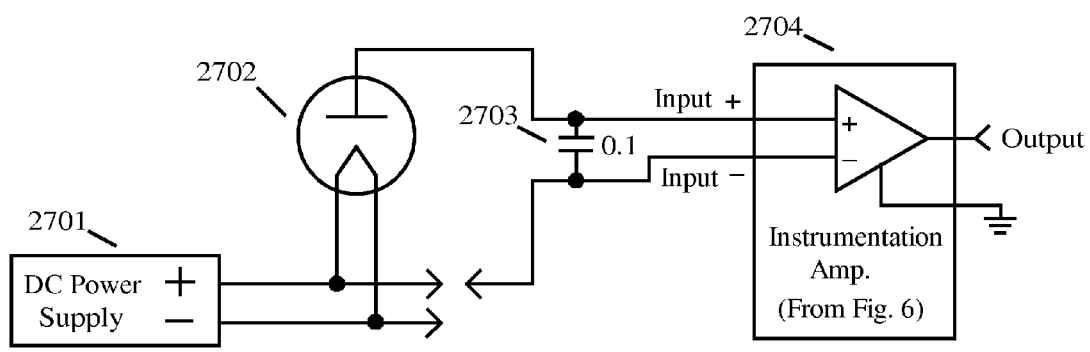
FIG. 27 is a general illustration showing the electrical circuit used for test the thermionic emission from the 5Y4 GB and 5Y3GT vacuum tubes.
Figure 28:
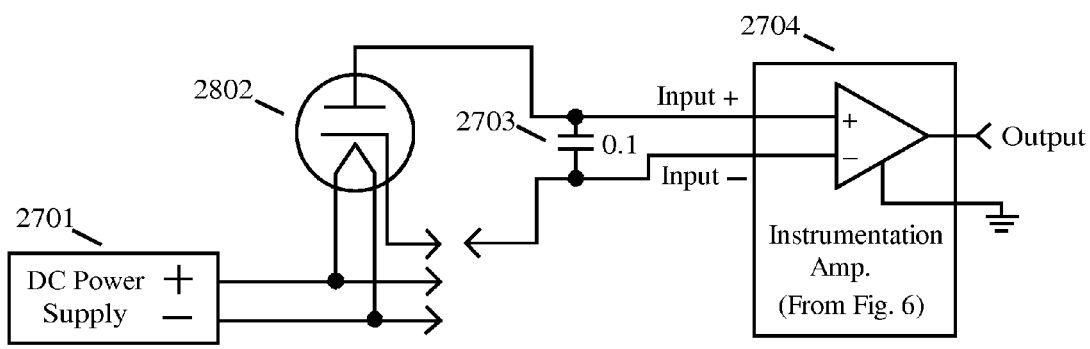
FIG. 28 is a general illustration showing the electrical circuit used for testing the thermionic emission from the 6X4 and 12X4 vacuum tubes.
Figure 37:
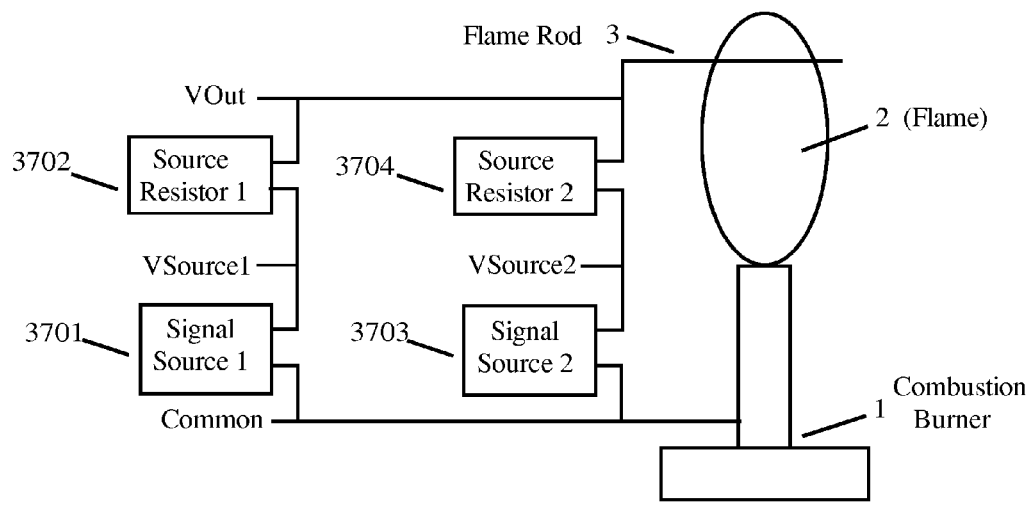
FIG. 37 is a general illustration showing the method used for performing the test when flame rectification is used as a mixer of two signal sources.
Figure 38:
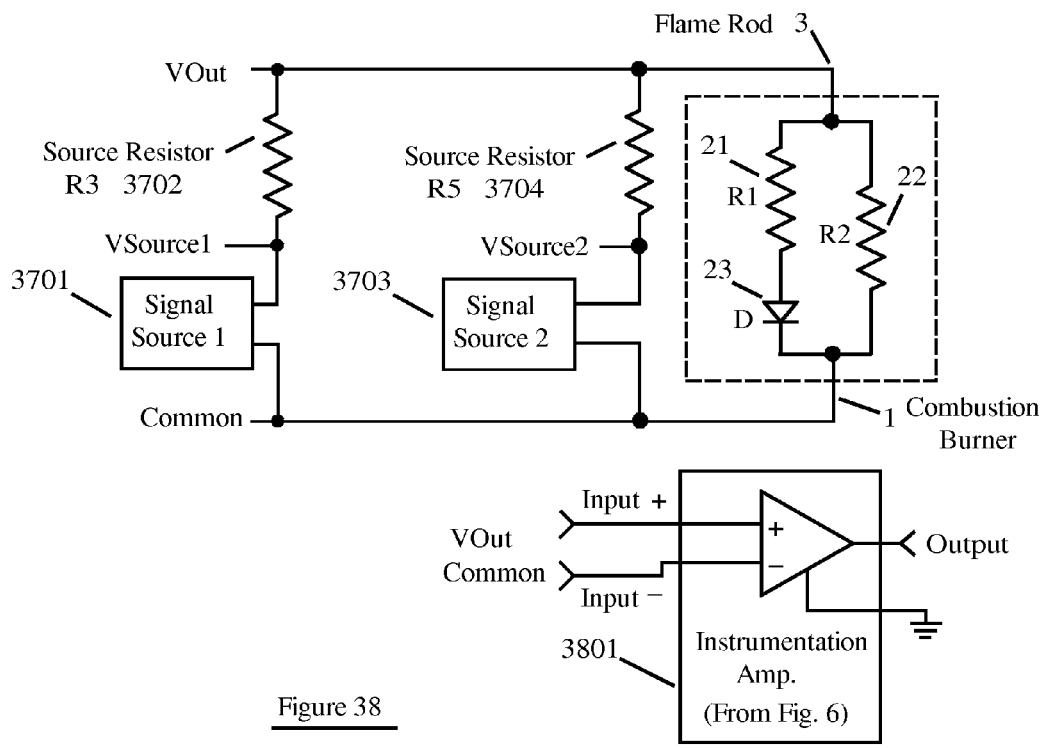
FIG. 38 is a general illustration showing the electrical circuit for the method used for performing the test when flame rectification is used as a mixer of two signal sources.
Figure 45:
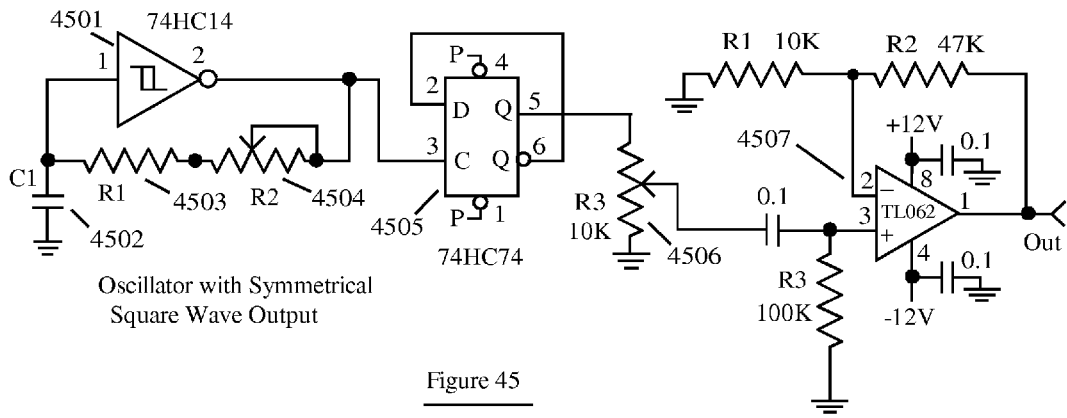
FIG. 45 is a general illustration showing an electrical circuit for an oscillator with a symmetrical square wave output.
Figure 46:
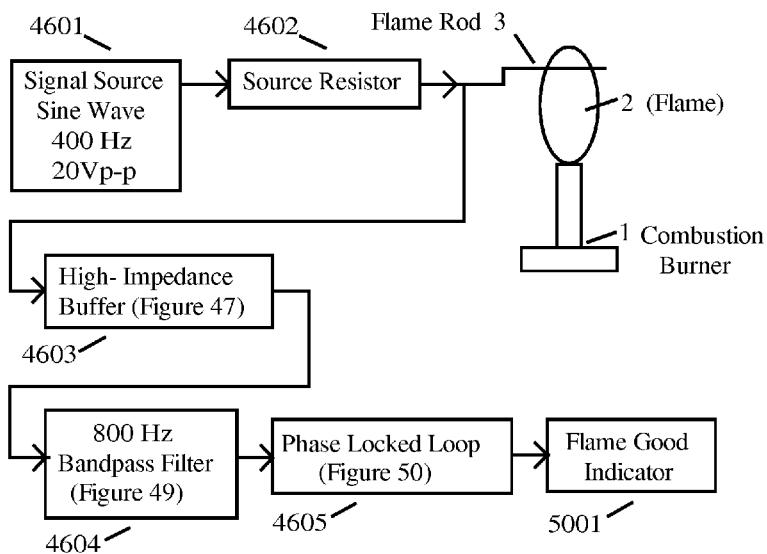
FIG. 46 is a general illustration showing the use of a sine wave signal source with a phase locked loop to provide flame proof.
Figure 50:
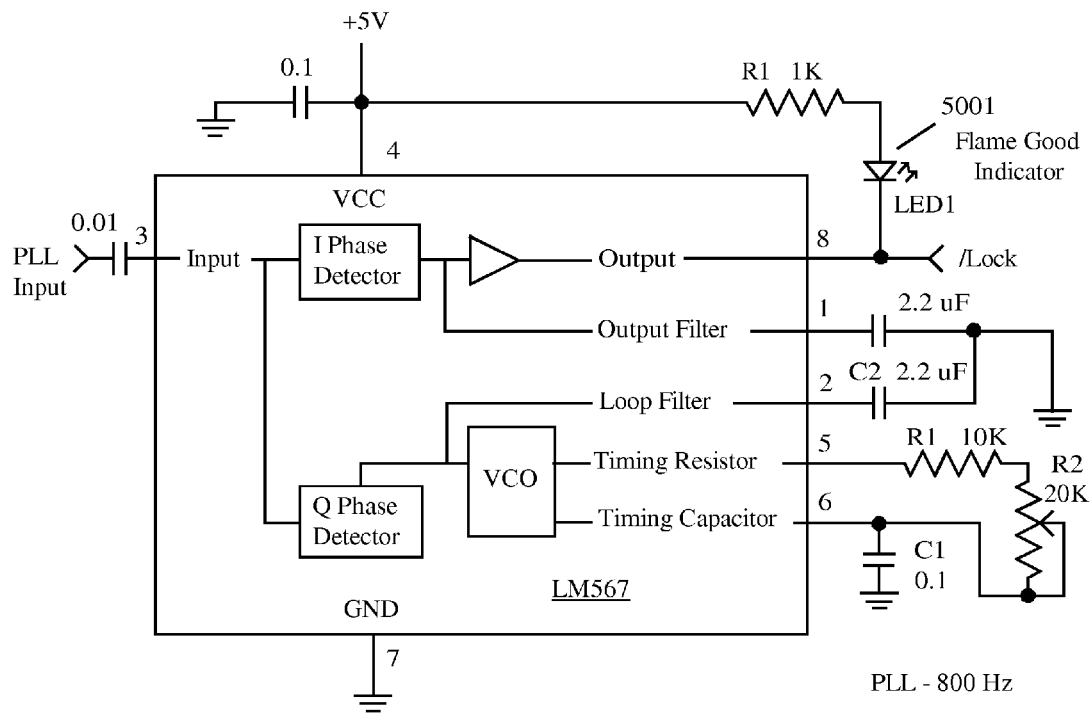
FIG. 50 is a general illustration showing an electrical circuit for a phase locked loop (PLL).
Figure 53:
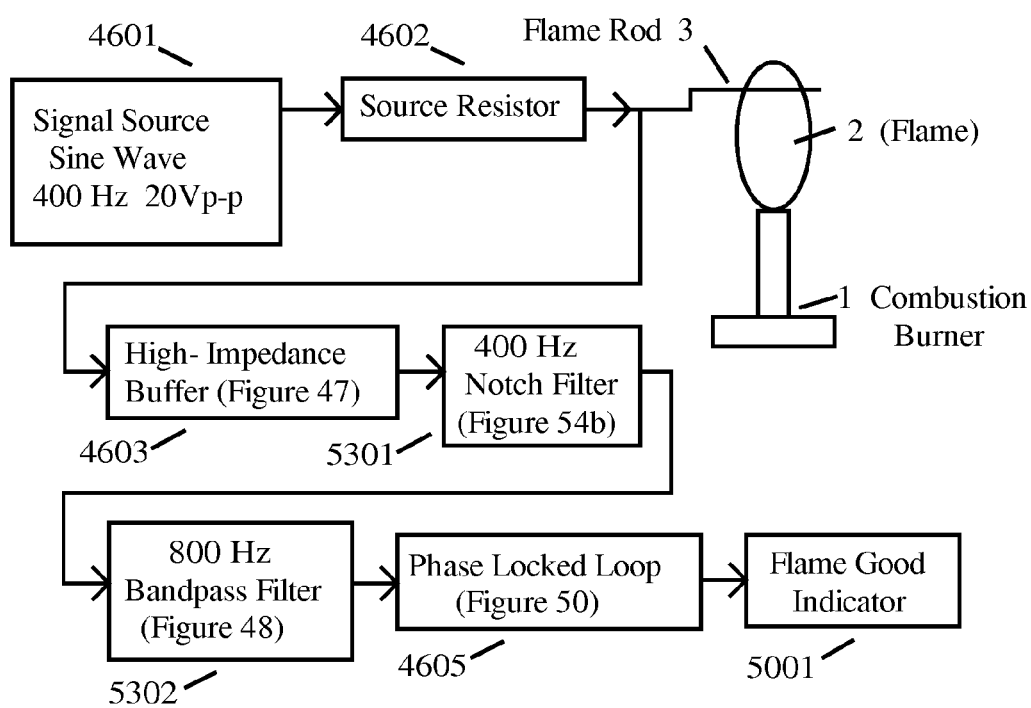
FIG. 53 is a general illustration showing the use of a symmetrical square wave signal source with a phase locked loop to provide flame proof.
Figure 54A:
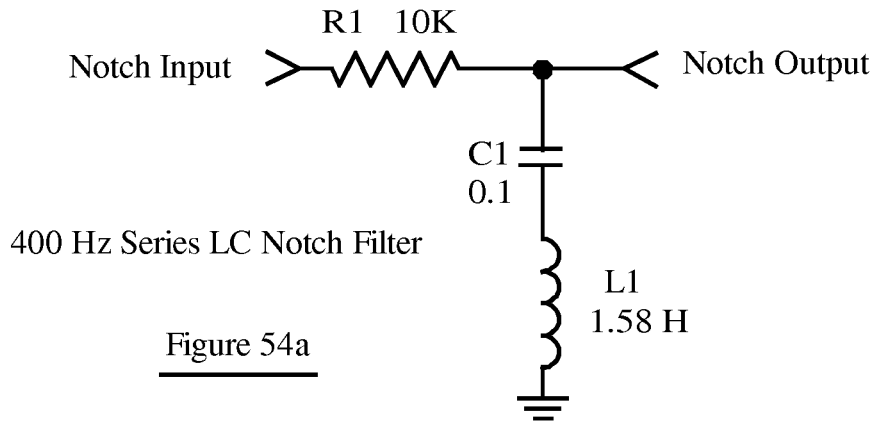
FIG. 54a is a general illustration showing an electrical circuit for a series LC notch filter.
Figure 54B:
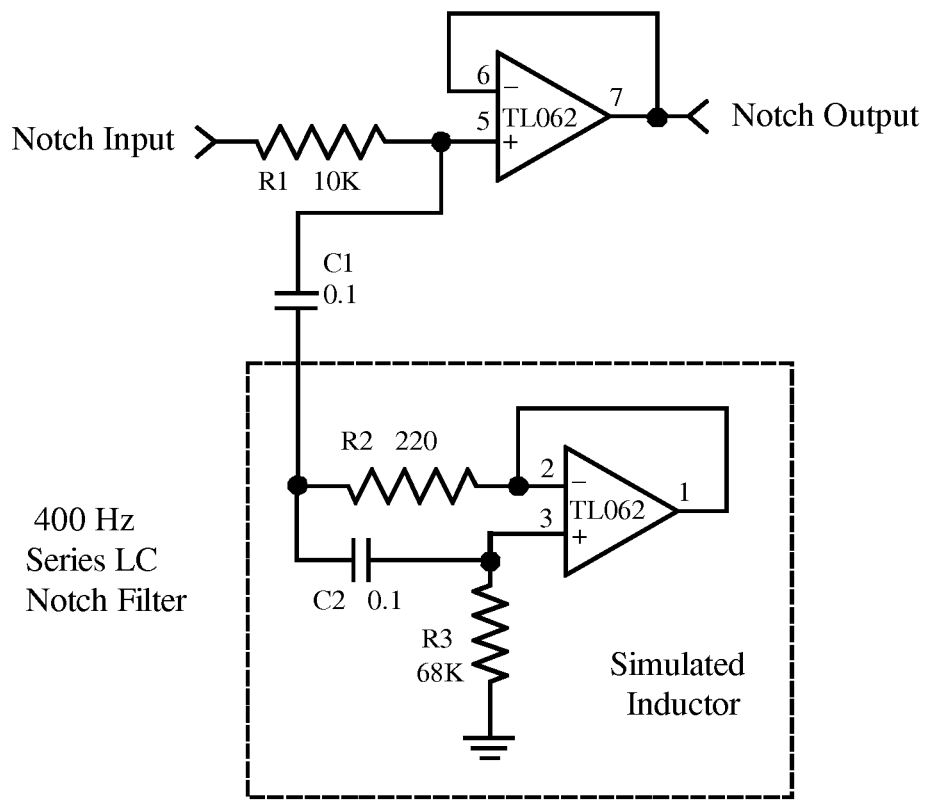
FIG. 54b is a general illustration showing an electrical circuit for a series LC notch filter where the inductor is a simulated inductor.
Figure 55:
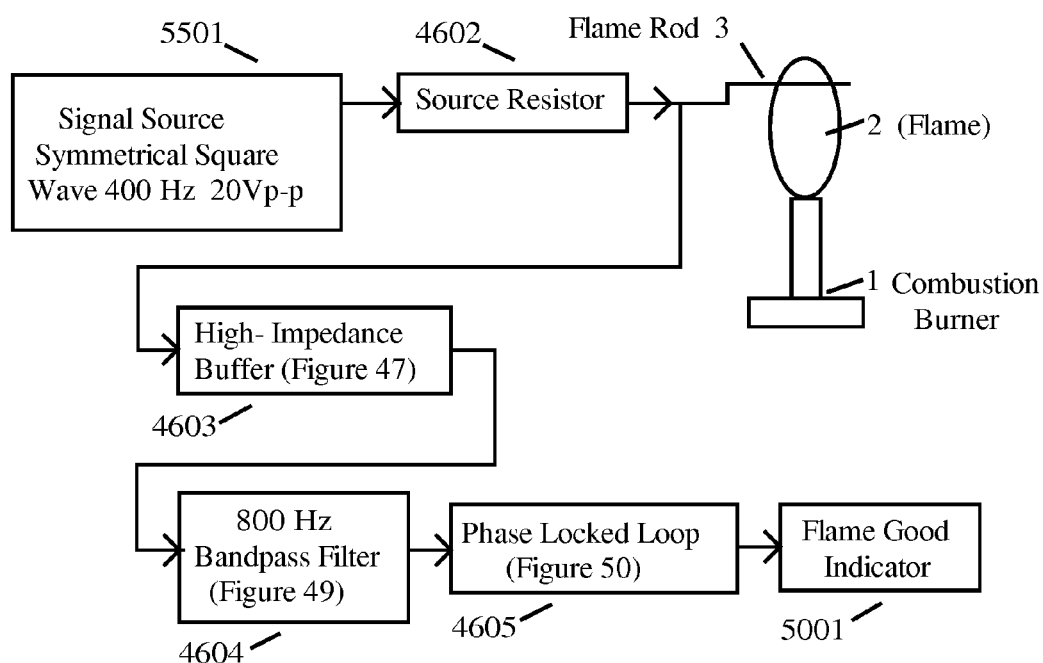
FIG. 55 is a general illustration showing the use of a symmetrical square wave signal source to provide flame proof.
Figure 58:
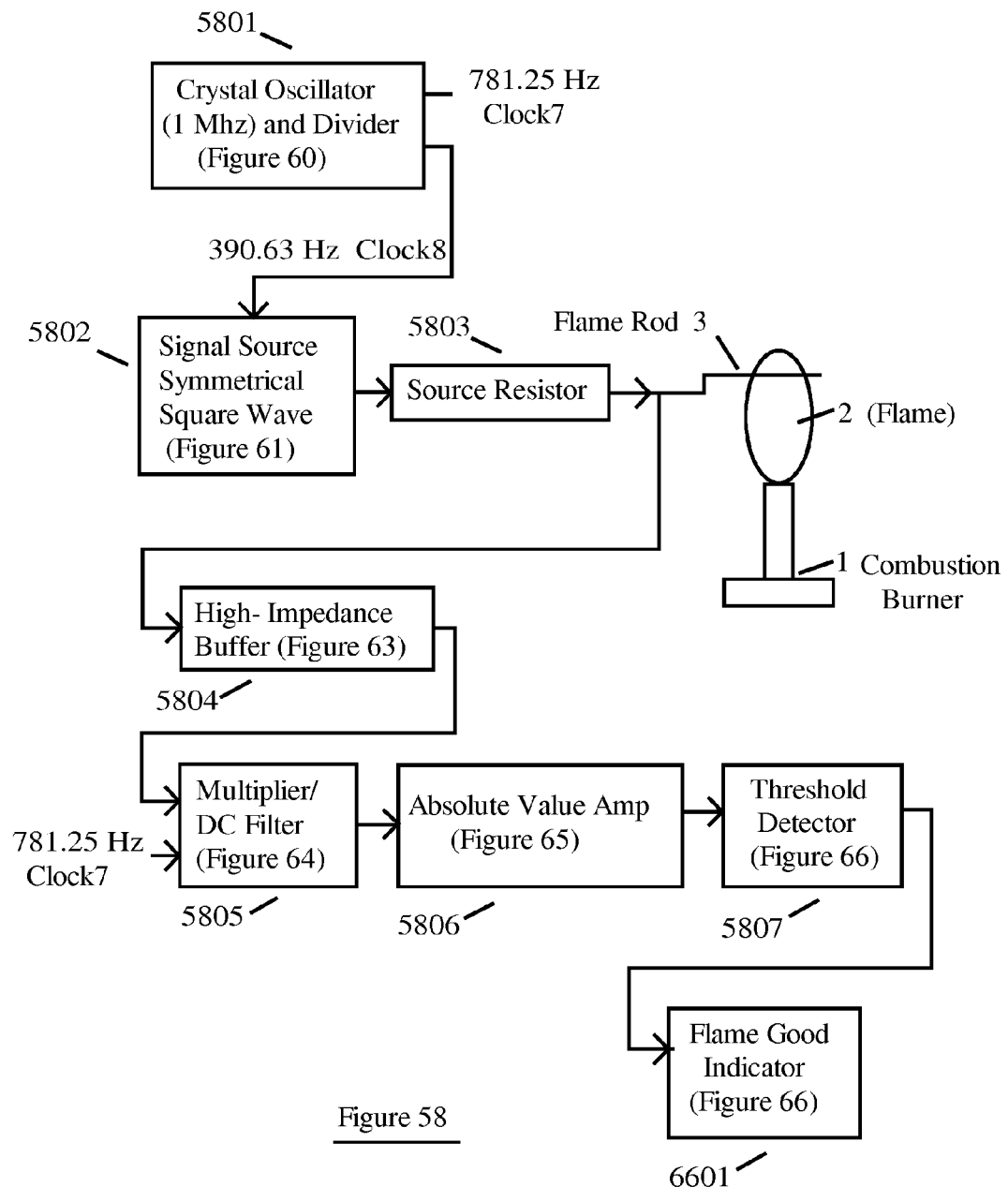
FIG. 58 is a general illustration showing the use of a symmetrical square wave with a simple synchronous detector to provide flame proof.
Figure 59:
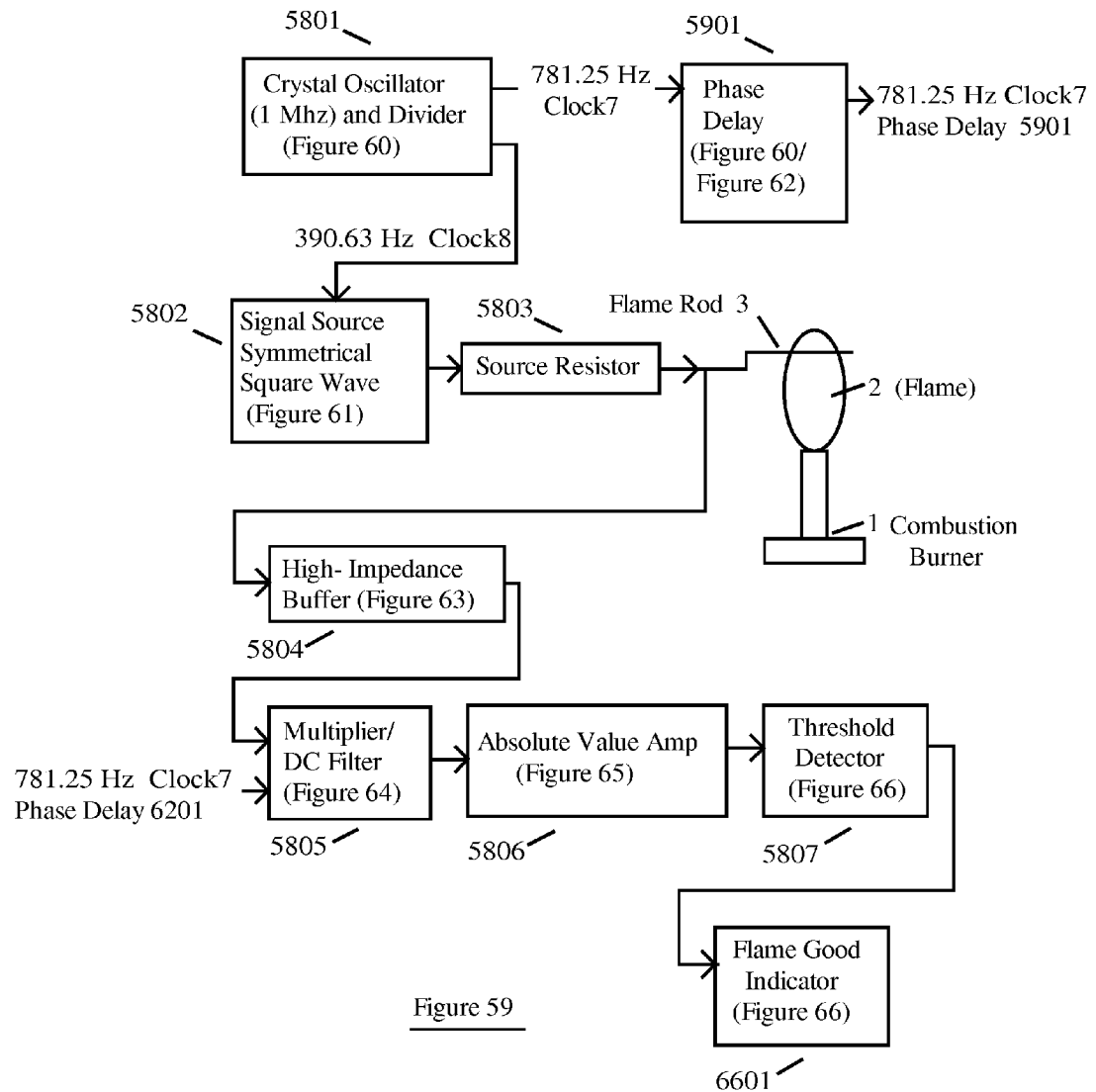
FIG. 59 is a general illustration showing the use of a symmetrical square wave with a simple synchronous detector and an adjustable phase delay to provide flame proof.

The output of High Impedance Buffer 8503 is connected to the input of the 800 Hz Bandpass Filter 8504 (FIG. 49). As is shown in FIG. 49 the 800 Hz Bandpass Filter 8504 is made by cascading two 800 Hz Bandpass Filters, each of which is shown in more detail in FIG. 48. In some instances a single 800 Hz Bandpass Filter (FIG. 48) may be used. In some instances no filter may be needed at all. The output of 800 Hz Bandpass Filter 8504 is connected to the input of Phase Locked Loop 8505 (shown in more detail in FIG. 50). The output of Phase Locked Loop 8505 is connected to Flame Good Indicator 8506 (shown in FIG. 50 as LED 5001). When Phase Locked Loop 8505 detects the 800 Hz second harmonic of the 400 Hz Signal Source 8501 Phase Locked Loop 8505 turns on Flame Good Indicator 8506 to signify that a flame is present. Since the 400 Hz Signal Source 8501 does not contain the 800 Hz second harmonic signal, the 800 Hz second harmonic can only be present due to flame rectification which is caused by a flame.

In the second embodiment flame rectification causes distortion of a signal source having a selected waveform, producing a second harmonic that does not otherwise exist in the selected waveform. In this specific example the selected harmonic is the second harmonic but other harmonics may be selected. The selected harmonic is detected by using a simple synchronous detector.

Figure 60:
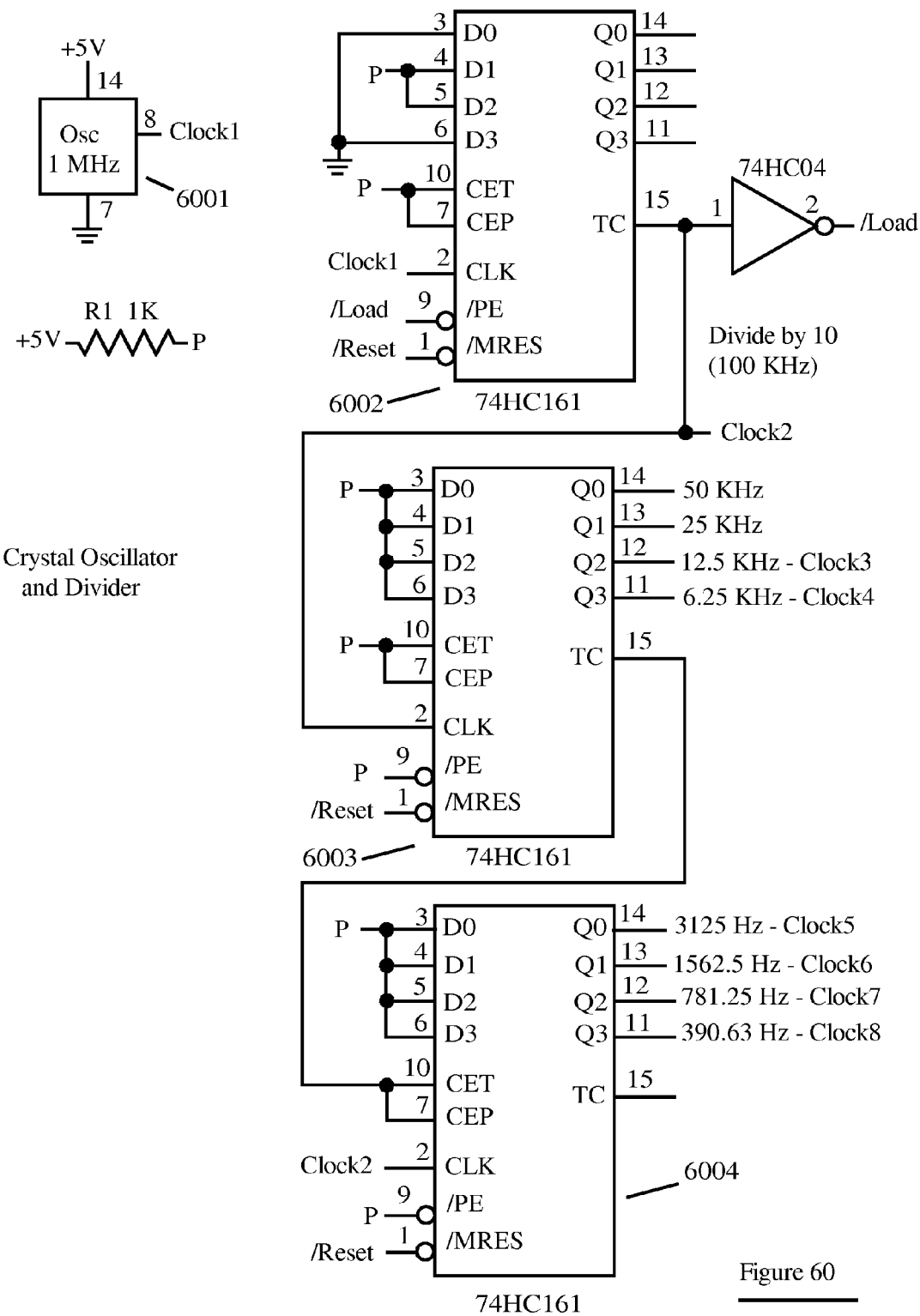
FIG. 60 is a general illustration showing an electrical circuit for an oscillator and counter.
Figure 61:
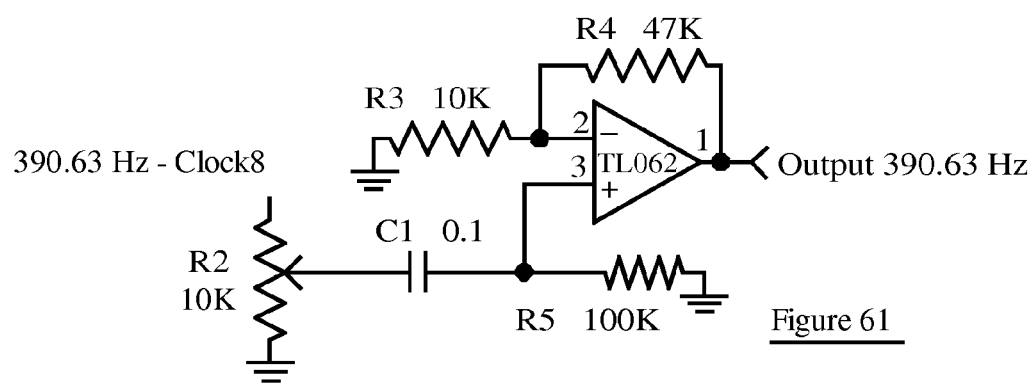
FIG. 61 is a general illustration showing an electrical circuit for an AC coupled amplifier.
Figure 86:
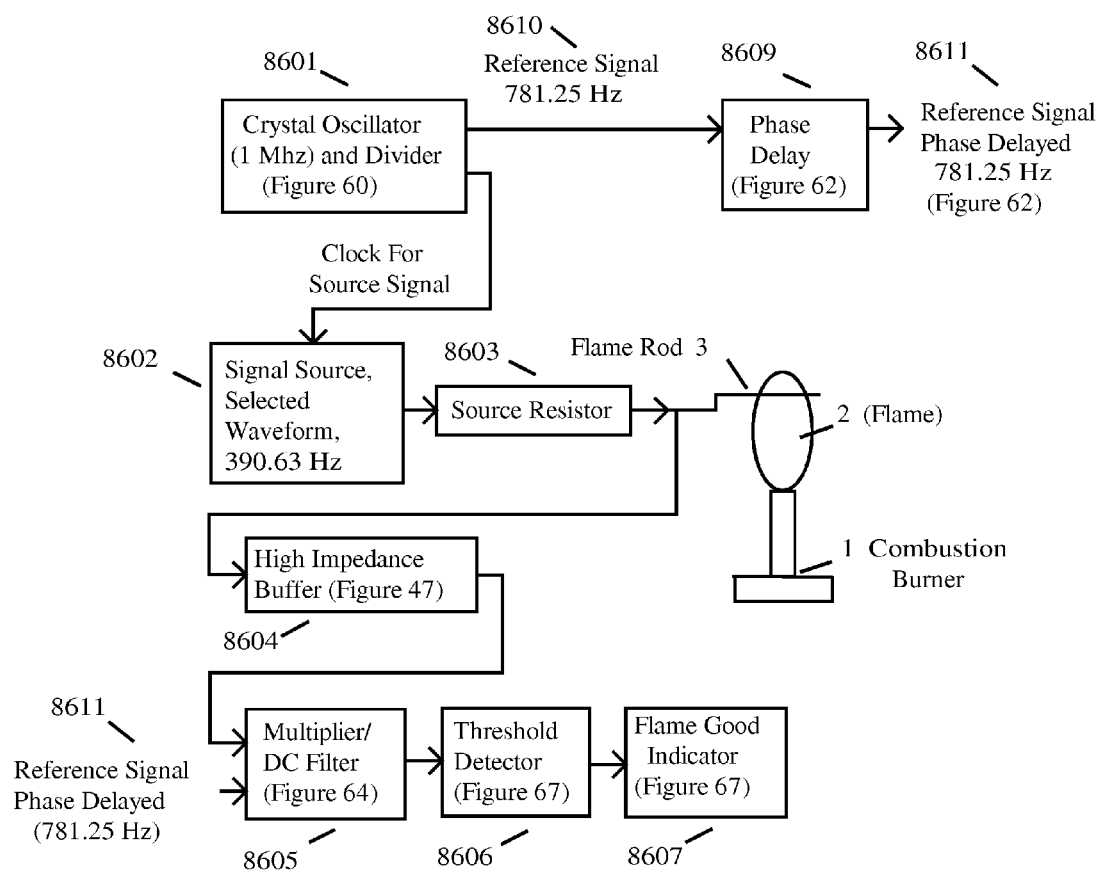
FIG. 86 is a general illustration showing the use of flame rectification to produce harmonic distortion of a selected waveform and detect the harmonic distortion with a simple synchronous detector.

The system is shown in FIG. 86. Crystal Oscillator and Divider 8601 (shown in more detail in FIG. 60) produces two clocks. The first clock is used to produce Signal Source, Selected Waveform 8602 at 390.63 Hz. The second clock is a Reference Signal 8610 at exactly twice the frequency (781.26 Hz) of Signal Source 8602. Signal Source 8602 produces a 390.63 Hz Selected Waveform that is selected to not contain even harmonics. Examples of selected waveforms that do not contain even harmonics include low distortion sine waves and symmetrical square waves.

Figure 62:
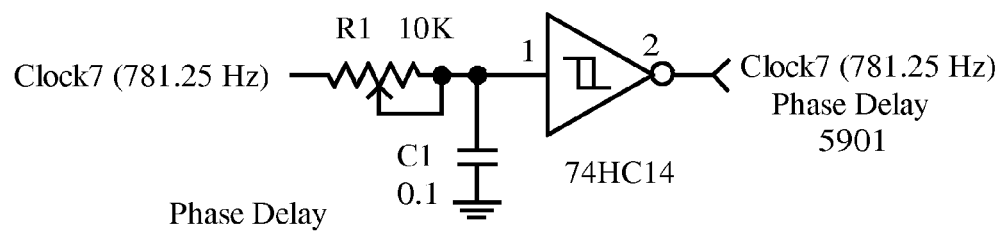
FIG. 62 is a general illustration showing an electrical circuit for a time delay circuit with an adjustable time delay.
Figure 69:
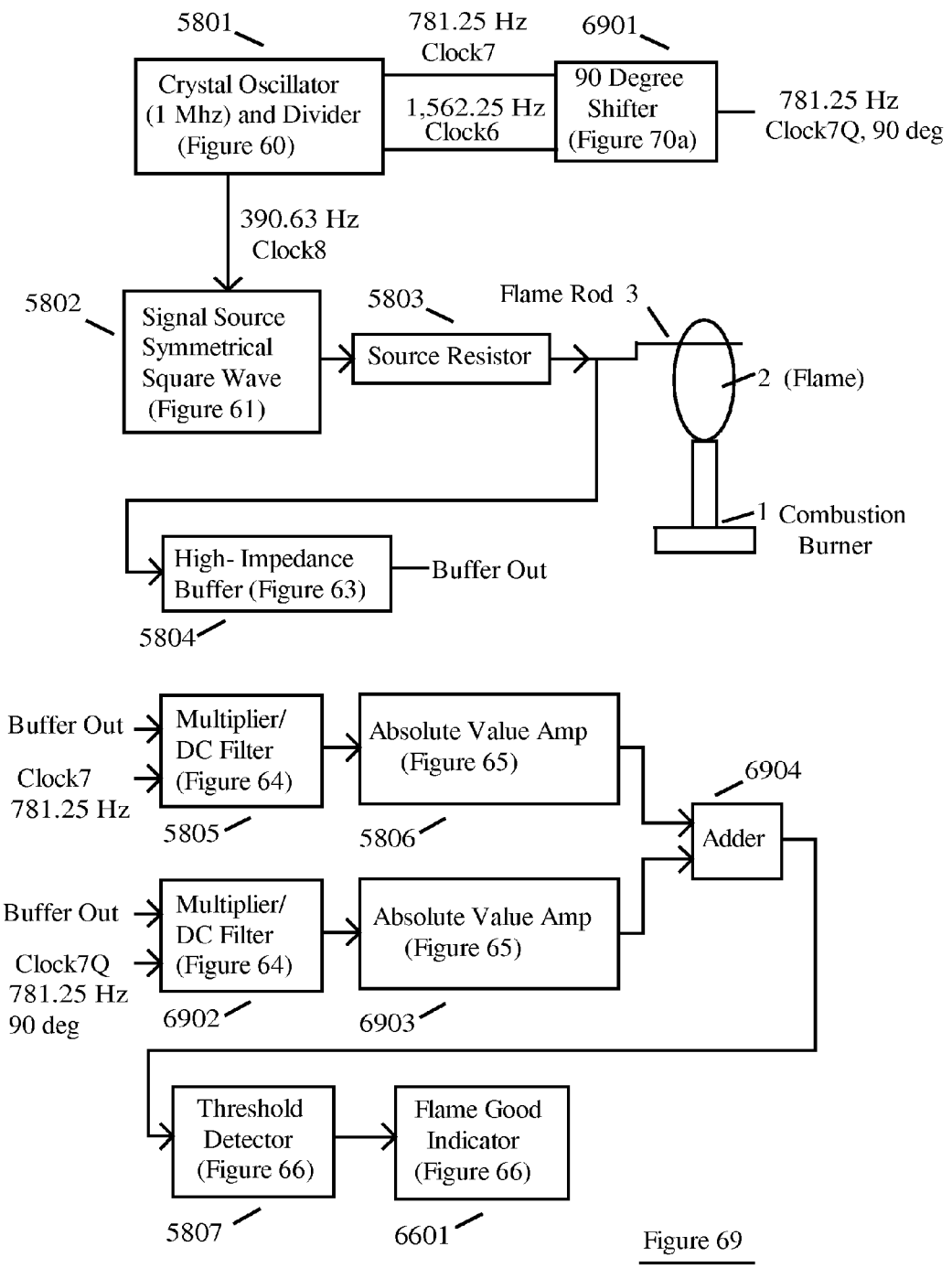
FIG. 69 is a general illustration showing the use of a symmetrical square wave with a quadrature synchronous detector to provide flame proof.
Figure 70A:
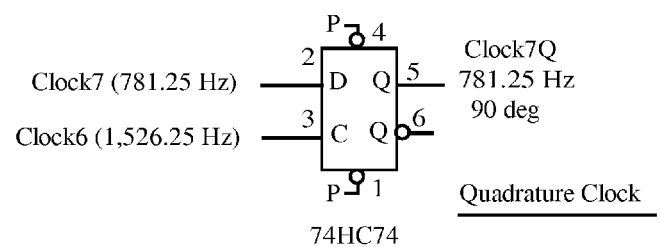
FIG. 70a is a general illustration showing an electrical circuit for producing a 90 degree phase shift for a clock.
Figure 70B:
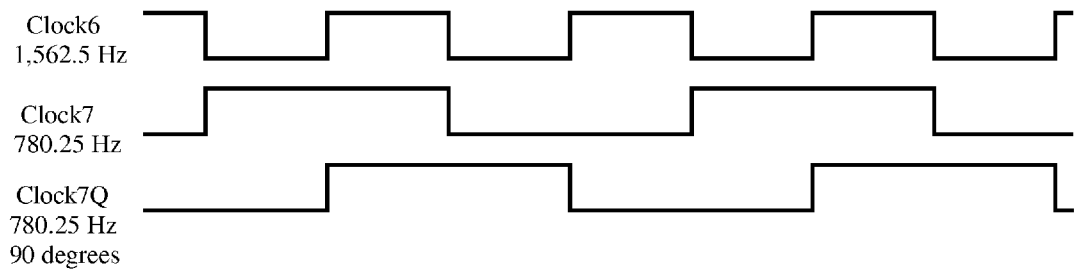
Figure 71:
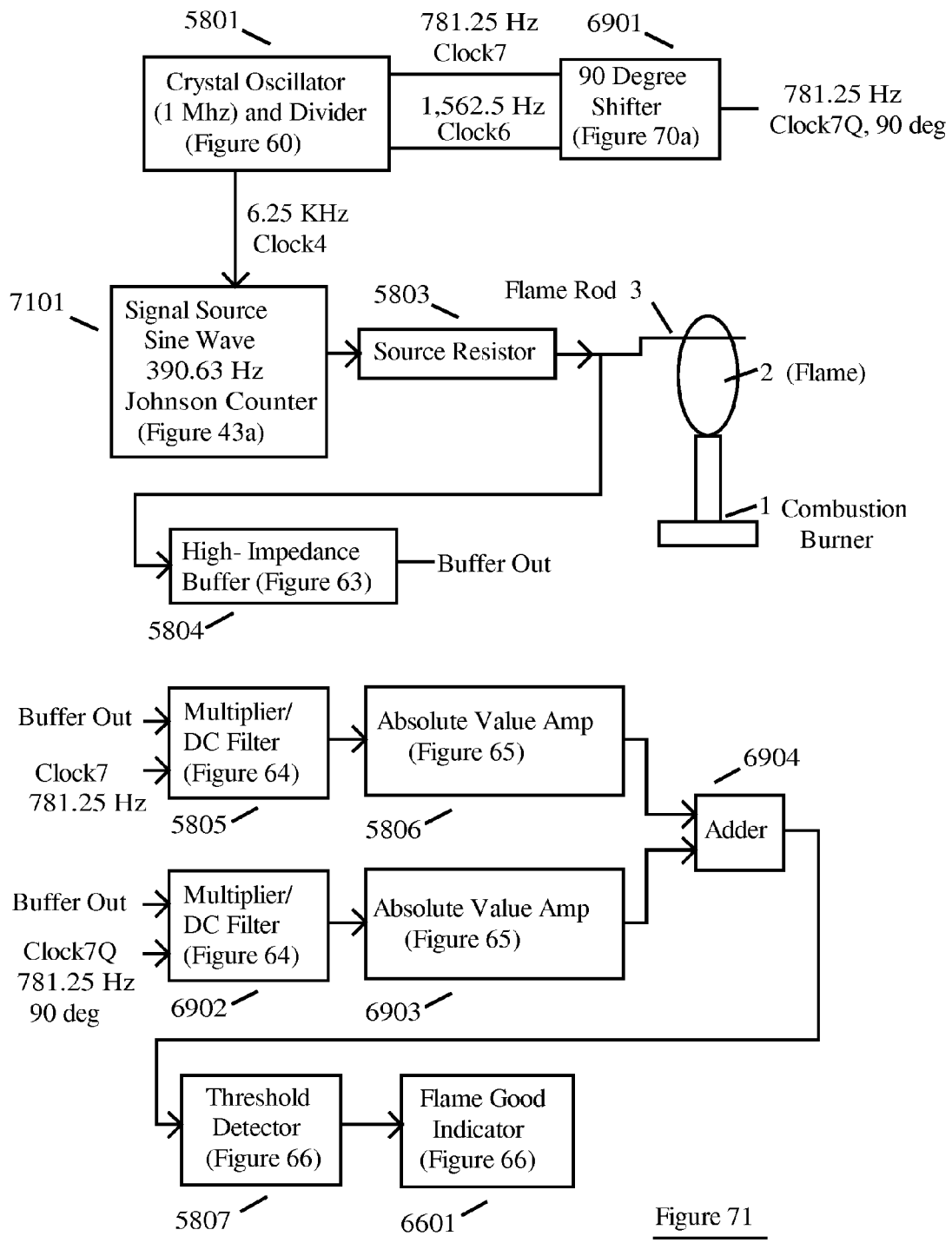
FIG. 71 is a general illustration showing the use of a sine wave with a quadrature synchronous detector to provide flame proof.

Signal Source 8602 is applied through Source Resistor 8603 to Flame Rod 3. Flame Rod 3 is also connected to the input of High Impedance Buffer 8604 (shown in more detail in FIG. 47). The output of High Impedance Buffer 8604 is connected to a first input of Multiplier/DC Filter 8605 (shown in more detail in FIG. 64). A second input of Multiplier/DC Filter 8605 is connected to the output of Phase Delay 8609 which produces a phase delayed version (8611) of Reference Signal 8610. Phase Delay 8609 is shown in more detail in FIG. 62) In some systems the Reference Signal 8610 can be used directly without a Phase Delay 8611.

The output of Multiplier/DC Filter 8605 is connected to the input of Threshold Detector 8606 (The details of Threshold Detector 8606 are shown in FIG. 67 and in some implementations may omit Absolute Value Amp 65.) Threshold Detector 8606 applies a threshold test and, when the voltage is above a selected threshold, turns on Flame Good Indicator 8607 to signify that a flame is present. (Flame Good Indicator 8607 is shown in FIG. 66 as LED 6601). Since the 390.63 Hz Signal Source 8602 does not contain the 781.25 Hz second harmonic signal, the 781.25 Hz second harmonic can only be present due to flame rectification which is caused by a flame.

In the third embodiment flame rectification causes distortion of a signal having a selected waveform, producing a selected harmonic that does not otherwise exist in the selected waveform. In this specific example the selected harmonic is the second harmonic but other harmonics may be selected. The selected harmonic is detected by using a quadrature synchronous detector.

Figure 87:
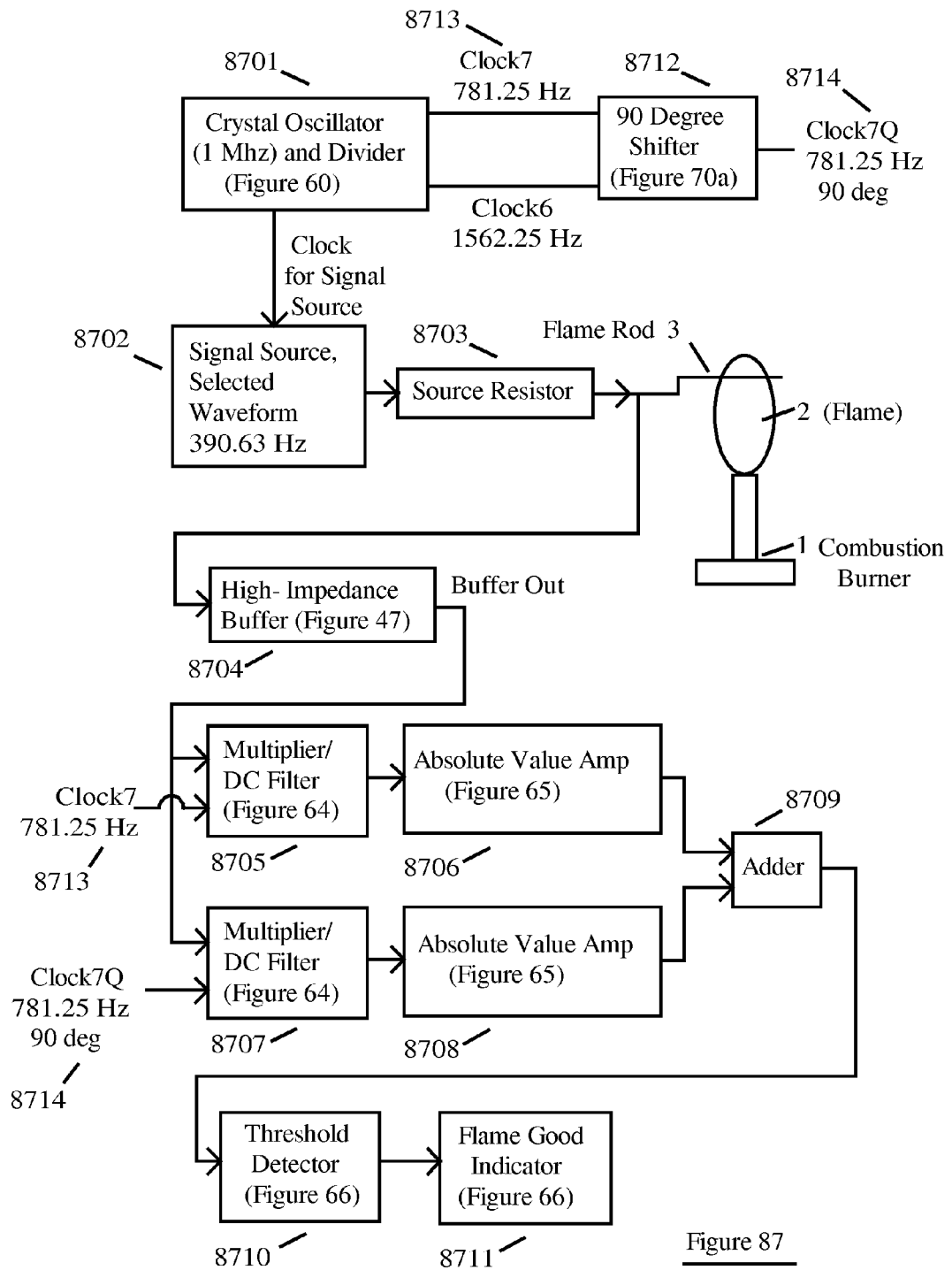
FIG. 87 is a general illustration showing the use of flame rectification to produce harmonic distortion of a selected waveform and detect the harmonic distortion with a quadrature synchronous detector.

The system is shown in FIG. 87. Crystal Oscillator and Divider 8701 (shown in more detail in FIG. 60) produces three clocks. The first clock is used to produce Signal Source, Selected Waveform 8702 at 390.63 Hz. The second clock is a first Reference Signal (8713) at exactly twice the frequency (781.26 Hz) of Signal Source 8702. The third clock is used to produce a second Reference Signal (8714) through 90 Degree Shifter 8712 that is also exactly twice the frequency (781.26 Hz) of Signal Source 8702 but is substantially 90 degrees out of phase with the first Reference Signal (8713).

Signal Source 8702 produces a 390.63 Hz Selected Waveform that is selected to not contain even harmonics. Examples of selected waveforms that do not contain even harmonics include low distortion sine waves and symmetrical square waves. Signal Source 8702 is applied through Source Resistor 8703 to Flame Rod 3. Flame Rod 3 is also connected to the input of High Impedance Buffer 8704 (shown in more detail in FIG. 47). The output of High Impedance Buffer 8704 is connected to a first input of Multiplier/DC Filter 8705 (shown in more detail in FIG. 64). The output of High Impedance Buffer 8704 is also connected to a first input of Multiplier/DC Filter 8707. A second input of Multiplier/DC Filter 8705 is connected to the first Reference Signal (8713) from Oscillator and Divider 8701. A second input of Multiplier/DC Filter 8707 is connected to the second Reference Signal (8714) from 90 Degree Shifter 8712.

The output of Multiplier/DC Filter 8705 is connected to the input of Absolute Value Amp 8706 which produces the absolute value of its input. (Absolute Value Amp 8706 is shown in more detail in FIG. 65.) The output of Multiplier/DC Filter 8707 is connected to the input of Absolute Value Amp 8708. The output of Absolute Value Amp 8706 is connected to a first input of Adder 8709. The output of Absolute Value Amp 8708 is connected to a second input of Adder 8709 which sums the inputs from Absolute Value Amp 8706 and Absolute Value Amp 8708. The output of Adder 8709 is connected to the input of Threshold Detector 8710. (The details of Threshold Detector 8710 are shown in FIG. 66.) Threshold Detector 8710 applies a threshold test and, when the voltage is above a selected threshold, turns on Flame Good Indicator 8711 to signify that a flame is present. (Flame Good Indicator 8711 is shown in FIG. 66 as LED 6601). Since the 390.63 Hz Signal Source 8702 does not contain the 781.25 Hz second harmonic signal, the 781.25 Hz second harmonic can only be present due to flame rectification which is caused by a flame.

In the fourth embodiment flame rectification is used as a mixer to cause two signals having selected waveforms to produce sum and difference signals. The sum and/or difference frequencies may be detected by a detector comprising a phase locked loop.

Figure 88:
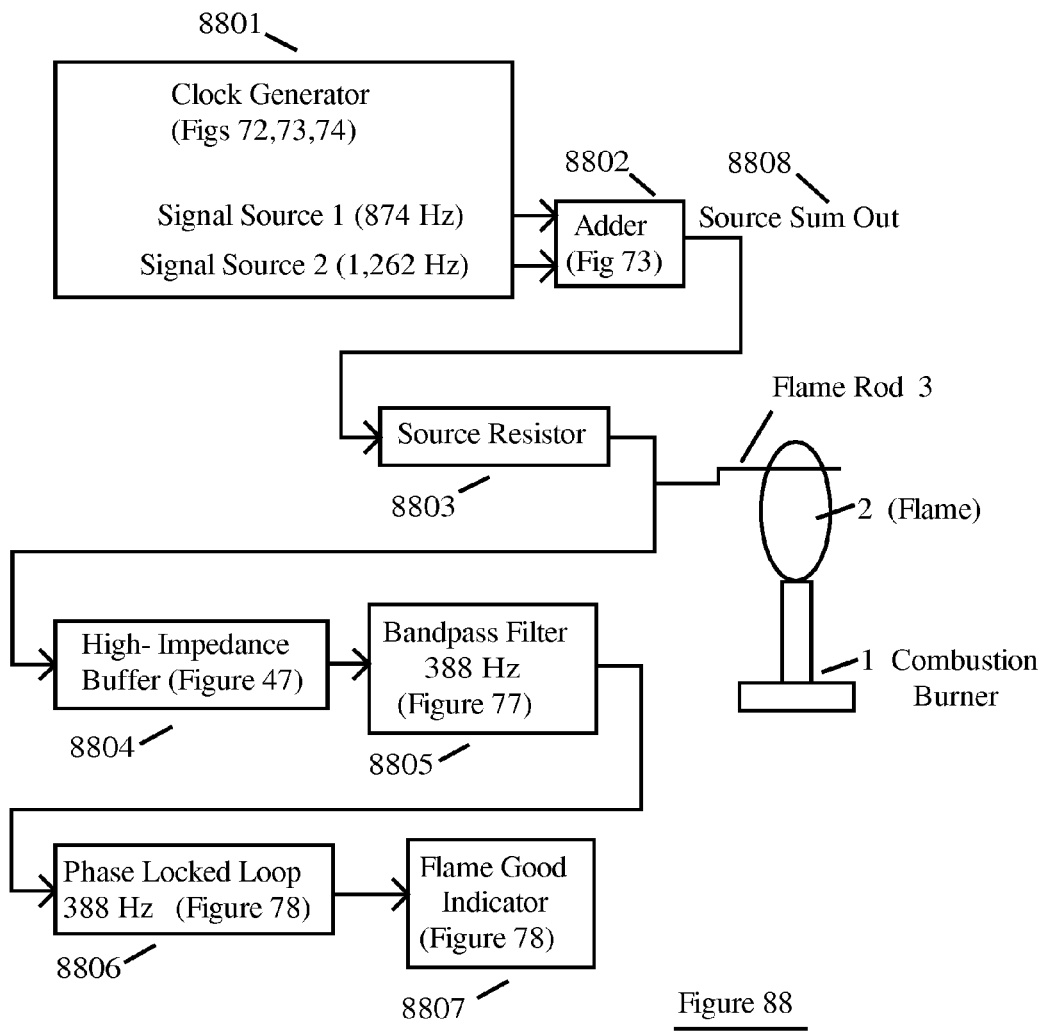
FIG. 88 is a general illustration showing the use of flame rectification as a mixer with a phase locked loop detector used to detect the difference frequency.

The system is shown in FIG. 88. Clock Generator 8801 produces two signal sources, Signal Source 1 at 874 Hz and Signal Source 2 at 1,262 Hz. Although Signal Source 1 and Signal Source 2 can be produced by a variety of means (such as by two free-running oscillators) here they are produced by a crystal oscillator and a clock chain shown in more detail in FIGS. 72, 73, and 74.

Signal Source 1 and Signal Source 2 are summed in Adder 8802 to produce Source Sum Out 8808. Source Sum Out 8808 is applied through Source Resistor 8803 to Flame Rod 3. Flame Rod 3 is also connected to the input of High Impedance Buffer 8804 (shown in more detail in FIG. 47).

Figure 78:
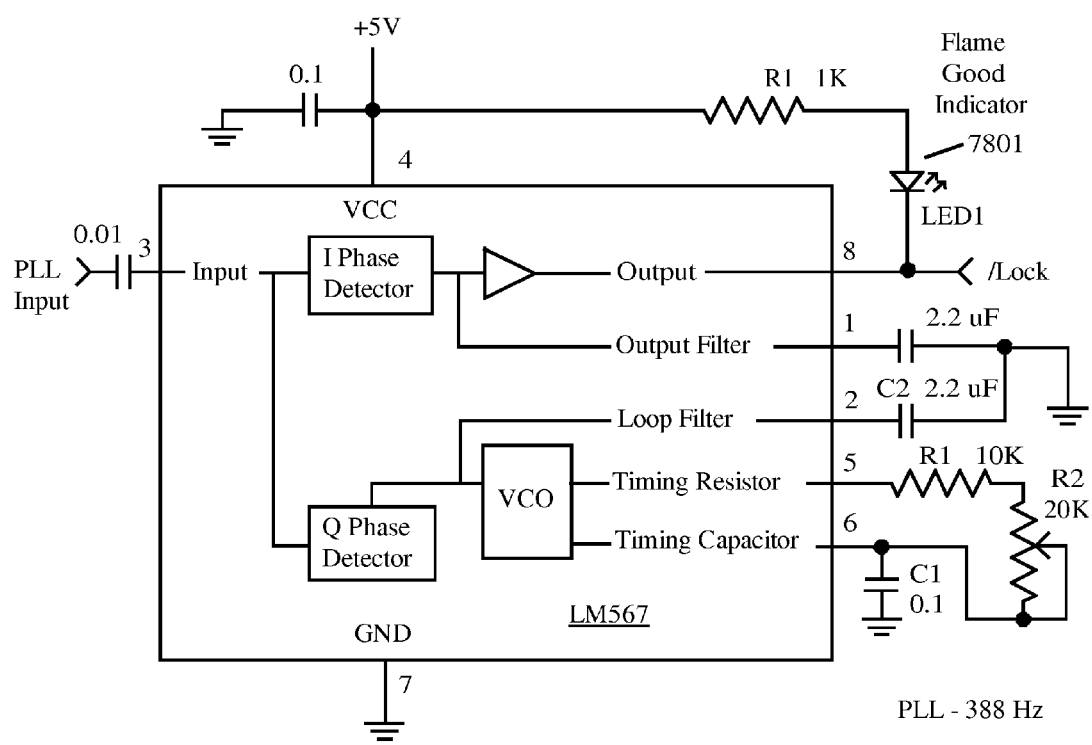
FIG. 78 is a general illustration showing an electrical circuit for a phase locked loop.
Figure 80:
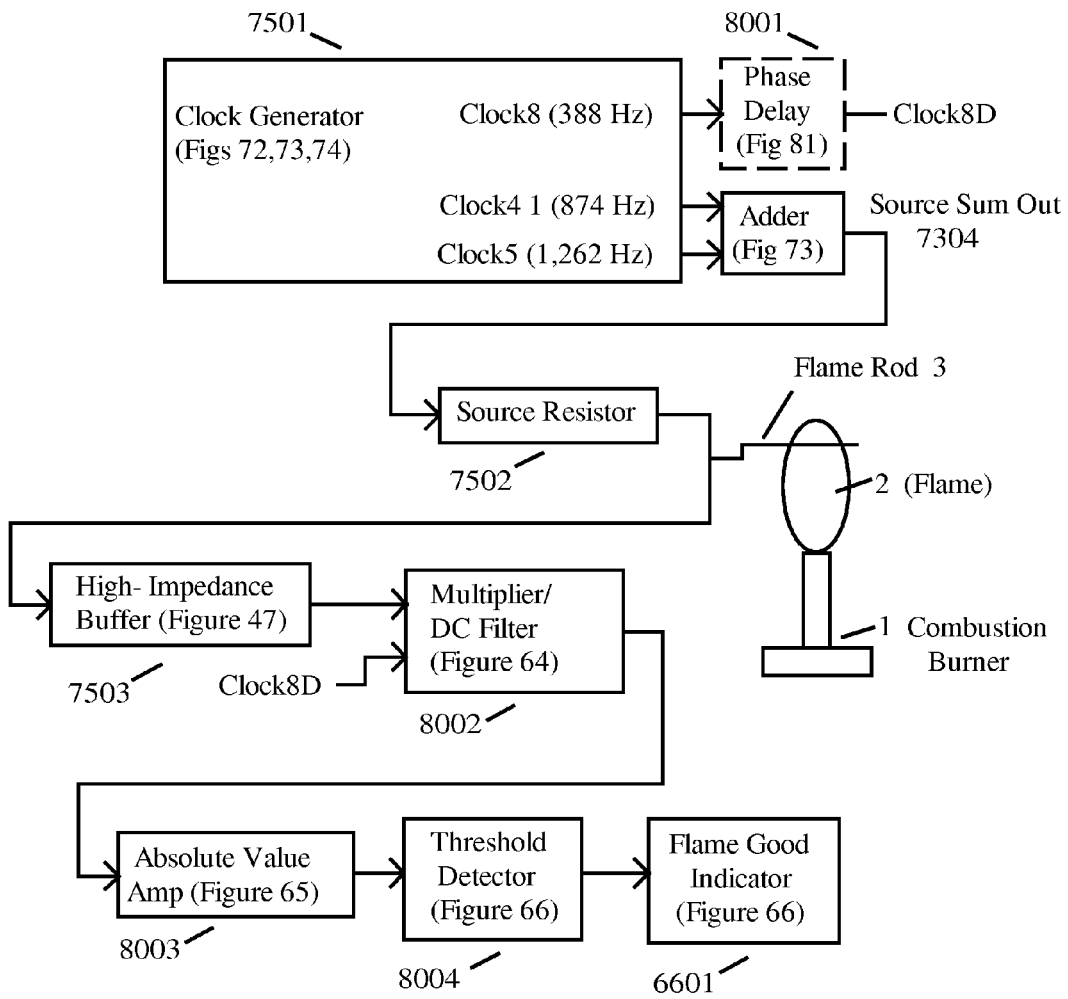
FIG. 80 is a general illustration showing the use of flame rectification as a mixer with a simple synchronous detector used to detect the difference frequency.
Figure 81:
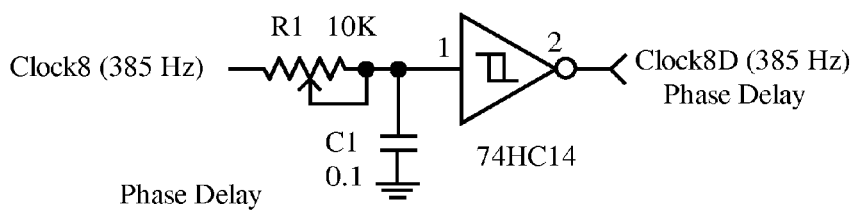
FIG. 81 is a general illustration showing an electrical circuit for providing an adjustable phase delay.
Figure 83:
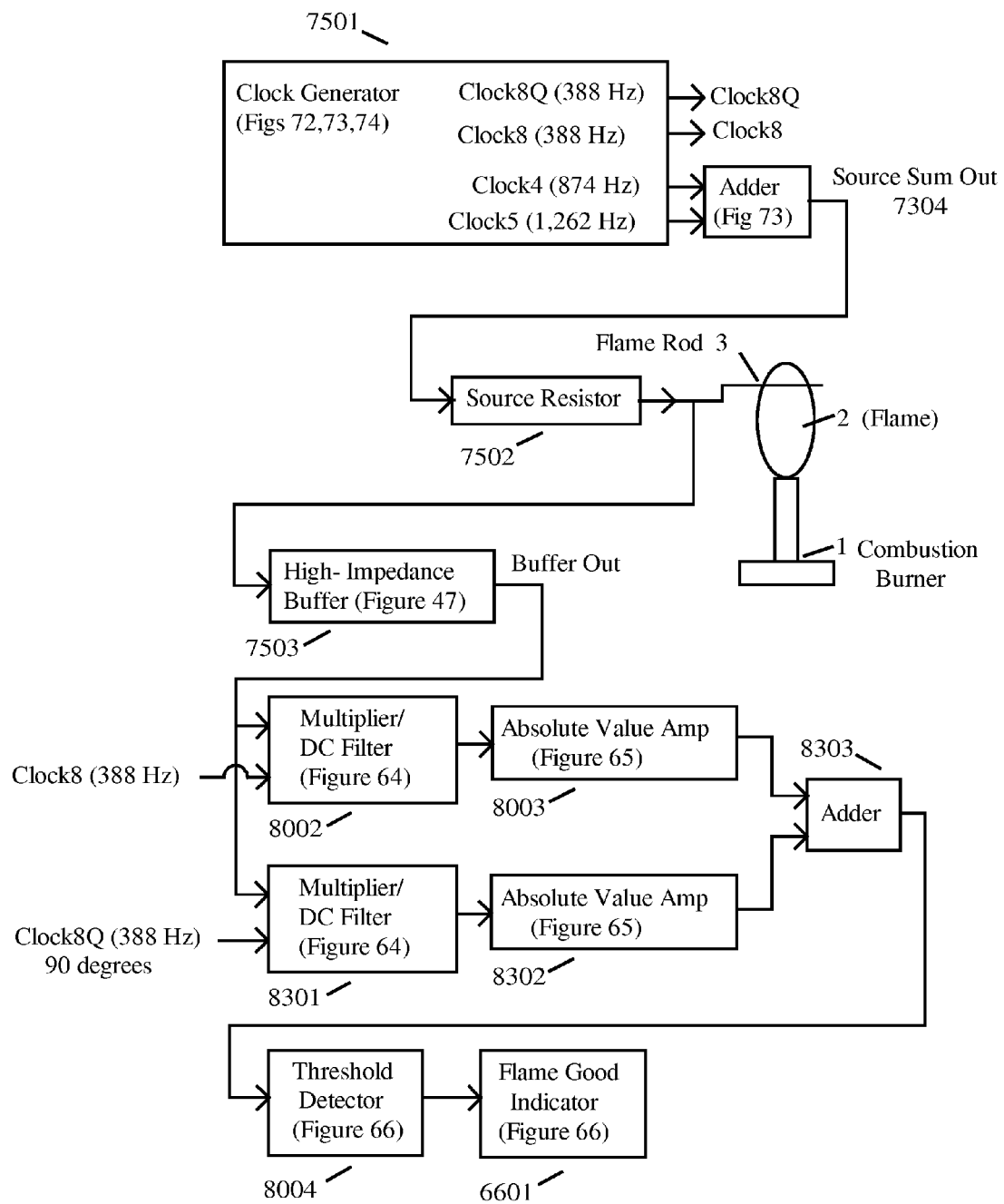
FIG. 83 is a general illustration showing the use of flame rectification as a mixer with a quadrature synchronous detector used to detect the difference frequency.
Figure 84:
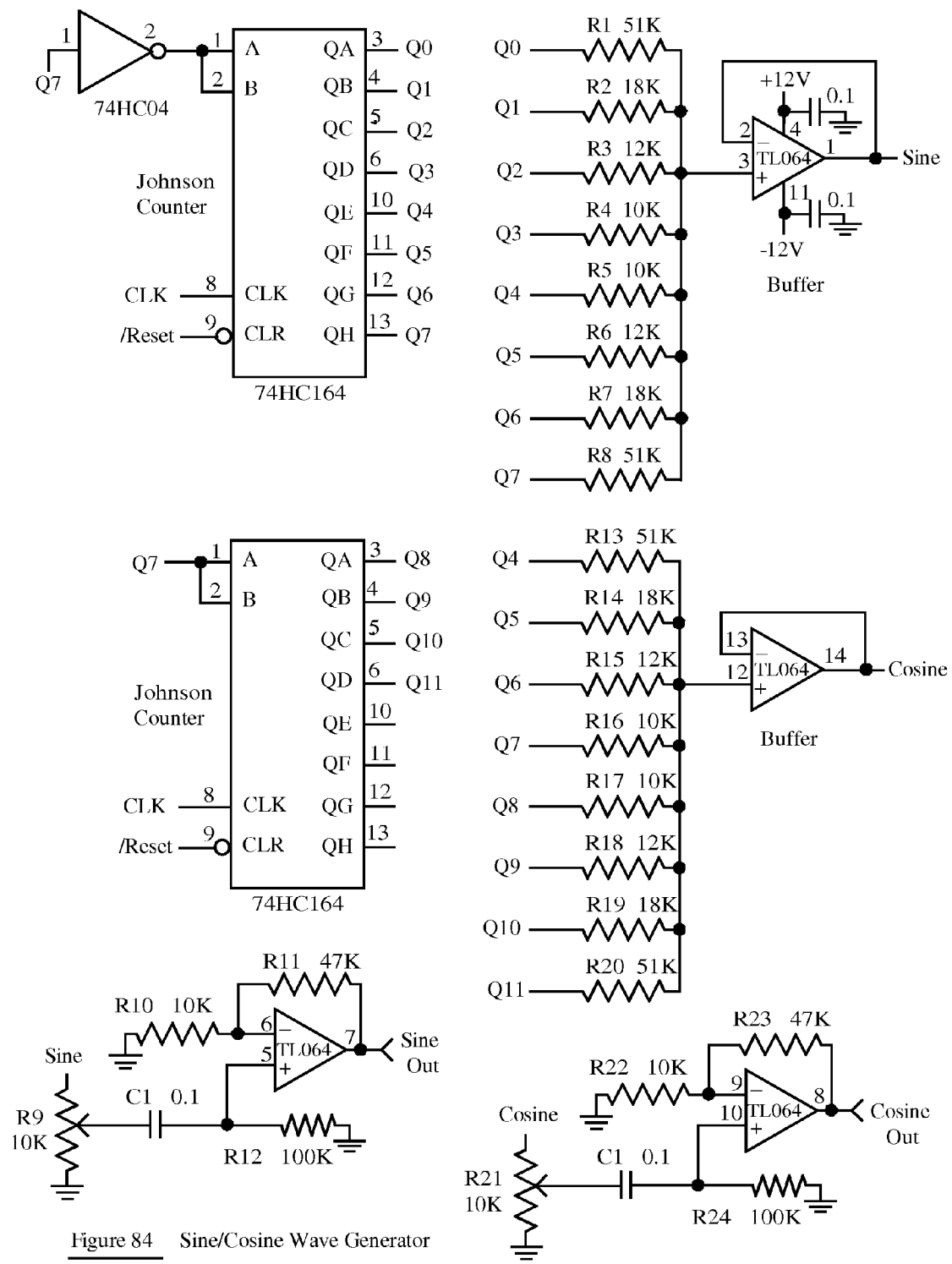
FIG. 84 is a general illustration showing an electrical circuit for using Johnson Counters to produce both sine and cosine waves.

The output of High Impedance Buffer 8804 is connected to the input of the 388 Hz Bandpass Filter 8805 (FIG. 77). As is shown in FIG. 77 the 388 Hz Bandpass Filter 8805 is made by cascading two 388 Hz Bandpass Filters, each of which is shown in more detail in FIG. 76. In some instances a single 388 Hz Bandpass Filter (FIG. 76) may be used. In some instances no filter may be needed at all. The output of 388 Hz Bandpass Filter 8805 is connected to the input of Phase Locked Loop 8806 (shown in more detail in FIG. 78). The output of Phase Locked Loop 8806 is connected to Flame Good Indicator 8807 (shown in FIG. 78 as LED 7801). When Phase Locked Loop 8806 detects the 388 Hz Difference Frequency between Signal Source 1 and Signal Source 2 Phase Locked Loop 8806 turns on Flame Good Indicator 8807 to signify that a flame is present. Since the 388 Hz Difference Frequency is produced only by flame rectification and the presence of the 388 Hz signal proves that a flame is present.

In the fifth embodiment flame rectification is used as a mixer to cause two signals having selected waveforms to produce sum and difference signals. The sum and/or difference frequencies are detected using a simple synchronous detector.

Figure 89:
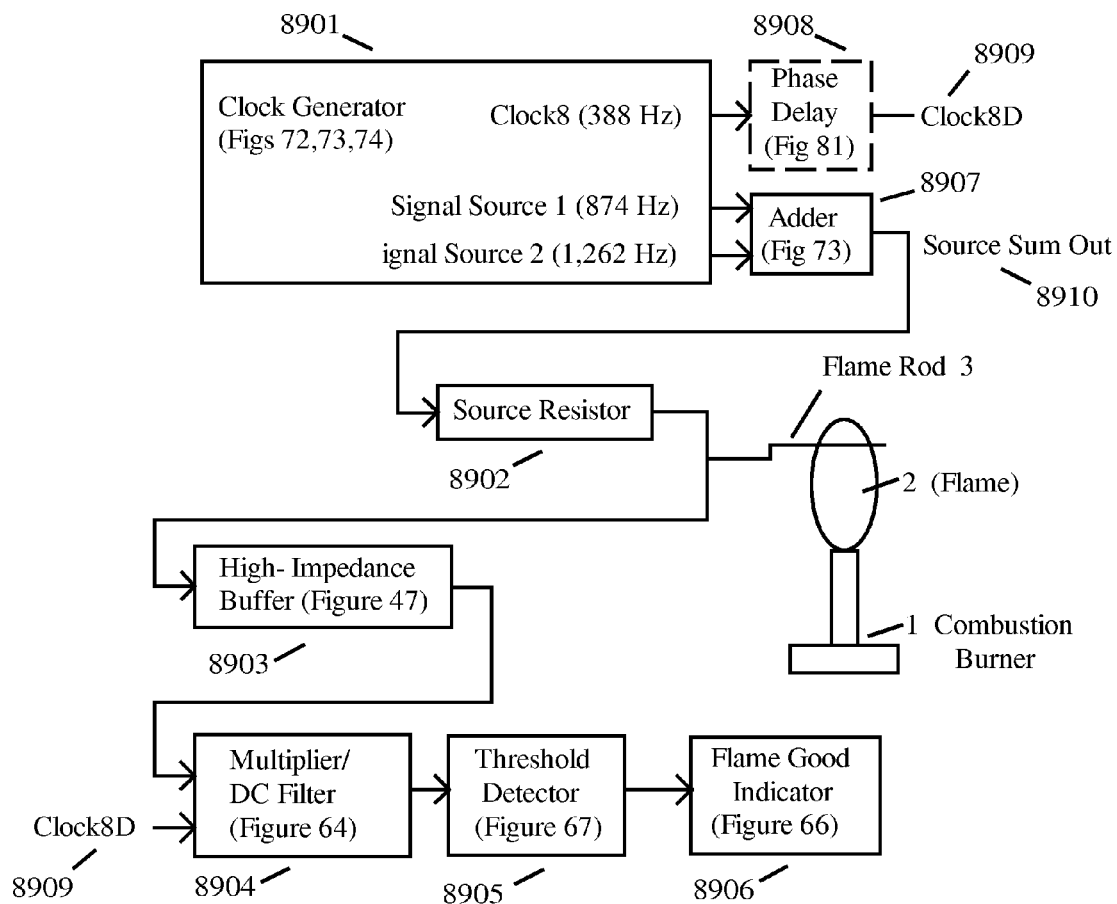
FIG. 89 is a general illustration showing the use of flame rectification as a mixer with a simple synchronous detector used to detect the difference frequency.

The system is shown in FIG. 89. Clock Generator 8901 produces three signals: Signal Source 1 at 874 Hz, Signal Source 2 at 1,262 Hz and a Reference Signal Clock8 at 388 Hz. Reference Signal Clock8 is a reference that is exactly the same frequency as the difference between Signal Source 1 and Signal Source 2. Reference Signal Clock8 goes to Phase Delay 8908 to produce Reference Signal Clock8D (8909) which is a phase delayed version of Reference Signal Clock8. The purpose in producing a phase delayed version of Reference Signal Clock8 is because some flame systems may introduce a phase delay due to parasitic capacitance and the high input impedance of High Impedance Buffer 8903. In a system that does not produce such a phase delay, Phase Delay 8908 may be omitted and Reference Signal Clock8 may be used directly instead of Reference Signal Clock8D (8909). (Clock Generator 8901 is shown in more detail in FIG. 72, FIG. 73, and FIG. 74.)

Signal Source 1 and Signal Source 2 are summed in Adder 8907 to produce Source Sum Out 8910. Source Sum Out 8910 is applied through Source Resistor 8902 to Flame Rod 3. Flame Rod 3 is also connected to the input of High Impedance Buffer 8903 (shown in more detail in FIG. 47).

The output of High Impedance Buffer 8903 is connected to a first input of Multiplier/DC Filter 8904 (shown in more detail in FIG. 64). A second input of Multiplier/DC Filter 8904 is connected to Reference Signal Clock8D 8909 (if Phase Delay 8908 is used) or Reference Signal Clock8 (if a phase delay is not needed). The output of Multiplier/DC Filter 8904 is connected to the input of Threshold Detector 8905 (The details of Threshold Detector 8905 are shown in FIG. 67 and in some implementations may omit Absolute Value Amp 65.) Threshold Detector 8905 applies a threshold test and, when the voltage is above a selected threshold, turns on Flame Good Indicator 8906 to signify that a flame is present. (Flame Good Indicator 8906 is shown in FIG. 66 as LED 6601). Since the 388 Hz Difference Signal is only produced when Signal Source 1 and Signal 2 are mixed by flame rectification the 388 Hz Difference Signal can only be caused by a flame.

In the sixth preferred embodiment flame rectification is used as a mixer to cause two signals having selected waveforms to produce sum and difference signals. The sum and/or difference frequencies are detected using a quadrature synchronous detector.

Figure 72:
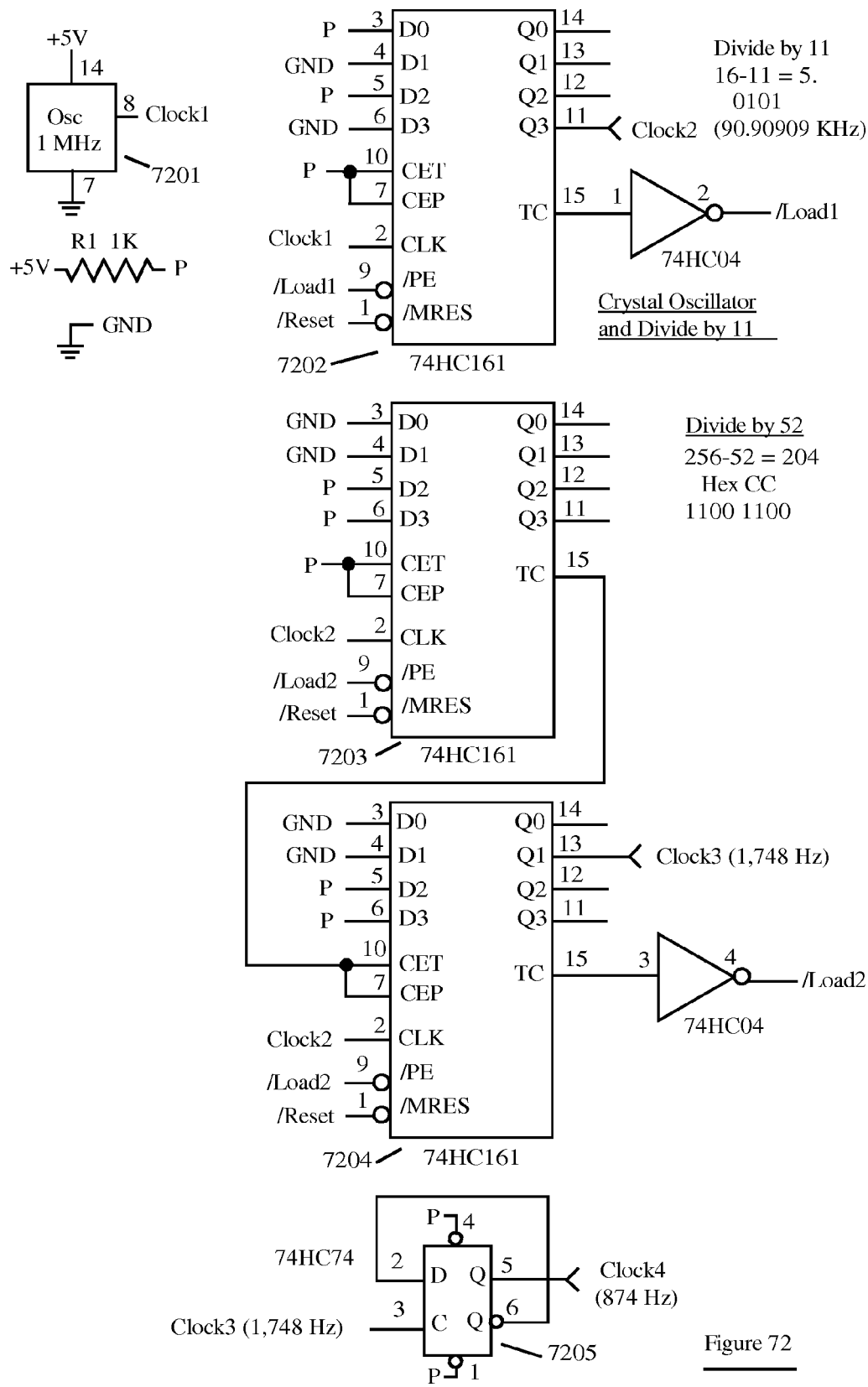
FIG. 72, FIG. 73, and FIG. 74 are general illustrations showing an electrical circuit for a clock generator.
Figure 73:
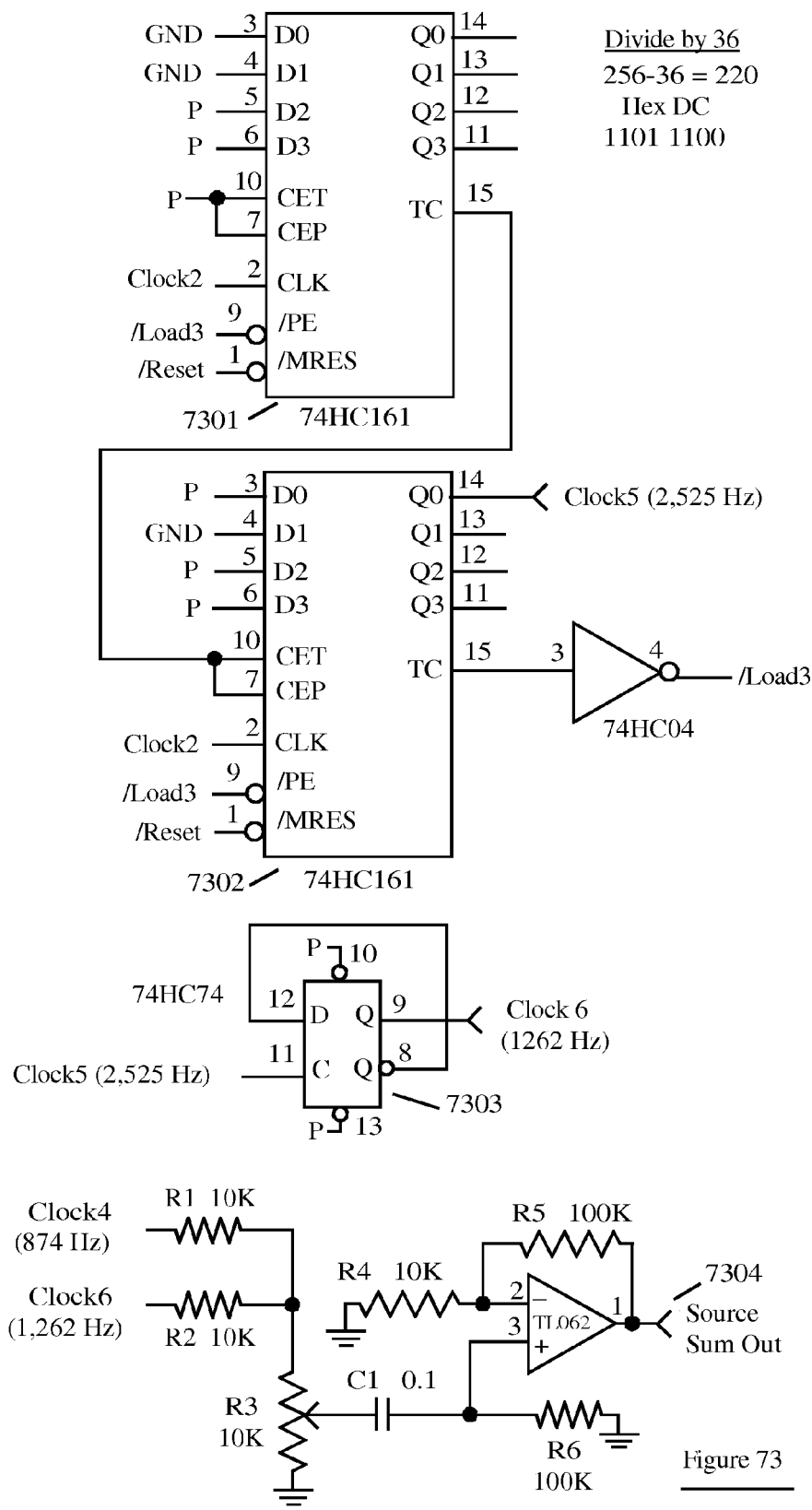
Figure 74:
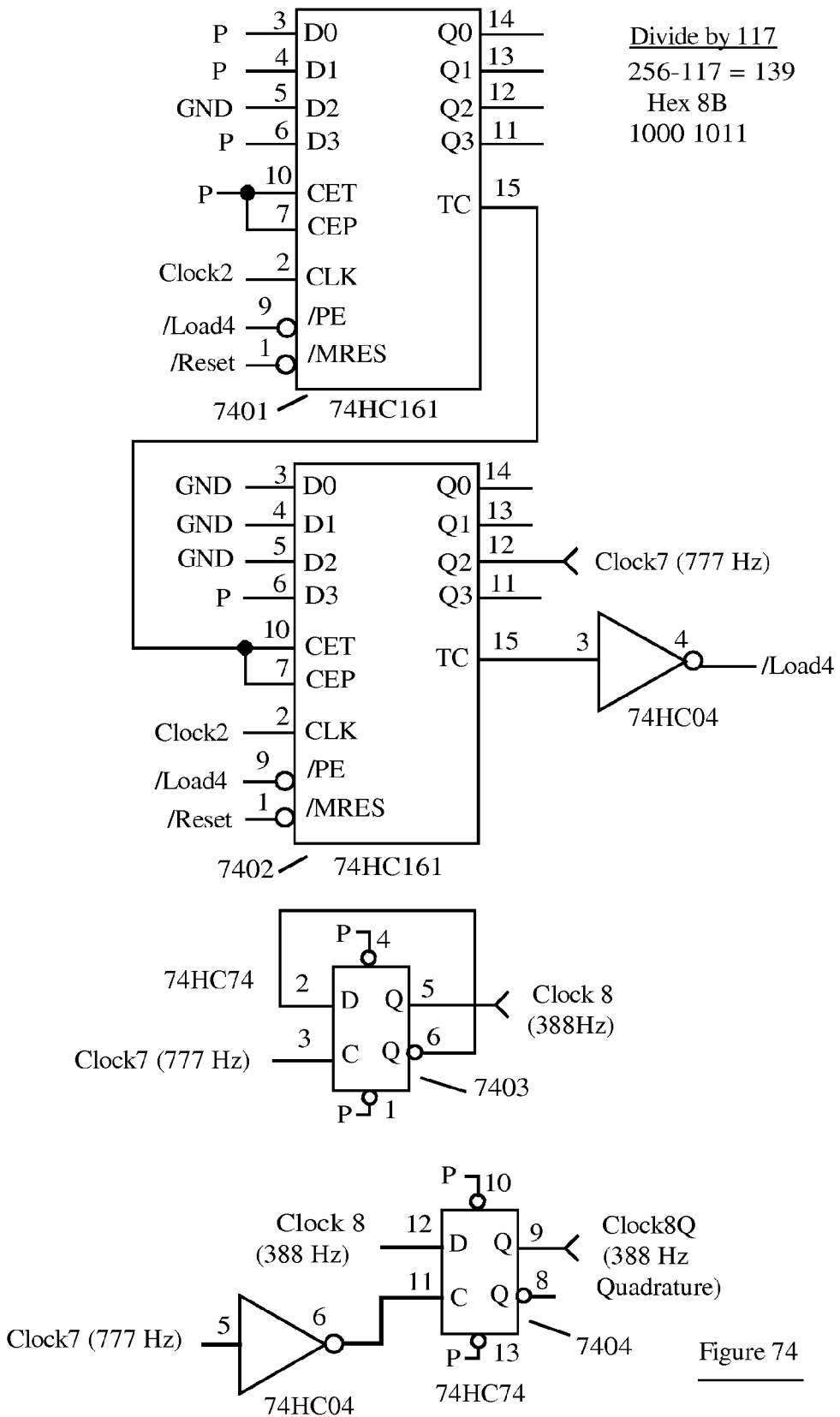
Figure 75:
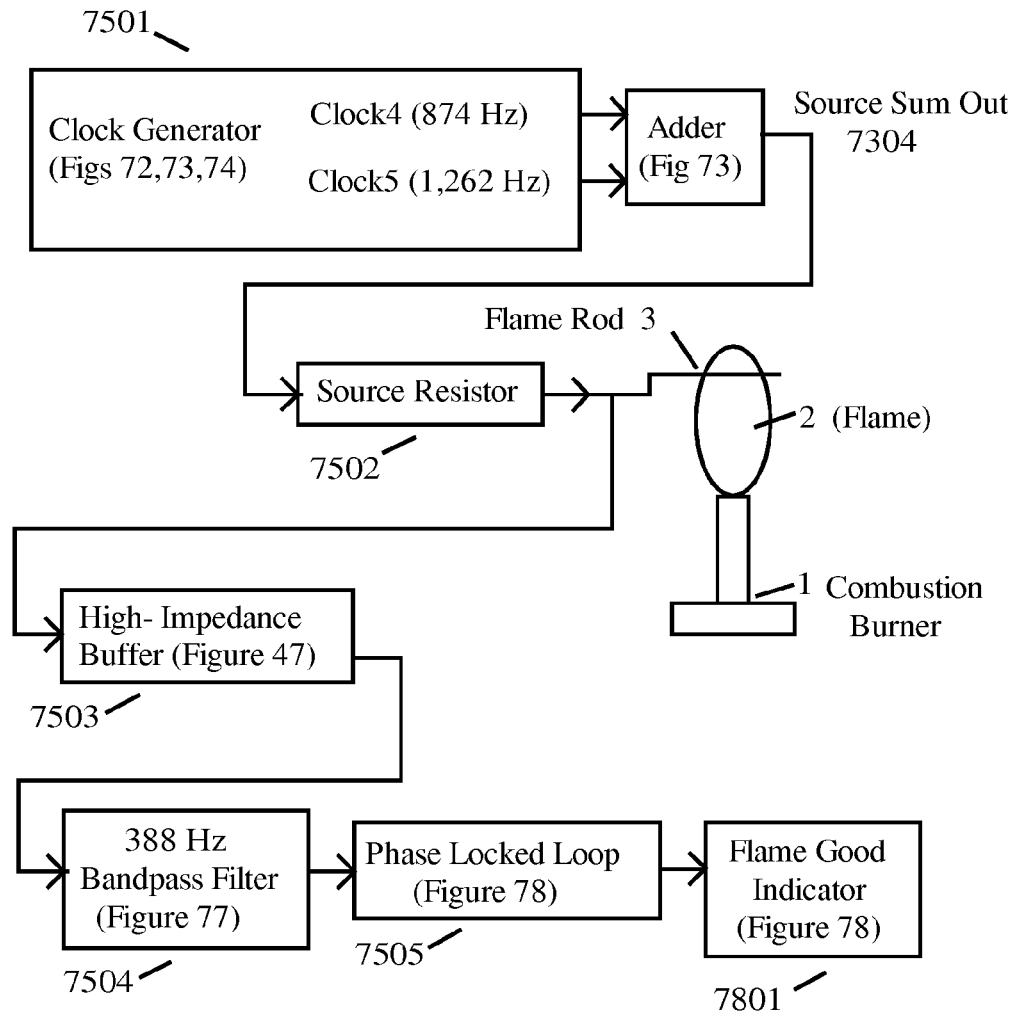
FIG. 75 is a general illustration showing the use of flame rectification as a mixer with a Phase Locked Loop used to detect the difference frequency.
Figure 90:
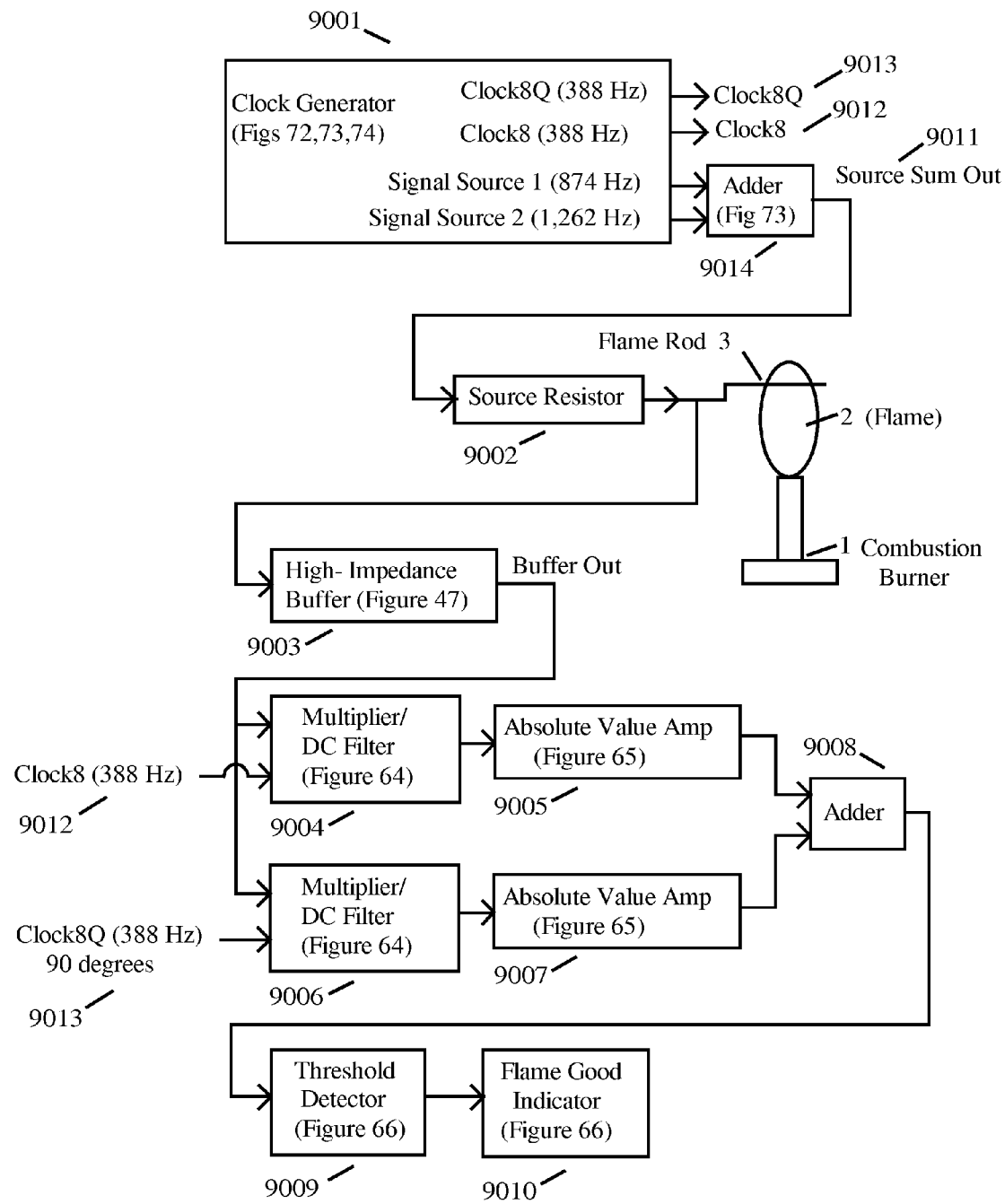
FIG. 90 is a general illustration showing the use of flame rectification as a mixer with a quadrature synchronous detector used to detect the difference frequency.

The system is shown in FIG. 90. Clock Generator 9001 produces four signals: Signal Source 1 at 874 Hz, Signal Source 2 at 1,262 Hz, Reference Signal 1 (9012) at 388 Hz which is exactly the same frequency as the difference between Signal Source 1 and Signal Source 2, and a Reference Signal 2 (9013) which is at the same frequency as Reference Signal 1 but has a phase delay of approximately 90 degrees. The details of Clock Generator 9001 are shown in FIGS. 72, 73, and 74.

Signal Source 1 and Signal Source 2 are summed in Adder 9014 to produce Source Sum Out 9011. Source Sum Out 9011 is applied through Source Resistor 9002 to Flame Rod 3. Flame Rod 3 is also connected to the input of High Impedance Buffer 9003 (shown in more detail in FIG. 47).

The output of High Impedance Buffer 9003 is connected to a first input of Multiplier/DC Filter 9004 (shown in more detail in FIG. 64) and also to a first input of Multiplier/DC Filter 9006. A second input of Multiplier/DC Filter 9004 is connected to Reference Signal Clock8 (9012). A second input of Multiplier/DC Filter 9006 is connected to Reference Signal Clock8Q (9013) which is approximately 90 degrees out of phase with Reference Signal Clock8 (9012). The output of Multiplier/DC Filter 9004 is connected to the input of Absolute Value Amp 9005 which produces the absolute value of its input. The output of Multiplier/DC Filter 9006 is connected to the input of Absolute Value Amp 9007 which produces the absolute value of its input. The output of Absolute Value Amp 9005 is connected to a first input of Adder 9008. The output of Absolute Value Amp 9007 is connected to a second input of Adder 9008. Adder 9008 sums the two inputs and provides the sum to Threshold Detector 9009. (The details of Threshold Detector 9009 are shown in FIG. 66.) Threshold Detector 9009 applies a threshold test and, when the voltage is above a selected threshold, turns on Flame Good Indicator 9010 to signify that a flame is present. (Flame Good Indicator 9010 is shown in FIG. 66 as LED 6601). Since the 388 Hz Difference Signal is only produced when Signal Source 1 and Signal 2 are mixed by flame rectification the 388 Hz Difference Signal can only be caused by a flame. The use of quadrature synchronous detection thus described makes any phase delays in the flame system irrelevant.

While preferred embodiments of the present invention have been shown, it is to be expressly understood that modifications and changes may be made thereto.

I claim:

1. A system for detecting the presence of a flame comprising:
   a. a combustion burner;
   b. a flame rod;
   c. a signal source having a selected waveform connected to said flame rod;
   d. a high impedance buffer having an input connected to said flame rod and whose return current path is provided by said combustion burner through said flame;
   e. a harmonic signal detector having an input connected to the output of said high impedance buffer;
   f. an indicator connected to the output of said harmonic signal detector; whereas
   g. said flame from said combustion burner causes harmonic distortion of said signal source having a selected waveform producing a harmonic signal, and
   h. said harmonic signal detector is configured to detect said harmonic signal and indicate the results on said indicator.

2. The system of claim 1 whereby said signal source having a selected waveform is selected from a group consisting of an approximately symmetrical square wave and a low distortion sine wave.

3. The system of claim 1 whereby said harmonic signal detector comprises a phase locked loop tuned to the frequency of said harmonic signal.

4. The system of claim 1 further comprising a master clock configured to produce said signal having a selected waveform and a reference signal having the same frequency as said harmonic signal, and said harmonic signal detector comprises a simple synchronous detector comprising:
   a. a multiplier having a first input connected to the output of said high impedance buffer and a second input connected to said reference signal;
   b. a threshold detector having an input connected to the output of said multiplier, and which is configured to produce an output when a selected threshold is exceeded.

5. The system of claim 1 further comprising a master clock configured to produce said signal having a selected waveform, a first reference signal having the same frequency as said harmonic signal, and a second reference signal having the same frequency as said first reference signal but is approximately 90 degrees out of phase with said first reference signal, and said harmonic signal detector comprises a quadrature synchronous detector comprising:
   a. a first multiplier having a first input connected to the output of said high impedance buffer and a second input connected to said first reference signal;
   b. a second multiplier having a first input connected to the output of said high impedance buffer and a second input connected to said second reference signal;
   c. a first absolute value amp having an input connected to the output of said first multiplier;
   d. a second absolute value amp having an input connected to the output of said second multiplier;
   e. an adder having a first input connected to the output of said first absolute value amp and a second input connected to the output of said second absolute value amp;
   f. a threshold detector having an input connected to the output of said adder and which is configured to produce an output when the value of the signal level exceeds a selected level.

6. A system for detecting the presence of a flame comprising:
   a. a combustion burner;
   b. a flame rod;
   c. a first signal source having a selected waveform connected to said flame rod;
   d. a second signal source having a selected waveform connected to said flame rod;
   e. a high impedance buffer having an input connected to said flame rod and whose return current path is provided by said combustion burner through said flame;
   f. a signal detector having an input connected to the output of said high impedance buffer;
   g. an indicator connected to the output of said signal detector; whereas
   h. said flame from said combustion burner causes said first signal source having a selected waveform and said second signal source having a selected waveform to mix producing a first mixing signal at the sum of the frequencies of said first signal source having a selected waveform and said second signal source having a selected waveform as well as a second mixing signal at the difference between the frequencies of said first signal source having a selected waveform and said second signal source having a selected waveform, and i. said signal detector is configured to detect said first mixing signal or said second mixing signal and indicate the results on said indicator.

7. The system of claim 6 whereby said signal detector comprises a phase locked loop tuned to said first mixing frequency or to said second mixing frequency.

8. The system of claim 6 further comprising a master clock configured to produce said first signal having a selected waveform, said second signal having a selected waveform, and a reference signal having the same frequency as said first mixing signal or said second mixing signal, and said signal detector comprises a simple synchronous detector comprising:
   a. a multiplier having a first input connected to the output of said high impedance buffer and a second input connected to said reference signal;
   b. a threshold detector having an input connected to the output of said multiplier, and which is configured to produce an output when a selected threshold is exceeded.

9. The system of claim 6 further comprising a master clock configured to produce said first signal having a selected waveform, said second signal having a selected waveform, a first reference signal having the same frequency as said first mixing signal or said second mixing signal, and a second reference signal having the same frequency as said first reference signal but is approximately 90 degrees out of phase with said first reference signal, and said signal detector comprises a quadrature synchronous detector comprising:
   a. a first multiplier having a first input connected to the output of said high impedance buffer and a second input connected to said first reference signal;
   b. a second multiplier having a first input connected to the output of said high impedance buffer and a second input connected to said second reference signal;
   c. a first absolute value amp having an input connected to the output of said first multiplier;
   d. a second absolute value amp having an input connected to the output of said second multiplier;
   e. an adder having a first input connected to the output of said first absolute value amp and a second input connected to the output of said second absolute value amp;
   f. a threshold detector having an input connected to the output of said adder and which is configured to produce an output when the value of the signal level exceeds a selected level.

10. The system of claim 6 whereby said first signal source having a selected waveform is selected from a group consisting of an approximately symmetrical square wave and a low distortion sine wave.

11. The system of claim 6 whereby said second signal source having a selected waveform is selected from a group consisting of an approximately symmetrical square wave and a low distortion sine wave.

12. A method for detecting the presence of a flame comprising the steps of:
   a. providing a combustion burner;
   b. providing a flame rod;
   c. providing a signal source having a selected waveform introduced to said flame rod;
   d. providing a high impedance buffer to buffer a flame rod signal from said flame rod;
   e. providing a harmonic signal detector to receive the output of said high impedance buffer;
   f. providing an indicator to receive the output of said harmonic signal detector; whereas
   g. in the presence of a flame produced by said combustion burner flame rectification between said flame rod and said combustion burner causes said signal source having a selected waveform to produce harmonics of the fundamental frequency of said selected waveform,
   h. said harmonic signal detector is used to detect the presence of at least one of said harmonics of said selected waveform and indicate the presence of said at least one of said harmonics of said selected waveform on said indicator, and
   i. said presence of said at least one of said harmonics of said selected waveform is proof of the presence of said flame.

13. The method of claim 12 where said step of providing a harmonic signal detector comprises providing a phase locked loop.

14. The method of claim 12 where said step of providing a harmonic signal detector comprises providing a master clock and either a simple synchronous detector or a quadrature synchronous detector.

15. A method for detecting the presence of a flame comprising the steps of:
   a. providing a combustion burner;
   b. providing a flame rod;
   c. providing a first signal source having a selected waveform introduced to said flame rod;
   d. providing a second signal source having a selected waveform introduced to said flame rod;
   e. providing a high impedance buffer to buffer a flame rod signal from said flame rod;
   f. providing a signal detector to receive the output of said high impedance buffer;
   g. providing an indicator to receive the output of said signal detector; whereas
   h. in the presence of a flame produced by said combustion burner flame rectification between said flame rod and said combustion burner causes said first signal source having a selected waveform and said second signal source having a selected waveform to mix producing a sum signal at the sum frequency of said first signal source and said second signal source and a difference signal at the difference frequency of said first signal source and said second signal source,
   i. said signal detector is used to detect the presence of said sum signal or said difference signal and indicate the presence of said sum signal or said difference signal on said indicator, and
   j. said presence of said sum signal or said difference signal is proof of the presence of said flame.

16. The method of claim 15 where said step of providing a signal detector comprises providing a phase locked loop.

17. The method of claim 15 where said step of providing a signal detector comprises providing a master clock and either a simple synchronous detector or a quadrature synchronous detector.

18. A method for detecting the presence of a flame comprising the steps of:
   a. providing two signal sources to said flame using a flame rod;
   b. using flame rectification to cause said two signal sources to mix;
   c. providing a signal detector to detect a mixing signal produced by said two signal sources; and
   d. providing an indicator to indicate the results of said signal detector.

* * * * *